US012798863B2

(12) United States Patent
Euler et al.

(10) Patent No.: US 12,798,863 B2
(45) **Date of Patent: *Nov. 17, 2026**

(54) INSULATED MULTI-LAYER SHEET AND METHOD OF MAKING THE SAME

(71) Applicant: Berry Global, Inc., Evansville, IN (US)

(72) Inventors: John B. Euler, Evansville, IN (US); Anvit Gupta, Evansville, IN (US); Gerald S. Sutton, Boonville, IN (US); Chris Bolek, Evansville, IN (US)

(73) Assignee: Berry Global, Inc., Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/406,730

(22) Filed: Jan. 8, 2024

(65) Prior Publication Data

US 2024/0140681 A1 May 2, 2024

Related U.S. Application Data

(63) Continuation of application No. 17/528,650, filed on Nov. 17, 2021, now Pat. No. 11,897,683, which is a (Continued)

(51) Int. Cl.
*B65D 81/38* (2006.01)
*A47G 19/22* (2006.01)
(Continued)

(52) U.S. Cl.
CPC ..... *B65D 81/3874* (2013.01); *A47G 19/2288* (2013.01); *B32B 1/00* (2013.01);
(Continued)

(58) Field of Classification Search
CPC .................. A47G 19/2288; B32B 1/00; B32B 2250/03; B32B 2266/025; B32B 2272/00; B32B 2307/304; B32B 2307/4023; B32B 2307/50; B32B 2307/518; B32B 2307/558; B32B 2307/5825; B32B 2307/72;
(Continued)

(56) References Cited

U.S. PATENT DOCUMENTS 1,396,282 A 11/1921 Penn
1,435,120 A 11/1922 Holman
(Continued)

FOREIGN PATENT DOCUMENTS

AU 2013334155 B2 2/2017
BE 898053 4/1984
(Continued)

OTHER PUBLICATIONS

Translation of JP2002011838A, Yoshida et al., Jan. 15, 2002. (Year: 2002).*

(Continued)

*Primary Examiner* — Hai Vo
(74) *Attorney, Agent, or Firm* — Barnes & Thornburg LLP

(57) ABSTRACT

A multi-layer sheet includes an insulative cellular non-aromatic polymeric material, a film, and a polymeric-lamination layer. The insulative cellular non-aromatic polymeric material may be formed from a polymeric formulation comprising a base resin blend and a physical nucleating agent.

18 Claims, 10 Drawing Sheets

Related U.S. Application Data continuation of application No. 16/058,126, filed on Aug. 8, 2018, now Pat. No. 11,214,429.

(60) Provisional application No. 62/542,324, filed on Aug. 8, 2017.

(51) Int. Cl.

| | |
|---|---|
| ***B32B 1/00*** | (2024.01) |
| ***B32B 5/18*** | (2006.01) |
| ***B32B 7/12*** | (2006.01) |
| ***B32B 27/06*** | (2006.01) |
| ***B32B 27/20*** | (2006.01) |
| ***B32B 27/32*** | (2006.01) |
| ***B32B 37/15*** | (2006.01) |
| ***B65D 1/26*** | (2006.01) |
| ***B65D 1/28*** | (2006.01) |

(52) U.S. Cl.

CPC .................. *B32B 5/18* (2013.01); *B32B 7/12* (2013.01); *B32B 27/065* (2013.01); *B32B 27/20* (2013.01); *B32B 27/32* (2013.01); *B32B 37/153* (2013.01); *B65D 1/265* (2013.01); *B65D 1/28* (2013.01); *B65D 81/3865* (2013.01); *B65D 81/3867* (2013.01); *B32B 2250/03* (2013.01); *B32B 2266/025* (2013.01); *B32B 2272/00* (2013.01); *B32B 2307/304* (2013.01); *B32B 2307/4023* (2013.01); *B32B 2307/50* (2013.01); *B32B 2307/518* (2013.01); *B32B 2307/5825* (2013.01); *B32B 2307/72* (2013.01); *B32B 2439/00* (2013.01); *B32B 2439/02* (2013.01)

(58) Field of Classification Search

CPC ............ B32B 2439/00; B32B 2439/02; B32B 27/065; B32B 27/08; B32B 27/20; B32B 27/32; B32B 3/02; B32B 37/153; B32B 5/18; B32B 7/12; B65D 1/265; B65D 1/28; B65D 81/3865; B65D 81/3867; B65D 81/3874

See application file for complete search history.

(56) References Cited

U.S. PATENT DOCUMENTS

| | | | |
|---|---|---|---|
| 1,920,529 | A | 8/1933 | Sidebotham |
| 1,969,030 | A | 8/1934 | Page |
| 2,097,899 | A | 11/1937 | Smith |
| 2,103,831 | A | 12/1937 | Sidon |
| 2,809,776 | A | 10/1957 | Barrington |
| 3,182,882 | A | 5/1965 | Aellen, Jr. |
| 3,221,954 | A | 12/1965 | Lux |
| 3,227,784 | A | 1/1966 | Blades |
| 3,252,387 | A | 5/1966 | Schur |
| 3,290,198 | A | 12/1966 | Lux |
| 3,312,383 | A | 4/1967 | Shapiro |
| 3,327,038 | A | 6/1967 | Fox |
| 3,327,103 | A | 6/1967 | Bonnet |
| 3,344,222 | A | 9/1967 | Shapiro |
| 3,381,880 | A | 5/1968 | Lewallen et al. |
| 3,409,204 | A | 11/1968 | Carle |
| 3,431,163 | A | 3/1969 | Gilbert |
| 3,443,715 | A | 5/1969 | Edwards |
| 3,468,467 | A | 9/1969 | Amberg |
| 3,547,012 | A | 12/1970 | Amberg |
| 3,583,624 | A | 6/1971 | Peacock |
| 3,658,615 | A | 4/1972 | Amberg |
| 3,661,282 | A | 5/1972 | Buhayar |
| 3,703,255 | A | 11/1972 | Wade |
| 3,733,381 | A | 5/1973 | Willette |
| 3,793,283 | A | 2/1974 | Frailey |
| 3,846,349 | A | 11/1974 | Harada |
| 3,892,828 | A | 7/1975 | Weatherly |
| 3,907,193 | A | 9/1975 | Heller |
| 3,919,368 | A | 11/1975 | Seto |
| RE28,658 | E | 12/1975 | MacDaniel |
| 3,967,991 | A | 7/1976 | Shimano |
| 3,969,173 | A | 7/1976 | Amberg |
| 3,971,696 | A | 7/1976 | Manfredi |
| 3,973,721 | A | 8/1976 | Nakane |
| 3,981,412 | A | 9/1976 | Asmus |
| 4,026,458 | A | 5/1977 | Morris |
| 4,036,675 | A | 7/1977 | Amberg |
| 4,047,868 | A | 9/1977 | Kudo |
| 4,049,122 | A | 9/1977 | Maxwell |
| 4,070,513 | A | 1/1978 | Rhoads |
| 4,106,397 | A | 8/1978 | Amberg |
| 4,171,085 | A | 10/1979 | Doty |
| 4,197,948 | A | 4/1980 | Amberg |
| 4,206,166 | A | 6/1980 | Hayashi |
| 4,220,730 | A | 9/1980 | Coyne |
| 4,240,568 | A | 12/1980 | Pool |
| 4,264,672 | A | 4/1981 | Taylor-Brown |
| 4,284,226 | A | 8/1981 | Herbst |
| 4,288,026 | A | 9/1981 | Wilhelm |
| 4,298,331 | A | 11/1981 | Mueller |
| 4,299,349 | A | 11/1981 | Gilden |
| 4,300,891 | A | 11/1981 | Bemiss |
| 4,306,849 | A | 12/1981 | Cress |
| 4,310,369 | A | 1/1982 | Miller |
| 4,349,400 | A | 9/1982 | Gilden |
| 4,365,460 | A | 12/1982 | Cress |
| 4,391,666 | A | 7/1983 | Mueller |
| 4,409,045 | A | 10/1983 | Busse |
| 4,435,344 | A | 3/1984 | Iioka |
| 4,468,435 | A | 8/1984 | Shimba et al. |
| 4,479,989 | A | 10/1984 | Mahal |
| 4,490,130 | A | 12/1984 | Konzal |
| 4,550,046 | A | 10/1985 | Miller |
| 4,553,999 | A | 11/1985 | Ziegler |
| 4,579,275 | A | 4/1986 | Peelman |
| 4,604,324 | A | 8/1986 | Nahmias |
| 4,621,763 | A | 11/1986 | Brauner |
| 4,706,873 | A | 11/1987 | Schulz |
| 4,720,023 | A | 1/1988 | Jeff |
| 4,856,989 | A | 8/1989 | Siebert |
| 4,867,664 | A | 9/1989 | Fukuhara |
| 4,878,970 | A | 11/1989 | Schubert |
| 4,911,978 | A | 3/1990 | Tsubone |
| 4,918,112 | A | 4/1990 | Roox |
| 4,940,736 | A | 7/1990 | Alteepping |
| 4,990,382 | A | 2/1991 | Weissenstein |
| 5,037,285 | A | 8/1991 | Kudert |
| 5,037,684 | A | 8/1991 | Dundas |
| 5,055,022 | A | 10/1991 | Hirschberger |
| 5,078,817 | A | 1/1992 | Takagaki |
| 5,116,881 | A | 5/1992 | Park |
| 5,149,579 | A | 9/1992 | Park |
| 5,158,986 | A | 10/1992 | Cha |
| 5,160,674 | A | 11/1992 | Colton |
| 5,180,751 | A | 1/1993 | Park |
| 5,204,179 | A | 4/1993 | Baker |
| 5,236,963 | A | 8/1993 | Jacoby |
| 5,256,462 | A | 10/1993 | Callahan |
| 5,286,428 | A | 2/1994 | Hayashi |
| 5,308,568 | A | 5/1994 | Lipp |
| 5,328,651 | A | 7/1994 | Gallagher |
| 5,332,121 | A | 7/1994 | Schmidt |
| 5,348,795 | A | 9/1994 | Park |
| 5,366,791 | A | 11/1994 | Carr |
| 5,385,260 | A | 1/1995 | Gatcomb |
| 5,405,667 | A | 4/1995 | Heider |
| 5,443,769 | A | 8/1995 | Karabedian |
| 5,445,315 | A | 8/1995 | Shelby |
| 5,462,794 | A | 10/1995 | Lindemann |
| 5,490,631 | A | 2/1996 | Iioka |
| 5,507,640 | A | 4/1996 | Gilmer |
| 5,547,124 | A | 8/1996 | Mueller |
| 5,549,864 | A | 8/1996 | Greene |
| 5,574,074 | A | 11/1996 | Zushi |

(56) References Cited

U.S. PATENT DOCUMENTS

| | | | |
|---|---|---|---|
| 5,575,965 | A | 11/1996 | Caronia |
| 5,598,940 | A | 2/1997 | Finkelstein |
| 5,601,200 | A | 2/1997 | Finkelstein |
| 5,605,936 | A | 2/1997 | Denicolajr |
| 5,622,308 | A | 4/1997 | Ito |
| 5,628,453 | A | 5/1997 | Maclaughlin |
| 5,629,076 | A | 5/1997 | Fukasawa |
| 5,669,553 | A | 9/1997 | Smith |
| 5,688,572 | A | 11/1997 | Slat |
| 5,713,512 | A | 2/1998 | Barrett |
| 5,759,624 | A | 6/1998 | Neale |
| 5,765,710 | A | 6/1998 | Bergerioux |
| 5,766,709 | A | 6/1998 | Geddes |
| 5,769,311 | A | 6/1998 | Morita |
| 5,819,507 | A | 10/1998 | Kaneko |
| 5,840,139 | A | 11/1998 | Geddes |
| 5,857,572 | A | 1/1999 | Bird |
| 5,866,053 | A | 2/1999 | Park |
| 5,868,309 | A | 2/1999 | Sandstrom |
| 5,895,614 | A | 4/1999 | Rivera |
| 5,916,926 | A | 6/1999 | Cooper |
| 5,925,450 | A | 7/1999 | Karabedian |
| 5,927,525 | A | 7/1999 | Darr |
| 5,928,741 | A | 7/1999 | Andersen |
| 5,929,127 | A | 7/1999 | Raetzsch |
| 5,944,225 | A | 8/1999 | Kawolics |
| 5,948,839 | A | 9/1999 | Chatterjee |
| 5,952,423 | A | 9/1999 | Shang |
| 6,001,439 | A | 12/1999 | Kawakami |
| 6,007,437 | A | 12/1999 | Schickert |
| 6,010,062 | A | 1/2000 | Shimono |
| 6,030,476 | A | 2/2000 | Geddes |
| 6,034,144 | A | 3/2000 | Shioya |
| 6,051,174 | A | 4/2000 | Park |
| 6,053,214 | A | 4/2000 | Sjoberg et al. |
| 6,071,580 | A | 6/2000 | Bland |
| 6,077,878 | A | 6/2000 | Okura |
| 6,083,611 | A | 7/2000 | Eichbauer |
| 6,103,153 | A | 8/2000 | Park |
| 6,109,518 | A | 8/2000 | Mueller |
| 6,114,025 | A | 9/2000 | Devaudreuil |
| 6,129,653 | A | 10/2000 | Fredricks |
| 6,136,396 | A | 10/2000 | Gilmer |
| 6,139,665 | A | 10/2000 | Schmelzer |
| 6,142,331 | A | 11/2000 | Breining |
| 6,169,122 | B1 | 1/2001 | Blizard |
| 6,174,930 | B1 | 1/2001 | Agarwal |
| 6,193,098 | B1 | 2/2001 | Mochizuki |
| 6,218,023 | B1 | 4/2001 | Denicola |
| 6,221,925 | B1 | 4/2001 | Constant |
| 6,225,366 | B1 | 5/2001 | Raetzsch |
| 6,231,942 | B1 | 5/2001 | Blizard |
| 6,235,380 | B1 | 5/2001 | Tupil |
| 6,251,319 | B1 | 6/2001 | Tusim |
| 6,257,485 | B1 | 7/2001 | Sadlier |
| 6,258,862 | B1 | 7/2001 | Matz |
| 6,267,837 | B1 | 7/2001 | Mitchell |
| 6,284,810 | B1 | 9/2001 | Burnham |
| 6,294,115 | B1 | 9/2001 | Blizard |
| 6,306,973 | B1 | 10/2001 | Takaoka |
| 6,308,883 | B1 | 10/2001 | Schmelzer |
| 6,319,590 | B1 | 11/2001 | Geddes |
| 6,323,251 | B1 | 11/2001 | Perez et al. |
| 6,328,916 | B1 | 12/2001 | Nishikawa |
| 6,376,059 | B1 | 4/2002 | Anderson |
| 6,378,733 | B1 | 4/2002 | Boonzaier |
| 6,379,802 | B2 | 4/2002 | Ito |
| 6,383,425 | B1 | 5/2002 | Wu |
| 6,417,240 | B1 | 7/2002 | Park |
| 6,420,024 | B1 | 7/2002 | Perez |
| 6,432,525 | B1 | 8/2002 | Gokuraku |
| 6,444,073 | B1 | 9/2002 | Reeves |
| 6,444,149 | B1 | 9/2002 | Valentinsson |
| 6,455,150 | B1 | 9/2002 | Sheppard |
| 6,468,451 | B1 | 10/2002 | Perez |
| 6,472,473 | B1 | 10/2002 | Ansems |
| RE37,932 | E | 12/2002 | Baldwin |
| 6,512,019 | B1 | 1/2003 | Agarwal |
| 6,521,675 | B1 | 2/2003 | Wu |
| 6,541,105 | B1 | 4/2003 | Park |
| 6,562,447 | B2 | 5/2003 | Wu |
| 6,565,934 | B1 | 5/2003 | Fredricks |
| 6,586,532 | B1 | 7/2003 | Gauthy |
| 6,593,005 | B2 | 7/2003 | Tau |
| 6,593,384 | B2 | 7/2003 | Anderson |
| 6,613,811 | B1 | 9/2003 | Pallaver |
| 6,616,434 | B1 | 9/2003 | Burnham |
| 6,646,019 | B2 | 11/2003 | Perez |
| 6,649,666 | B1 | 11/2003 | Read |
| 6,706,223 | B1 | 3/2004 | Anderson |
| 6,713,139 | B2 | 3/2004 | Usui |
| 6,720,362 | B1 | 4/2004 | Park |
| 6,749,913 | B2 | 6/2004 | Watanabe |
| 6,779,662 | B2 | 8/2004 | Dorsey |
| 6,811,843 | B2 | 11/2004 | Debraal |
| 6,814,253 | B2 | 11/2004 | Wong |
| 6,875,484 | B1 | 4/2005 | Kogure |
| 6,875,826 | B1 | 4/2005 | Huovinen |
| 6,883,677 | B2 | 4/2005 | Goeking |
| 6,884,377 | B1 | 4/2005 | Burnham |
| 6,884,851 | B2 | 4/2005 | Gauthy |
| 6,908,651 | B2 | 6/2005 | Watanabe |
| 6,921,571 | B2 | 7/2005 | Funakoshi |
| 6,926,507 | B2 | 8/2005 | Cardona |
| 6,926,512 | B2 | 8/2005 | Wu |
| 6,982,107 | B1 | 1/2006 | Hennen |
| 6,986,922 | B2 | 1/2006 | Hesse |
| 7,014,801 | B2 | 3/2006 | Imanari |
| 7,056,563 | B2 | 6/2006 | Halabisky |
| 7,070,852 | B1 | 7/2006 | Reiners |
| 7,074,466 | B2 | 7/2006 | Debraal |
| 7,094,463 | B2 | 8/2006 | Haas |
| 7,121,991 | B2 | 10/2006 | Mannlein |
| 7,144,532 | B2 | 12/2006 | Kim |
| 7,169,338 | B2 | 1/2007 | Imanari |
| 7,173,069 | B2 | 2/2007 | Swennen |
| 7,183,005 | B2 | 2/2007 | Poloso |
| 7,234,629 | B2 | 6/2007 | Ho |
| 7,281,650 | B1 | 10/2007 | Milan |
| 7,311,243 | B1 | 12/2007 | Konzal |
| 7,355,089 | B2 | 4/2008 | Chang |
| 7,361,720 | B2 | 4/2008 | Pierini |
| 7,365,136 | B2 | 4/2008 | Huovinen |
| 7,423,071 | B2 | 9/2008 | Mogami |
| 7,458,504 | B2 | 12/2008 | Robertson |
| 7,462,307 | B2 | 12/2008 | Hesse |
| 7,504,347 | B2 | 3/2009 | Poon |
| 7,510,098 | B2 | 3/2009 | Hartjes |
| 7,513,386 | B2 | 4/2009 | Hartjes |
| 7,514,517 | B2 | 4/2009 | Hoenig |
| 7,524,911 | B2 | 4/2009 | Karjala |
| 7,546,932 | B2 | 6/2009 | Smith |
| 7,557,147 | B2 | 7/2009 | Martinez |
| 7,579,408 | B2 | 8/2009 | Walton |
| 7,582,716 | B2 | 9/2009 | Liang |
| 7,585,557 | B2 | 9/2009 | Aylward |
| 7,588,808 | B2 | 9/2009 | Hutchinson |
| 7,588,810 | B2 | 9/2009 | Semersky |
| 7,592,397 | B2 | 9/2009 | Markovich |
| 7,608,668 | B2 | 10/2009 | Shan |
| 7,622,179 | B2 | 11/2009 | Patel |
| 7,622,529 | B2 | 11/2009 | Walton |
| 7,629,416 | B2 | 12/2009 | Li |
| 7,655,296 | B2 | 2/2010 | Haas |
| 7,662,881 | B2 | 2/2010 | Walton |
| 7,666,918 | B2 | 2/2010 | Prieto |
| 7,671,106 | B2 | 3/2010 | Markovich |
| 7,671,131 | B2 | 3/2010 | Hughes |
| 7,673,564 | B2 | 3/2010 | Wolf |
| 7,687,442 | B2 | 3/2010 | Walton |
| 7,695,812 | B2 | 4/2010 | Peng |
| 7,704,440 | B2 | 4/2010 | Brandner |
| 7,714,071 | B2 | 5/2010 | Hoenig |
| 7,732,052 | B2 | 6/2010 | Chang |

(56) References Cited

U.S. PATENT DOCUMENTS

| | | | |
|---|---|---|---|
| 7,737,061 | B2 | 6/2010 | Chang |
| 7,737,215 | B2 | 6/2010 | Chang |
| 7,741,397 | B2 | 6/2010 | Liang |
| 7,754,814 | B2 | 7/2010 | Barcus |
| 7,759,267 | B2 | 7/2010 | Conover |
| 7,759,404 | B2 | 7/2010 | Burgun |
| 7,786,216 | B2 | 8/2010 | Soediono |
| 7,795,321 | B2 | 9/2010 | Cheung |
| 7,803,728 | B2 | 9/2010 | Poon |
| 7,811,644 | B2 | 10/2010 | Debraal |
| 7,818,866 | B2 | 10/2010 | Hollis |
| 7,820,282 | B2 | 10/2010 | Haas |
| 7,825,166 | B2 | 11/2010 | Sasaki |
| 7,841,974 | B2 | 11/2010 | Hartjes |
| 7,842,770 | B2 | 11/2010 | Liang |
| 7,858,706 | B2 | 12/2010 | Arriola |
| 7,863,379 | B2 | 1/2011 | Kapur |
| 7,871,558 | B2 | 1/2011 | Merical |
| 7,883,769 | B2 | 2/2011 | Seth |
| 7,893,166 | B2 | 2/2011 | Shan |
| 7,897,689 | B2 | 3/2011 | Harris |
| 7,906,587 | B2 | 3/2011 | Poon |
| 7,910,658 | B2 | 3/2011 | Chang |
| 7,915,192 | B2 | 3/2011 | Arriola |
| 7,918,005 | B2 | 4/2011 | Hollis |
| 7,918,016 | B2 | 4/2011 | Hollis |
| 7,922,071 | B2 | 4/2011 | Robertson |
| 7,928,162 | B2 | 4/2011 | Kiss |
| 7,935,740 | B2 | 5/2011 | Dang |
| 7,947,367 | B2 | 5/2011 | Poon |
| 7,951,882 | B2 | 5/2011 | Arriola |
| 7,973,100 | B2 | 7/2011 | Wada |
| 7,977,397 | B2 | 7/2011 | Cheung |
| 7,989,543 | B2 | 8/2011 | Karjala |
| 7,993,254 | B2 | 8/2011 | Robertson |
| 7,998,579 | B2 | 8/2011 | Lin |
| 7,998,728 | B2 | 8/2011 | Rhoads |
| 8,003,176 | B2 | 8/2011 | Ylitalo |
| 8,003,744 | B2 | 8/2011 | Okamoto |
| 8,012,550 | B2 | 9/2011 | Ylitalo |
| 8,026,291 | B2 | 9/2011 | Handa |
| 8,043,695 | B2 | 10/2011 | Ballard |
| 8,061,540 | B2 | 11/2011 | Toyoda |
| 8,061,541 | B2 | 11/2011 | Trumpp |
| 8,067,319 | B2 | 11/2011 | Poon |
| 8,076,381 | B2 | 12/2011 | Miyagawa |
| 8,076,416 | B2 | 12/2011 | Ellul |
| 8,084,537 | B2 | 12/2011 | Walton |
| 8,087,147 | B2 | 1/2012 | Hollis |
| 8,105,459 | B2 | 1/2012 | Alvarez |
| 8,119,237 | B2 | 2/2012 | Peng |
| 8,124,203 | B2 | 2/2012 | Semersky |
| 8,124,234 | B2 | 2/2012 | Weaver |
| 8,137,600 | B2 | 3/2012 | Pierick |
| 8,173,233 | B2 | 5/2012 | Rogers |
| 8,198,374 | B2 | 6/2012 | Arriola |
| 8,211,982 | B2 | 7/2012 | Harris |
| 8,227,075 | B2 | 7/2012 | Matsushita |
| 8,263,198 | B2 | 9/2012 | Carvell |
| 8,273,068 | B2 | 9/2012 | Chang |
| 8,273,826 | B2 | 9/2012 | Walton |
| 8,273,838 | B2 | 9/2012 | Shan |
| 8,288,470 | B2 | 10/2012 | Ansems |
| 8,304,496 | B2 | 11/2012 | Weaver |
| 8,342,420 | B2 | 1/2013 | Roberts, Jr. |
| 8,397,932 | B2 | 3/2013 | Ichikawa |
| 8,404,780 | B2 | 3/2013 | Weaver |
| 8,414,823 | B2 | 4/2013 | Rudiger |
| 8,435,615 | B2 | 5/2013 | Tsuchida |
| 8,444,905 | B2 | 5/2013 | Li |
| 8,535,598 | B2 | 9/2013 | Imanari |
| 8,679,620 | B2 | 3/2014 | Matsushita |
| 8,715,449 | B2 | 5/2014 | Leser |
| 8,721,823 | B2 | 5/2014 | Vaideeswaran |
| 8,795,827 | B2 | 8/2014 | Siche |

| | | | |
|---|---|---|---|
| 8,883,280 | B2 | 11/2014 | Leser |
| 9,067,705 | B2 | 6/2015 | Leser |
| 9,102,461 | B2 | 8/2015 | Leser |
| 9,180,995 | B2 | 11/2015 | Iyori |
| 9,346,605 | B2 | 5/2016 | Leser |
| 9,358,772 | B2 | 6/2016 | Leser |
| 9,447,248 | B2 | 9/2016 | Sun |
| 9,688,456 | B2 | 6/2017 | Euler |
| 9,758,292 | B2 | 9/2017 | Leser |
| 9,758,293 | B2 | 9/2017 | Leser |
| 9,937,652 | B2 | 4/2018 | Sun |
| 9,993,098 | B2 | 6/2018 | Leser |
| 10,011,696 | B2 | 7/2018 | Leser |
| 10,059,037 | B2 | 8/2018 | Li |
| 10,266,664 | B2 | 4/2019 | Sun |
| 10,899,532 | B2 | 1/2021 | Leser |
| 10,906,725 | B2 | 2/2021 | Leser |
| 11,091,311 | B2 | 8/2021 | Euler |
| 11,214,429 | B2 | 1/2022 | Euler |
| 2001/0010848 | A1 | 8/2001 | Usui |
| 2001/0010849 | A1 | 8/2001 | Blizard |
| 2001/0036520 | A1 | 11/2001 | Hall |
| 2001/0038893 | A1 | 11/2001 | Mohan |
| 2001/0039299 | A1 | 11/2001 | Park |
| 2001/0041236 | A1 | 11/2001 | Usui |
| 2001/0048988 | A1 | 12/2001 | Forte |
| 2002/0006975 | A1 | 1/2002 | Welsh |
| 2002/0030296 | A1 | 3/2002 | Geddes |
| 2002/0035164 | A1 | 3/2002 | Wu |
| 2002/0041046 | A1 | 4/2002 | Hartjes |
| 2002/0058126 | A1 | 5/2002 | Kannankeril |
| 2002/0122905 | A1 | 9/2002 | Andersson |
| 2002/0135088 | A1 | 9/2002 | Harfmann |
| 2002/0137851 | A1 | 9/2002 | Kim |
| 2002/0144769 | A1 | 10/2002 | Debraal |
| 2002/0172739 | A1 | 11/2002 | Anderson |
| 2002/0172818 | A1 | 11/2002 | Debraal |
| 2003/0003251 | A1 | 1/2003 | Debraal |
| 2003/0017284 | A1 | 1/2003 | Watanabe |
| 2003/0021921 | A1 | 1/2003 | Debraal |
| 2003/0021927 | A1 | 1/2003 | Boenig |
| 2003/0029876 | A1 | 2/2003 | Giraud |
| 2003/0065097 | A1 | 4/2003 | Degroot |
| 2003/0069362 | A1 | 4/2003 | Ramanathan |
| 2003/0108695 | A1 | 6/2003 | Freek |
| 2003/0114594 | A1 | 6/2003 | Starita |
| 2003/0127765 | A1 | 7/2003 | Weiland |
| 2003/0138515 | A1 | 7/2003 | Harfmann |
| 2003/0151172 | A1 | 8/2003 | Floyd |
| 2003/0186039 | A1 | 10/2003 | Hanada |
| 2003/0211310 | A1 | 11/2003 | Haas |
| 2003/0211350 | A1 | 11/2003 | Migliorini |
| 2003/0228336 | A1 | 12/2003 | Gervasio |
| 2003/0232210 | A1 | 12/2003 | Haas |
| 2004/0013830 | A1 | 1/2004 | Nonomura |
| 2004/0031714 | A1 | 2/2004 | Hanson |
| 2004/0037980 | A1 | 2/2004 | Debraal |
| 2004/0038018 | A1 | 2/2004 | Anderson |
| 2004/0062885 | A1 | 4/2004 | Imanari |
| 2004/0086703 | A1 | 5/2004 | Semersky |
| 2004/0115418 | A1 | 6/2004 | Anderson |
| 2004/0147625 | A1 | 7/2004 | Dostal |
| 2004/0162358 | A1 | 8/2004 | Yamamoto |
| 2004/0162363 | A1 | 8/2004 | Mochizuki |
| 2004/0170814 | A1 | 9/2004 | Vanhandel |
| 2005/0003122 | A1 | 1/2005 | Debraal |
| 2005/0006449 | A1 | 1/2005 | Damato |
| 2005/0009973 | A1 | 1/2005 | Lee |
| 2005/0040218 | A1 | 2/2005 | Hinchey |
| 2005/0100697 | A1 | 5/2005 | Sandstrom |
| 2005/0101926 | A1 | 5/2005 | Ausen |
| 2005/0104365 | A1 | 5/2005 | Haas |
| 2005/0115975 | A1 | 6/2005 | Smith |
| 2005/0121457 | A1 | 6/2005 | Wilson |
| 2005/0124709 | A1 | 6/2005 | Krueger |
| 2005/0145317 | A1 | 7/2005 | Yamamoto |
| 2005/0147807 | A1 | 7/2005 | Haas |
| 2005/0159496 | A1 | 7/2005 | Bambara |
| 2005/0165165 | A1 | 7/2005 | Zwynenburg |

(56) References Cited

U.S. PATENT DOCUMENTS

| | | | |
|---|---|---|---|
| 2005/0184136 | A1 | 8/2005 | Baynum |
| 2005/0236294 | A1 | 10/2005 | Herbert |
| 2005/0256215 | A1 | 11/2005 | Burnham |
| 2005/0272858 | A1 | 12/2005 | Pierini |
| 2005/0288383 | A1 | 12/2005 | Haas |
| 2006/0000882 | A1 | 1/2006 | Darzinskas |
| 2006/0073298 | A1 | 4/2006 | Hutchinson |
| 2006/0091576 | A1 | 5/2006 | Takase |
| 2006/0094577 | A1 | 5/2006 | Mannlein |
| 2006/0095151 | A1 | 5/2006 | Mannlein |
| 2006/0100296 | A1 | 5/2006 | Wilkes |
| 2006/0108409 | A1 | 5/2006 | Pyper |
| 2006/0135679 | A1 | 6/2006 | Winowiecki |
| 2006/0135699 | A1 | 6/2006 | Li |
| 2006/0142495 | A1 | 6/2006 | Lalho |
| 2006/0148920 | A1 | 7/2006 | Musgrave |
| 2006/0151584 | A1 | 7/2006 | Wonnacott |
| 2006/0178478 | A1 | 8/2006 | Ellul |
| 2006/0198983 | A1 | 9/2006 | Patel |
| 2006/0199006 | A1 | 9/2006 | Poon |
| 2006/0199030 | A1 | 9/2006 | Liang |
| 2006/0199744 | A1 | 9/2006 | Walton |
| 2006/0199872 | A1 | 9/2006 | Prieto |
| 2006/0199884 | A1 | 9/2006 | Hoenig |
| 2006/0199887 | A1 | 9/2006 | Liang |
| 2006/0199896 | A1 | 9/2006 | Walton |
| 2006/0199897 | A1 | 9/2006 | Karjala |
| 2006/0199905 | A1 | 9/2006 | Hughes |
| 2006/0199906 | A1 | 9/2006 | Walton |
| 2006/0199907 | A1 | 9/2006 | Chang |
| 2006/0199908 | A1 | 9/2006 | Cheung |
| 2006/0199910 | A1 | 9/2006 | Walton |
| 2006/0199911 | A1 | 9/2006 | Markovich |
| 2006/0199912 | A1 | 9/2006 | Fuchs |
| 2006/0199914 | A1 | 9/2006 | Harris |
| 2006/0199930 | A1 | 9/2006 | Shan |
| 2006/0199931 | A1 | 9/2006 | Poon |
| 2006/0199933 | A1 | 9/2006 | Okamoto |
| 2006/0205833 | A1 | 9/2006 | Martinez |
| 2006/0211819 | A1 | 9/2006 | Hoenig |
| 2006/0234033 | A1 | 10/2006 | Nishikawa |
| 2006/0255049 | A1 | 11/2006 | McCarthy |
| 2006/0286325 | A1 | 12/2006 | Swoboda |
| 2006/0289609 | A1 | 12/2006 | Fritz |
| 2006/0289610 | A1 | 12/2006 | Kling |
| 2007/0000983 | A1 | 1/2007 | Spurrell |
| 2007/0010616 | A1 | 1/2007 | Kapur |
| 2007/0013110 | A1 | 1/2007 | Safian |
| 2007/0032600 | A1 | 2/2007 | Mogami |
| 2007/0056964 | A1 | 3/2007 | Holcomb |
| 2007/0065615 | A1 | 3/2007 | Odle |
| 2007/0066756 | A1 | 3/2007 | Poon |
| 2007/0078222 | A1 | 4/2007 | Chang |
| 2007/0095837 | A1 | 5/2007 | Meier |
| 2007/0112127 | A1 | 5/2007 | Soediono |
| 2007/0141188 | A1 | 6/2007 | Kim |
| 2007/0155900 | A1 | 7/2007 | Chang |
| 2007/0167315 | A1 | 7/2007 | Arriola |
| 2007/0167575 | A1 | 7/2007 | Weaver |
| 2007/0167578 | A1 | 7/2007 | Arriola |
| 2007/0202330 | A1 | 8/2007 | Peng |
| 2007/0219334 | A1 | 9/2007 | Lipishan |
| 2008/0020162 | A1 | 1/2008 | Fackler |
| 2008/0044617 | A1 | 2/2008 | Schmitz |
| 2008/0045638 | A1 | 2/2008 | Chapman |
| 2008/0095960 | A1 | 4/2008 | Schell |
| 2008/0114131 | A1 | 5/2008 | Harris |
| 2008/0118738 | A1 | 5/2008 | Boyer |
| 2008/0121681 | A1 | 5/2008 | Wiedmeyer |
| 2008/0125547 | A1 | 5/2008 | Swogger |
| 2008/0138593 | A1 | 6/2008 | Martinez |
| 2008/0156857 | A1 | 7/2008 | Johnston |
| 2008/0177242 | A1 | 7/2008 | Chang |
| 2008/0185301 | A1 | 8/2008 | Merical |
| 2008/0187694 | A1 | 8/2008 | Alvarez |
| 2008/0227877 | A1 | 9/2008 | Stadlbauer |
| 2008/0234435 | A1 | 9/2008 | Chang |
| 2008/0246193 | A1 | 10/2008 | Smits |
| 2008/0260996 | A1 | 10/2008 | Heilman |
| 2008/0261016 | A1 | 10/2008 | Tamada |
| 2008/0269388 | A1 | 10/2008 | Markovich |
| 2008/0280517 | A1 | 11/2008 | Chang |
| 2008/0281037 | A1 | 11/2008 | Karjala |
| 2008/0302800 | A1 | 12/2008 | Chou |
| 2008/0311812 | A1 | 12/2008 | Arriola |
| 2009/0041965 | A1 | 2/2009 | Kochem |
| 2009/0042472 | A1 | 2/2009 | Poon |
| 2009/0068402 | A1 | 3/2009 | Yoshida |
| 2009/0069523 | A1 | 3/2009 | Itakura |
| 2009/0076216 | A1 | 3/2009 | Kiss |
| 2009/0096130 | A1 | 4/2009 | Jones |
| 2009/0105417 | A1 | 4/2009 | Walton |
| 2009/0110855 | A1 | 4/2009 | McCarthy |
| 2009/0110944 | A1 | 4/2009 | Aguirre |
| 2009/0170679 | A1 | 7/2009 | Hartjes |
| 2009/0220711 | A1 | 9/2009 | Chang |
| 2009/0247033 | A1 | 10/2009 | Peng |
| 2009/0263645 | A1 | 10/2009 | Barger |
| 2009/0269566 | A1 | 10/2009 | Eichbauer |
| 2009/0275690 | A1 | 11/2009 | Weaver |
| 2009/0324914 | A1 | 12/2009 | Lieng |
| 2010/0000183 | A1 | 1/2010 | Nantin |
| 2010/0025073 | A1 | 2/2010 | Fagrell |
| 2010/0028568 | A1 | 2/2010 | Weaver |
| 2010/0029827 | A1 | 2/2010 | Ansems |
| 2010/0040818 | A1 | 2/2010 | Farha |
| 2010/0055358 | A1 | 3/2010 | Weaver |
| 2010/0069574 | A1 | 3/2010 | Shan |
| 2010/0093942 | A1 | 4/2010 | Silvis |
| 2010/0108695 | A1 | 5/2010 | Zhang |
| 2010/0112247 | A1 | 5/2010 | Jari |
| 2010/0116422 | A1 | 5/2010 | Vaideeswaran |
| 2010/0137118 | A1 | 6/2010 | Chang |
| 2010/0147447 | A1 | 6/2010 | Mazzarolo |
| 2010/0168267 | A1 | 7/2010 | Dang |
| 2010/0181328 | A1 | 7/2010 | Cook |
| 2010/0181370 | A1 | 7/2010 | Berbert |
| 2010/0196610 | A1 | 8/2010 | Chang |
| 2010/0196641 | A1 | 8/2010 | Devos |
| 2010/0215879 | A1 | 8/2010 | Dooley |
| 2010/0215934 | A1 | 8/2010 | Fabian Mariezkurrena |
| 2010/0227092 | A1 | 9/2010 | Semersky |
| 2010/0240818 | A1 | 9/2010 | Walton |
| 2010/0247830 | A1 | 9/2010 | Hernandez |
| 2010/0279046 | A1 | 11/2010 | Ashman |
| 2010/0279571 | A1 | 11/2010 | Poon |
| 2010/0282759 | A1 | 11/2010 | Eckhardt |
| 2010/0324202 | A1 | 12/2010 | Bafna |
| 2011/0003929 | A1 | 1/2011 | Soediono |
| 2011/0008570 | A1 | 1/2011 | Seth |
| 2011/0009513 | A1 | 1/2011 | Chaudhary |
| 2011/0014835 | A1 | 1/2011 | Sieradzki |
| 2011/0091688 | A1 | 4/2011 | Maurer |
| 2011/0104414 | A1 | 5/2011 | Onodera |
| 2011/0111150 | A1 | 5/2011 | Matsuzaki |
| 2011/0118370 | A1 | 5/2011 | Jiang |
| 2011/0118416 | A1 | 5/2011 | Arriola |
| 2011/0124818 | A1 | 5/2011 | Arriola |
| 2011/0129656 | A1 | 6/2011 | Zur |
| 2011/0136959 | A1 | 6/2011 | Brandstetter |
| 2011/0144240 | A1 | 6/2011 | Harris |
| 2011/0172363 | A1 | 7/2011 | Share |
| 2011/0180509 | A1 | 7/2011 | Hutchinson |
| 2011/0192750 | A1 | 8/2011 | Kokin |
| 2011/0217492 | A1 | 9/2011 | Stamatiou |
| 2011/0229693 | A1 | 9/2011 | Maurer |
| 2011/0230108 | A1 | 9/2011 | Arriola |
| 2011/0250384 | A1 | 10/2011 | Sumi |
| 2011/0285048 | A1 | 11/2011 | Barger |
| 2011/0293914 | A1 | 12/2011 | Maurer |
| 2011/0318560 | A1 | 12/2011 | Yun |
| 2012/0004087 | A1 | 1/2012 | Tharayil |
| 2012/0024459 | A1 | 2/2012 | Igarashi |
| 2012/0024873 | A1 | 2/2012 | Roseblade |

(56) References Cited

U.S. PATENT DOCUMENTS

| | | | |
|---|---|---|---|
| 2012/0028065 | A1 | 2/2012 | Bafna |
| 2012/0041148 | A1 | 2/2012 | Bafna |
| 2012/0043374 | A1 | 2/2012 | Lemon |
| 2012/0045603 | A1 | 2/2012 | Zerafati |
| 2012/0061886 | A1 | 3/2012 | Sumi |
| 2012/0076965 | A1 | 3/2012 | Silvers |
| 2012/0100356 | A1 | 4/2012 | Ohlsson |
| 2012/0103858 | A1 | 5/2012 | Schmidt |
| 2012/0108714 | A1 | 5/2012 | Wittner |
| 2012/0108741 | A1 | 5/2012 | Wu |
| 2012/0108743 | A1 | 5/2012 | Krishnaswamy |
| 2012/0125926 | A1 | 5/2012 | Iyori |
| 2012/0132699 | A1 | 5/2012 | Mann |
| 2012/0178896 | A1 | 7/2012 | Bastioli |
| 2012/0184657 | A1 | 7/2012 | Lake |
| 2012/0193365 | A1 | 8/2012 | Humphries |
| 2012/0199278 | A1 | 8/2012 | Lee |
| 2012/0199279 | A1 | 8/2012 | Lee |
| 2012/0199641 | A1 | 8/2012 | Hsieh |
| 2012/0214890 | A1 | 8/2012 | Senda |
| 2012/0220730 | A1 | 8/2012 | Li |
| 2012/0225961 | A1 | 9/2012 | Vanhorn |
| 2012/0237734 | A1 | 9/2012 | Maurer |
| 2012/0267368 | A1 | 10/2012 | Wu |
| 2012/0270039 | A1 | 10/2012 | Tynys |
| 2012/0295994 | A1 | 11/2012 | Bernreitner |
| 2012/0318805 | A1 | 12/2012 | Leser |
| 2012/0318807 | A1 | 12/2012 | Leser |
| 2012/0318859 | A1 | 12/2012 | Leser |
| 2013/0023598 | A1 | 1/2013 | Song |
| 2013/0026128 | A1 | 1/2013 | Beck |
| 2013/0032963 | A1 | 2/2013 | Tokiwa |
| 2013/0052358 | A1 | 2/2013 | Alessandro |
| 2013/0052385 | A1 | 2/2013 | Leser |
| 2013/0059102 | A1 | 3/2013 | Torchio |
| 2013/0085244 | A1 | 4/2013 | Zhao |
| 2013/0140320 | A1 | 6/2013 | Nadella |
| 2013/0143975 | A1 | 6/2013 | Cassidy |
| 2013/0216744 | A1 | 8/2013 | Liao |
| 2013/0280517 | A1 | 10/2013 | Buehring |
| 2013/0303645 | A1 | 11/2013 | Dix |
| 2014/0037880 | A1 | 2/2014 | Siddhamalli |
| 2014/0116977 | A1 | 5/2014 | Minnette |
| 2014/0131430 | A1 | 5/2014 | Leser |
| 2014/0166738 | A1 | 6/2014 | Euler |
| 2014/0167311 | A1 | 6/2014 | Leser |
| 2014/0228498 | A1 | 8/2014 | Prince |
| 2014/0262916 | A1 | 9/2014 | Minnette |
| 2014/0263367 | A1 | 9/2014 | Robertson |
| 2014/0272229 | A1 | 9/2014 | Xing |
| 2014/0309320 | A1 | 10/2014 | Prince |
| 2014/0361013 | A1 | 12/2014 | Perick |
| 2014/0377512 | A1 | 12/2014 | Rogers |
| 2015/0014879 | A1 | 1/2015 | Sun |
| 2015/0051302 | A1 | 2/2015 | Leser |
| 2015/0061194 | A1 | 3/2015 | Sun |
| 2015/0250342 | A1 | 9/2015 | Euler |
| 2015/0258771 | A1 | 9/2015 | Leser |
| 2015/0284521 | A1 | 10/2015 | Abubakar |
| 2015/0307264 | A1 | 10/2015 | Boswell |
| 2015/0307679 | A1 | 10/2015 | Lee |
| 2016/0082621 | A1 | 3/2016 | Li |
| 2016/0082692 | A1 | 3/2016 | Li |
| 2016/0082693 | A1 | 3/2016 | Li |
| 2016/0083569 | A1 | 3/2016 | Sun |
| 2016/0089852 | A1 | 3/2016 | Lindenfelzer |
| 2016/0137804 | A1 | 5/2016 | Van Der Ven et al. |
| 2016/0257030 | A1 | 9/2016 | Sun |
| 2016/0257052 | A1 | 9/2016 | Sun |
| 2016/0257799 | A1 | 9/2016 | Sun |
| 2016/0355659 | A1 | 12/2016 | Sun |
| 2017/0002117 | A1 | 1/2017 | Layman |
| 2017/0174865 | A1 | 6/2017 | Dhaliwal |
| 2017/0232715 | A1 | 8/2017 | Fehr |
| 2018/0099798 | A1 | 4/2018 | Lehrter |
| 2018/0201752 | A1 | 7/2018 | Lin |
| 2018/0354237 | A1 | 12/2018 | De Jonge et al. |
| 2019/0045954 | A1 | 2/2019 | Euler |
| 2019/0047265 | A1 | 2/2019 | Euler |
| 2020/0361184 | A1 | 11/2020 | Saniei |

FOREIGN PATENT DOCUMENTS

| | | | |
|---|---|---|---|
| CA | 2078123 | | 9/1991 |
| CA | 2291607 | A1 | 6/2000 |
| CA | 2765489 | | 12/2010 |
| CA | 2752335 | | 3/2012 |
| CN | 1118239 | A | 3/1996 |
| CN | 1288427 | | 3/2001 |
| CN | 1484602 | | 3/2004 |
| CN | 1495100 | | 5/2004 |
| CN | 1523051 | | 8/2004 |
| CN | 1942370 | | 4/2007 |
| CN | 1984763 | | 6/2007 |
| CN | 101044195 | | 9/2007 |
| CN | 101098918 | A | 1/2008 |
| CN | 101104716 | | 1/2008 |
| CN | 101352923 | | 1/2009 |
| CN | 101370873 | | 2/2009 |
| CN | 101429309 | | 5/2009 |
| CN | 101456927 | A | 6/2009 |
| CN | 101531260 | | 9/2009 |
| CN | 101538387 | | 9/2009 |
| CN | 101560307 | | 10/2009 |
| CN | 201347706 | Y | 11/2009 |
| CN | 102030960 | | 4/2011 |
| CN | 102070841 | A | 5/2011 |
| CN | 102089370 | | 6/2011 |
| CN | 102115561 | A | 7/2011 |
| CN | 102245368 | | 11/2011 |
| CN | 102313084 | | 1/2012 |
| CN | 102391570 | | 3/2012 |
| CN | 102762350 | | 10/2012 |
| CN | 102892678 | A | 1/2013 |
| CN | 103113653 | A | 5/2013 |
| DE | 2831240 | | 1/1980 |
| DE | 2831240 | C | 3/1988 |
| DE | 102006025612 | A1 | 11/2007 |
| DE | 102008031812 | | 12/2009 |
| EP | 0001791 | | 5/1979 |
| EP | 0086869 | A1 | 8/1983 |
| EP | 0161597 | | 11/1985 |
| EP | 0318167 | A2 | 5/1989 |
| EP | 0329490 | A2 | 8/1989 |
| EP | 0520028 | | 12/1992 |
| EP | 0570221 | | 11/1993 |
| EP | 0588321 | | 3/1994 |
| EP | 0659647 | | 6/1995 |
| EP | 713481 | A1 | 5/1996 |
| EP | 0851805 | A1 | 7/1998 |
| EP | 879844 | | 11/1998 |
| EP | 0851805 | B1 | 12/1998 |
| EP | 960826 | A2 | 1/1999 |
| EP | 0972727 | | 1/2000 |
| EP | 1040158 | A1 | 10/2000 |
| EP | 1057608 | A2 | 12/2000 |
| EP | 1072389 | A1 | 1/2001 |
| EP | 0796199 | | 2/2001 |
| EP | 0940240 | | 10/2002 |
| EP | 1308263 | A2 | 5/2003 |
| EP | 1323779 | | 7/2003 |
| EP | 1449634 | A1 | 8/2004 |
| EP | 1479716 | | 11/2004 |
| EP | 1472087 | | 4/2006 |
| EP | 1666530 | | 6/2006 |
| EP | 1704047 | | 9/2006 |
| EP | 1741744 | | 1/2007 |
| EP | 1749634 | A2 | 2/2007 |
| EP | 1754744 | | 2/2007 |
| EP | 1921023 | A1 | 5/2008 |
| EP | 1939099 | A1 | 7/2008 |
| EP | 0851805 | | 12/2008 |
| EP | 2141000 | A2 | 1/2010 |
| EP | 2266894 | | 12/2010 |

(56) References Cited

FOREIGN PATENT DOCUMENTS

| | | | |
|---|---|---|---|
| EP | 2386584 | A1 | 11/2011 |
| EP | 2386601 | | 11/2011 |
| EP | 1040158 | | 4/2012 |
| EP | 1749635 | | 9/2012 |
| EP | 2323829 | | 10/2012 |
| EP | 2554374 | A1 | 2/2013 |
| EP | 2141000 | | 2/2014 |
| EP | 2720954 | | 4/2014 |
| EP | 2912142 | A4 | 3/2016 |
| GB | 1078326 | | 8/1967 |
| GB | 2322100 | | 8/1998 |
| GB | 2485077 | A | 5/2012 |
| GB | 2504166 | A | 1/2014 |
| GB | 2506796 | A | 4/2014 |
| JP | 52123043 | U | 10/1977 |
| JP | S5641146 | A | 4/1981 |
| JP | 58029618 | | 2/1983 |
| JP | H02129040 | U | 5/1990 |
| JP | H02269683 | | 11/1990 |
| JP | 404278340 | A | 10/1992 |
| JP | H0543967 | | 2/1993 |
| JP | 0615751 | | 1/1994 |
| JP | 06192460 | | 7/1994 |
| JP | H06322167 | A | 11/1994 |
| JP | H08067758 | | 3/1996 |
| JP | 410000748 | A | 1/1998 |
| JP | 2000128255 | | 5/2000 |
| JP | P310847 | | 12/2000 |
| JP | 2001138378 | A | 5/2001 |
| JP | 2001139717 | A | 5/2001 |
| JP | 2001310429 | | 11/2001 |
| JP | 2001315277 | | 11/2001 |
| JP | 2001329099 | A | 11/2001 |
| JP | 2001348454 | A | 12/2001 |
| JP | 2002011838 | A * | 1/2002 |
| JP | 2003292663 | | 10/2003 |
| JP | 2003321566 | | 11/2003 |
| JP | 200418101 | | 1/2004 |
| JP | 2004018101 | | 1/2004 |
| JP | 2004067820 | A | 3/2004 |
| JP | 2004137377 | A | 5/2004 |
| JP | 2004168421 | A | 6/2004 |
| JP | 2004330464 | | 11/2004 |
| JP | 2005053494 | A | 3/2005 |
| JP | 2005138508 | A | 6/2005 |
| JP | 2005272542 | | 10/2005 |
| JP | 2005290329 | A | 10/2005 |
| JP | 2006008988 | A | 1/2006 |
| JP | 2006096390 | | 4/2006 |
| JP | 2006130814 | A | 5/2006 |
| JP | 2006142008 | A | 6/2006 |
| JP | 200791323 | | 4/2007 |
| JP | 2007154172 | | 6/2007 |
| JP | 3140847 | | 4/2008 |
| JP | 2008162700 | | 7/2008 |
| JP | 2008213491 | A | 9/2008 |
| JP | 2009504858 | | 2/2009 |
| JP | 2009066856 | A | 4/2009 |
| JP | 2009126922 | | 6/2009 |
| JP | 2009138029 | | 6/2009 |
| JP | 2009190756 | A | 8/2009 |
| JP | 2010173258 | | 8/2010 |
| JP | 2011104890 | | 6/2011 |
| JP | 2011132420 | A | 7/2011 |
| JP | 2011207958 | A | 10/2011 |
| JP | 2011212968 | A | 10/2011 |
| JP | 2012526006 | | 10/2012 |
| JP | 2013203886 | | 10/2013 |
| JP | 2018002213 | A | 1/2018 |
| KR | 100306320 | | 10/2001 |
| KR | 2003036558 | | 5/2003 |
| KR | 2004017234 | | 2/2004 |
| KR | 101196666 | | 11/2012 |
| MX | 2004008491 | A | 7/2005 |
| MX | 347519 | | 4/2014 |
| RU | 2232781 | C2 | 7/2004 |
| RU | 2254347 | C2 | 6/2005 |
| TW | 393427 | | 6/2000 |
| TW | 200404848 | | 4/2004 |
| TW | M362648 | | 8/2009 |
| TW | 201021747 | A | 6/2010 |
| TW | 201309757 | | 3/2013 |
| WO | 1991013933 | | 9/1991 |
| WO | 9413460 | | 6/1994 |
| WO | 1994013460 | A1 | 6/1994 |
| WO | 9504709 | | 2/1995 |
| WO | 9729150 | A1 | 8/1997 |
| WO | 1998016575 | | 4/1998 |
| WO | 9932544 | A1 | 7/1999 |
| WO | 0002800 | | 1/2000 |
| WO | 0119733 | | 3/2001 |
| WO | 0132758 | | 5/2001 |
| WO | 0140374 | A2 | 6/2001 |
| WO | 0153079 | | 7/2001 |
| WO | 0170859 | A2 | 9/2001 |
| WO | 0234824 | | 5/2002 |
| WO | 2003066320 | | 8/2003 |
| WO | 03076497 | | 9/2003 |
| WO | 03099913 | | 12/2003 |
| WO | 2004104075 | | 12/2004 |
| WO | 2005097878 | | 10/2005 |
| WO | 2006042908 | | 4/2006 |
| WO | 2006124369 | | 11/2006 |
| WO | 2007003523 | A1 | 1/2007 |
| WO | 2007020074 | | 2/2007 |
| WO | 2007068766 | | 6/2007 |
| WO | 2007090845 | A2 | 8/2007 |
| WO | 2008030953 | | 3/2008 |
| WO | 2008038750 | | 4/2008 |
| WO | 2008045944 | | 4/2008 |
| WO | 2008057878 | | 5/2008 |
| WO | 2008080111 | | 7/2008 |
| WO | 2008145267 | | 12/2008 |
| WO | 2009035580 | | 3/2009 |
| WO | 2010006272 | | 1/2010 |
| WO | 2010015673 | | 2/2010 |
| WO | 2010019146 | | 2/2010 |
| WO | 2010076701 | A1 | 7/2010 |
| WO | 2010111869 | | 10/2010 |
| WO | 2010151724 | | 12/2010 |
| WO | 2011005856 | | 1/2011 |
| WO | 2011036272 | A2 | 3/2011 |
| WO | 2011038081 | A1 | 3/2011 |
| WO | 2011076637 | | 6/2011 |
| WO | 2011141044 | | 11/2011 |
| WO | 2011144705 | | 11/2011 |
| WO | 2012020106 | A1 | 2/2012 |
| WO | 2012025584 | A1 | 3/2012 |
| WO | 2012044730 | | 4/2012 |
| WO | 2012055797 | | 5/2012 |
| WO | 2012099682 | | 7/2012 |
| WO | 2012173873 | | 12/2012 |
| WO | 2012174422 | | 12/2012 |
| WO | 2012174567 | A1 | 12/2012 |
| WO | 2012174567 | A2 | 12/2012 |
| WO | 2012174568 | A2 | 12/2012 |
| WO | 2013032552 | | 3/2013 |
| WO | 2012174567 | A3 | 4/2013 |
| WO | 2013101301 | | 7/2013 |
| WO | 20140066761 | | 5/2014 |
| WO | 2014099335 | | 6/2014 |
| WO | 2015024018 | | 2/2015 |

OTHER PUBLICATIONS

ASTM D3763-86, an American Society for Testing of Materials (ASTM), 'Standard Method for High-Speed Puncture Properties of Plastics Using Load and Displacement Sensors' (1986 Edition), 5 pages.

ASTM D1922-93, an American Society for Testing of Materials (ASTM), "Standard Method for Propagation Tear Resistance of Plastic Film And Thin Sheeting by Pendulum Method" (1993 Edition), 5 pages.

(56) References Cited

OTHER PUBLICATIONS

Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., 'Applicability of the Transient Plane Source Method To Measure the Thermal Conductivity of Low- Density Polyethylene Foams', Journal of Polymer Science: Part B: Polymer Physics, vol. 42 (2004), 1226-1234.
The Burn Foundation, 'Scald Burns', available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
'Power of a Microwave Oven', available at https://web.archive.org/web/20071010183358/http://hypertextbook.com/facts/2007/TatyanaNektalova.shtml, dated Oct. 10, 2007, accessed on Feb. 5, 2016.
Health Physics Society, 'Microwave Oven Q & A', available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., 'Heat Transfer in Polypropylene-Based Foams Produced Using Different Foaming Processes', Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry's Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
Third Party Submission Under 37 CFR 1.290 filed on May 12, 2016 in U.S. Appl. No. 14/739,510.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
English translation of Japanese Office Action for Japanese Application No. 2014-516089, dated May 10, 2016.
Office Action dated Mar. 10, 2016 for U.S. Appl. No. 14/462,073.
Office Action dated Jun. 10, 2016 for U.S. Appl. No. 14/188,504.
Singapore Office Action and Written Opinion dated May 27, 2016 for Singapore Application No. 11201504327V.
Singapore Office Action and Written Opinion dated May 27, 2016 for Singapore Application No. 11201504330U.
Notice of Acceptance dated Jun. 10, 2016 for Australian Application No. 2012302251.
Singapore Office Action and Written Opinion dated May 26, 2016 for Singapore Application No. 11201504333Y.
Office Action for Chinese Patent Application No. 201380064860.5, dated Jun. 2, 2016 including English language summary, 13 pages.
Australian First Patent Examination Report for Application No. 2012363114, dated Jun. 15, 2016, 4 pages.
Office Action dated Jun. 30, 2016 for U.S. Appl. No. 14/106,276.
Extended European Search Report for European Application No. 13862331.9-1708/2931627 PCT/US2013/074923, dated Jul. 7, 2016.
English translation of Russian Office Action for Application Serial No. 2014101298, dated Jul. 22, 2016, 7 pages.
Australian First Patent Examination Report for Application No. 2013334155, dated May 23, 2016, 4 pages.
Office Action for Chinese Patent Application No. 201380065116.7, dated Jun. 28, 2016, including English language summary, 12 pages.
Office Action dated Jul. 28, 2016 for U.S. Appl. No. 14/211,553.
British Examination Report for GB Application No. GB1400762.9 (BP-354 ||), sent on Aug. 8, 2016, 2 pages.
Extended European Search Report for European Application No. 13863546.1 established Jul. 12, 2016, BP-376 ||, 7 pages.
Extended European Search Report for European Application No. 13863308.6 mailed Jul. 19, 2016, BP-374 ||, 8 pages.
Indian First Examination Report for Indian Patent App. No. 201617000386, dated Oct. 16, 2020, BP-422 IN ||, 7 pages.
Canadian Office Action for Canadian Patent App. No. 2918306 dated Oct. 30, 2020, BP-423 CA ||, 4 pages.
Canadian Office Action for Canadian Patent App. No. 2918306 dated Jul. 28, 2021, BP-423 CA ||, 3 pages.
Indian First Examination Report for Indian Patent App. No. 2016/17003143 dated Sep. 11, 2020, BP-423 IN ||, 5 pages.
Mexican Office Action for MX/a/2016/002490 dated Oct. 22, 2020, BP-423 MX ||, 7 pages.
Mexican Office Action for MX/a/2016/002490 dated Jun. 22, 21, BP-423 MX ||, 8 pages.
First Examination Report for Indiana App. No. 201617007243 dated Dec. 16, 2019, BP-425 IN ||, 6 pages.
Indian First Examination Report for Indian App. No. 201317001026, dated Mar. 20, 2020, BP-432 IN ||, 6 pages.
Mexican Office action for Mexican Patent App. No. MX/a/2016/002374 dated Mar. 3, 2021, 7 pages.
Second Mexican Office action for Mexican Patent App. No. MX/a/2016/002374 dated Aug. 2, 2021, 9 pages.
First Examination Report for Indian App. No. 201617005271, sent Feb. 11, 2020, BP-424 IN ||.
Office Action dated Jan. 6, 2020, for U.S. Appl. No. 15/902,489, BP-473 US-CON ||, 22 pages.
Office Action dated Jul. 16, 2020 for U.S. Appl. No. 15/902,489, BP-473 US-CON || (pp. 1-20).
Office Action dated Aug. 31, 2020 for U.S. Appl. No. 16/356,423, BP-422 US-CON || (pp. 1-14).
International (PCT) Search Report and Written Opinion for PCT/US21/47516 dated Jan. 24, 22, BP-527 PCT ||, 22 pages.

(56) References Cited

OTHER PUBLICATIONS

Dow (TM) HDPE DMDA-8007 NT7 Technical Information, Dow Chemical Company, 2011. (Year: 2011).
Office Action (Non-Final Rejection) dated Jul. 11, 2022 for U.S. Appl. No. 17/410,386, BP-527 US-U ||, (pp. 1-12).
Office Action (Non-Final Rejection) dated Dec. 23, 2022 for U.S. Appl. No. 17/135,048, BP-432 US-CON1 ||, (pp. 1-14).
Office Action (Final Rejection) dated Jan. 10, 2023 for U.S. Appl. No. 17/410,386, BP-527 US-U ||(pp. 1-12).
Office Action (Final Rejection) dated May 31, 2023 for U.S. Appl. No. 17/135,048 (pp. 1-15).
Office Action (Non-Final Rejection) dated Jun. 20, 2023 for U.S. Appl. No. 17/410,386 , BP-527 US-U ||(pp. 1-18).
Office Action (Non-Final Rejection) dated Sep. 8, 2023 for U.S. Appl. No. 17/075,183 (pp. 1-11).
English machine translation for JP2001-018943 (2001). (Year: 2001).
Office Action (Non-Final Rejection) dated Sep. 27, 2023 for U.S. Appl. No. 17/135,048 (pp. 1-13).
Office Action (Final Rejection) dated Nov. 15, 2023 for U.S. Appl. No. 17/410,386, BP-527 US-U ||(pp. 1-19).
Office Action (Final Rejection) dated Feb. 8, 2024 for U.S. Appl. No. 17/075,183, BP-473 US-CON ||(pp. 1-9).
Office Action (Final Rejection) dated Apr. 12, 2024 for U.S. Appl. No. 17/135,048 (pp. 1-13).
International Search Report dated Jul. 29, 2013, relating to International Application No. PCT/US2012/043016, 25 pages.
International Search Report and Written Opinion dated Sep. 17, 2013, relating to International Application No. PCT/US2012/041395.
Daploy HMS Polypropylene for Foam Extrusion, 20 pages, BOREALIS Borouge Shaping the Future with Plastics, Published 2010, www.borealisgroup.com, www.borouge.com, Vienna, Austria.
Certified English translation of EP0086869.
English translation of Spanish Search Report of Application No. 201490025, dated Apr. 20, 2015.
European Search Report of Application No. 12861450.0, dated Nov. 21, 2014.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jan. 19, 2015, relating to International Application No. PCT/US2014/059312.
International Search Report and Written Opinion dated Jul. 3, 2014, relating to International Application No. PCT/US2014/025697.
International Search Report dated Feb. 26, 2013, relating to International Application No. PCT/US2012/043018.
International Search Report dated Jan. 19, 2015, relating to International Application No. PCT/US2014/059216.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
International Search Report dated Nov. 7, 2014, relating to International Application No. PCT/US2014/51508.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of EP0086869.
Machine English translation of JP 2006-130814.
Naguib et al., "Fundamental Foaming Mechanisms Governing the vol. Expansion of Extruded Polypropylene Foams," Journal of Applied Polymer Science, vol. 91, pp. 2661-2668, 2004 (10 pages).
New Zealand First Examination Report for Application No. 619616 dated Oct. 10, 2014.
New Zealand First Examination Report for Application No. 621219 dated Nov. 17, 2014.
Office Action dated Apr. 10, 2015 for U.S. Appl. No. 14/106,358.
Office action dated Apr. 11, 2014 for U.S. Appl. No. 13/526,417.
Office Action dated Apr. 14, 2015 for U.S. Appl. No. 14/106,212.
Office Action dated Apr. 30, 2015 for U.S. Appl. No. 14/462,073.
Office Action dated Aug. 19, 2014 for Chinese Application No. 201280035667.4.
Office Action dated Aug. 21, 2014 for U.S. Appl. No. 13/526,454.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Office Action dated Jul. 25, 2014 for U.S. Appl. No. 13/525,640.
Office Action dated Jun. 23, 2015 for U.S. Appl. No. 13/525,640.
Office Action dated Oct. 10, 2014 for U.S. Appl. No. 14/106,358.
Office Action dated Oct. 16, 2014 for U.S. Appl. No. 14/106,212.
Office Action dated Sep. 25, 2014 for U.S. Appl. No. 13/526,417.
Singapore Office Action dated Dec. 18, 2014 for Singapore Application No. 2014002273.
Spanish Search Report for Application No. 201490025, dated Apr. 20, 2015.
Spanish Search Report of Application No. 201390099, dated Feb. 9, 2015.
Third-Party Submission Under 37 CFR 1.290 filed on Dec. 9, 2014 in U.S. Appl. No. 14/063,252.
Third-Party Submission Under 37 CFR 1.290 filed on Feb. 26, 2015 in U.S. Appl. No. 13/491,007.
Third Party Submission Under 37 CFR 1.290 in U.S. Appl. U.S. Appl. No. 14/188,504 submitted May 11, 2015 and May 27, 2015 (43 pages).
Wang et al., "Extending PP's Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
Office Action Chinese Patent Application No. 201280051426.9 dated Jul. 23, 2015.
Office Action dated May 19, 2015 for Chinese Application No. 201280035667.4.
Extended European Search Report for European App. No. 17181231.6 sent on Nov. 7, 2017, BP-354 EP-DIV1 ||, 5 pages.
Office Action dated Nov. 14, 2017 for U.S. Appl. No. 14/862,552; (pp. 1-14).
"All You Need to Know About Polypropylene, Part 1," Creative Mechanisms Blog. (Year: 2016).
Rejection Decions for Chinese Patent App. No. 201280051426.9 received on Nov. 14, 2017, BP-356 CN ||, 8 pages.
ASTM D883-17, an American Society for Testing and Materials "Standard Terminology Relating to Plastics," 2017, 16 pages.
ASTM D4101-14, an American Society for Testing and Materials "Standard Standard Specification for Polypropylene Injection and Extrusion Materials," 2014, 17 pages.
Lyondellbasell, Polypropylene, Impact Copolymer, https://www.lyondellbasell.com/en/products-technology/polymers/resin-type/polypropylene-impact-copolymer/, accessed on Nov. 29, 2017, 5 pages.
ASTM D883-12e1, an American Society for Testing and Materials "Standard Terminology Relating to Plastics," 2012, 16 pages.

(56) References Cited

OTHER PUBLICATIONS

ASTM D4101-11, an American Society for Testing and Materials "Standard Standard Specification for Polypropylene Injection and Extrusion Materials," 2011, 17 pages.
Chinese Office Action for Chinese App. No. 201380065781.6 dated Nov. 28, 2017, BP-395 CN ||, 10 pages.
European Examination Report for European App. No. 13849152.7 sent Jan. 4, 2018, BP-395 EP ||, 3 pages.
Office Action dated Jan. 16, 2018 for U.S. Appl. No. 15/388,319; || (BP-428) (pp. 1-13).
Office Action dated Jan. 19, 2018 for U.S. Appl. No. 15/004,263; || (pp. 1-18).
Extended European Search Report for European App. No. 14836418.5 mailed Jan.30, 2018, BP-428 EP ||, 4 pages.
Canadian office action for Canadian App. No. 2,842,325 dated Jan. 24, 2018, BP-352 CA ||, 4 pages.
Japanese Office Action for Japanese App. No. 2016-501945 sent Jan. 23, 2018, BP-392 JP ||, 17 pages.
Canadian Examiner's Report for Canadian App. No. 2845225 dated Feb. 6, 2018, BP-356 CA ||, 5 pages.
Taiwan Office Action for Taiwan App. No. 103128338 received on Feb. 21, 2018, BP-428 TW ||, 9 pages.
Japanese Office Action for Japanese Patent App. No. 2015-539838 sent Feb. 27, 2018, BP-395 JP ||, 10 pages.
Taiwan Office Action for Taiwan App. No. 102138786 received on Mar. 1, 2018, BP-395 TW ||, 20 pages.
Chinese Office Action mailed Mar. 22, 18 for Chinese Patent Application 201480007369.3, BP-392 || 237578, 5 pages.
Office Action dated Mar. 29, 2018 for U.S. Appl. No. 14/862,552, BP-450 || (pp. 1-10).
Chinese Office Action for Chinese Application No. 201380065127.5 (BP-374 ||), sent on Jul. 26, 2016, 11 pages.
Taiwan Office Action for Taiwan App. No. 101121655 received Apr. 25, 2018, BP-354 TW ||, 6 pages, (no English translation available).
"All you need to know about Polypropylene, Part 1," Creative Mechanisms. (Year: 2017), 6 pages.
"Polypropylene, Impact Copolymer," Lyondell Basell. (Year: 2017).
Australian Notice of Acceptance for Australian App. No. 2016204692 received on Apr. 3, 2018, BP-356 AU-DIV1 ||, 3 pages.
First Substantive Examiantion Report for European App. No. 14775300.8 sent Apr. 6, 2018, BP-392 EP ||, 4 pages.
Office Action dated Jun. 6, 2018 for U.S. Appl. No. 15/388,319 (pp. 1-19).
Notice of Opposition for EP2751194 submitted May 28, 2018, BP-356 EP ||, 11 pages.
Grounds of Opposition for EP2751194 submitted May 28, 2018, BP-356 EP ||, 40 pages.
Pasquini, Nello, "Polypropylene Handbook," Carl Hanser Verlag, 2005, 7 pages.
Himont, Pro-fay PF814 brochure, 1992, 1 page.
Maier et al., "Polypropylene: The Definitive User's Guide and Databook" Plastics Design Library, 1998, 19 pages.
Gachter et al., "Taschenbuch der Kunststoff-Additive" Carl Hanser Verlag, 1983, 17 pages, (no English translation available).
Wypych, "Handbook of Antiblocking, Release, and Slip Additives" ChemTec Publishing, 2011, 10 pages.
Wiesner et al. "The Right Chemical Foaming Agent for Your Application" The Sixth International Conference "Blowing Agents and Foaming Processes 2004", 11 pages.
Hydrocerol—Chemical Foaming and Nucleating Agents, 2007, 8 pages.
Montell at K98—presentation of extrusion line, 1998, 2 pages.
Montell Polyolefins "PP meets foam in sheet—Pro-fax PF-814 paves the way to PP foam growth", available at least by May 28, 2018, 4 pages.
Glossary of Terms for the chemical Fabrics & Film Industry, available at least by May 28, 2018, 5 pages.
ASTM D 883-08, Standard Terminology Relating to Plastics, 2008, 15 pages.
ASTM D 1922-93, Standard Test Method for Propagation Tear Resistance of Plastic Film and Thin Sheeting by Pendulum Method, 1993, 5 pages.
ASTM D3763-02, Standard Test Method for High Speed Puncture Properties of Plastics Using Load and Displacement SEnsors, 2002, 10 pages.
Tolinski, "Additives for Polyolefins: Getting the Most Out of Polypropylene, Polyethylene, and TPO" Elsevier, 2009, 25 pages.
Borealis, DaployTM HMS Polypropylene for Foam Extrusion, 2007, 20 pages.
Borealis, DaployTM HMS Polypropylene for Foam Extrusion, 2010, 20 pages.
Documents from Inter Parte Review of U.S. Pat. No. 8,883,280, entered Jan. 26, 2016, 26 pages.
Clarian, Technical Product Information "Hydrocerol CF40E", 2004, 1 page.
Clariant, Technical Product Information "Hydrocerol CF20E", 2004, 6 pages.
Clariant, Data sheet Hydrocerol CT516, 2004, 5 pages.
Jan-Erik Wegner, Affidavit regarding Hydrocerol, available at least by May 28, 2018, 22 pages.
Borealis HC600TF, 2008, 3 pages.
Borealis HC205TF, 2007, 3 pages.
Isplen codes, available at least by May 28, 2018, 1 page.
Quimica Chemicals—Isplen Polypropylene Compounds, brochure Apr. 2010, 20 pages.
Rychly, J. et al., "The effect of physical parameters of isotactic polypropylene on its oxidisability measured by chemiluminescence method. Contribution to the spreading phenomenon" Polymer Degradation and Stability, vol. 71, No. 2, 2001, 8 pages.
Tiemblo, P. et al., "The autoacceleration of polypropylene thermo-oxidation in reduced coordinates: effect of the oxidation temperature and of polyolefin structure" Polymer Degradation and Stability, vol. 72, No. 1, 2001, 8 pages.
Bezati, F. et al., "Addition of tracers into the polypropylene in view of automatic sorting of plastic wastes using X-ray fluorescence spectrometry" Waste Management, vol. 30, No. 4, May 2010, 6 pages.
Translation of CN101560307A, 19 pages.
Gotsis, A. D. et al., "The Effect of Long Chain Branching on the Processability of Polypropylene in Thermoforming" Polymer Engineering and Science, vol. 44, No. 5, May 2004, 10 pages.
"Product News" Daploy WB135HMS—High Melt Strength Polyproylene for Foam Extrusion, 2004, 2 pages.
Naguib, Hani E. et al., "Effects of Blending of Branched and Linear Polypropylene Materials on the Foamability" Technical Papers of the Annual Technical Conference-Society of Plastics Engineers Incorporated, 2001, 8 pages.
Antunes, Marcelo et al., "Heat Transfer in Polypropylene-Based Foams Produced Using Different Foaming Processes" Advanced Engineering Materials, vol. 11, No. 1 0, May 2009, 7 pages.
R0hne Gunhild. Foaming of Soft Polyproylene Blends. Conference Proceedings: Zlin Czech Republic, Aug. 16-18, 2000, 4 pages.
Mikell Knights, "Theres Plenty of Fizz in Foam Blow Molding" Plastics Technology, available from https:llwww.ptonline.com/articles/there%27s-plenty-of-fizz-in-foam-blow-molding, 1999, 4 pages.
Crodamide brochure 02/00, 4 pages.
Tabatabaei, Seyed H. et al., "Rheological and thermal properties of blends of a long-chain branched polypropylene and different linear polypropylenes" Chemical Engineering Science, vol. 64, No. 22, 2009, 13 pages.
Stange, Jens et al., "Rheological properties and foaming behavior of polypropylenes with different molecular structures" Journal of Rheology, vol. 50, No. 6, 2006, 18 pages.
Clariant, Cesa Slip, Sep. 2000, 6 pages.
Antunes, Marcelo et al., "Study of the cellular structure heterogeneity and anisotropy of polypropylene and polypropylene nanocomposite foams" Polymer Engineering and Science, vol. 49, No. 12, May 2009, 14 pages.
Office Action dated Jun. 22, 2018 for U.S. Appl. No. 15/004,263 (pp. 1-20).

(56) References Cited

OTHER PUBLICATIONS

Shutov, Fyodor, “Foamed Polymers. Cellular Structure and Properties”, Springer Berlin Heidelberg, Industrial Developments vol. 51, Jun. 2005, p. 176-182, 8 pages.
Canadian office action for Canadian App. No. 2842325 dated Oct. 26, 2018, BP-362 CA ||, 4 pages.
First Examination Report for Indian Patent App. No. 111/DELNP/2014 dated Apr. 22, 2019, BP-352 IN ||, 7 pages.
First Examination Report for Indian Patent App. No. 110/DELNP/2014 sent on Dec. 26, 2019, BP-354 IN ||, 8 pages.
Taiwan Office Action for Taiwan App. No. 102146298 sent Oct. 26, 2016, BP-374 TW ||, 9 pages.
Canadian Examiner’s Report for Canadian App. No. 2845225 dated Mar. 1, 2019, BP-356 CA ||, 3 pages.
Canadian Examiner’s Report for Canadian App. No. 2845225 dated Nov. 18, 19, BP-356 CA ||, 4 pages.
Canadian Examiner’s Report for Canadian App. No. 2845225 dated Dec. 2, 2020, BP-356 CA ||, 4 pages.
Borealis Product Brochure, “DaployTM HMS Polypropylene for Foam Extrusion”, 20 pages, 2010.
Canadian Examiner’s Reprot for Canadian App. No. 2845225 dated Jun. 23, 2021, BP-356 CA ||, 4 pages.
Re-examination Notification for Chinese Patent App. No. 201280051426.9 received on Feb. 11, 2019, BP-356 CN ||, 19 pages.
Second Re-examination Notification for Chinese Patent App. No. 201280051426.9 received on Oct. 8, 2019, BP-356 CN ||, 21 pages.
German Office Action for German App. No. 11 2012 00 070.2 dated Oct. 20, 2020, BP-356 DE ||, 23 pages.
German Office Action for German App. No. 11 2012 00 070.2 dated Sep. 30, 2021, BP-356 DE ||, 7pages, (No English Translation Available).
Borealis: Product Data Sheet: Polypropylene DAPLOYTM WB 140 HMS (Mar. 16, 2021), 2 pages.
English Translations of German Office Action for German App. No. 11 2012 00 070.2 dated Sep. 30, 2021, BP-356 DE ||, 6 pages.
German Office Action for German App. No. 11 2012 00 070.2 dated Dec. 23, 2022, BP-356 DE ||, 12 pages, (No. English Translation Available).
Zweifel, Hans, “Plastics Additives Handbook” Carl Hanser Verlag, 2001, 6 pages.
Examination Report for GB1405600.6 dated Oct. 15, 2019, BP-356 GB ||, 4 pages.
Indian First Examination Report for Indian Pat. App. No. 2179/DELNP/2014 date May 24, 2019, BP-356 IN ||, 6 pages.
Chinese Rejection Decision for Chinese App. No. 201380065781.6 dated Jul. 12, 2018, BP-395 CN ||, 15 pages, (No English Translation available).
English Summary of Chinese Rejection Decision for Chinese App. No. 201380065781.6 dated Jul. 12, 2018, BP-395 CN ||, 4 pages.
Indian Examination Report for Indian App. No. 3919/DELNP/2015, sent Aug. 21, 2018, BP-395 IN ||, 5 pages.
Markus Gahleitner et al., “Heterophasic Copolymers of Polypropylene: Development, Design, Principles, and Future Challenges,” Journal of Applied Polymer Science, 2013, Wiley Periodicals, 10 pages.
Sadiqali Cheruthazhekatt et al., “Multidimensional Analysis of the Complex Composition of Impact Polypropylene Copolymers: Combination of TREF, SEC-FTIR-HPer DSC, and High Temperature 2D-LC,” Macromolecules 2012, 45, 2025-2305, ACS Publications, American Chemcial Society, 10 pages.
Office Action dated Sep. 26, 2018 for U.S. Appl. No. 15/651,284, BP-354 US-CON1 ||, (pp. 1-10).
Substantive Examination Report for European App. No. 17182869.2 sent on Nov. 12, 2018, BP-356 EP-DIV1 ||, 5 pages.
Office Action dated Dec. 6, 2018 for U.S. Appl. No. 15/388,319, BP-428 US-CON1 || (pp. 1-10).
Extended European Search Report for European Patent App. No. EP21862640.6 received on Jul. 24, 2024, BP-527 EP ||, 6 pages.
Canadian Examiner’s Report for Canadian App. No. 3013576 dated Aug. 15, 2024, BP-512B CA ||, 5 pages.
Canadian Examiner’s Report for Canadian App. No. CA3170958 dated (Oct. 27, 2023), BP-356 CA-DIV1 ||, 4 pages.
Office Action (Non-Final Rejection) dated Oct. 27, 2022 for U.S. Appl. No. 17/528,650, BP-512A US-CON || (pp. 1-19).
Office Action (Non-Final Rejection) dated Dec. 8, 2022 for U.S. Appl. No. 17/136,628, BP-352 US-CON1 ||, (pp. 1-20).
Office Action (Non-Final Rejection) dated Dec. 8, 2022 for U.S. Appl. No. 17/363,551, BP-512B US-CON ||, (pp. 1-19).
Office Action dated Apr. 27, 2023 for U.S. Appl. No. 17/136,628, BP-352 US-CON || (pp. 1-23).
Office Action (Non-Final Rejection) dated Apr. 27, 2023 for U.S. Appl. No. 17/136,628 (pp. 1-22).
Office Action (Final Rejection) dated Apr. 21, 2023 for U.S. Appl. No. 17/528,650, BP-512A US-CON ||, (pp. 1-20).
Office Action (Final Rejection) dated May 4, 2023 for U.S. Appl. No. 17/363,551 (pp. 1-19).
Office Action (Final Rejection) dated Sep. 7, 2023 for U.S. Appl. No. 17/136,628 (pp. 1-24).
Office Action (Non-Final Rejection) dated Sep. 13, 2023 for U.S. Appl. No. 17/363,551 (pp. 1-16).
Office Action (Non-Final Rejection) dated Sep. 20, 2023 for U.S. Appl. No. 17/366,728 (pp. 1-12).
Office Action (Final Rejection) dated Jan. 8, 2024 for U.S. Appl. No. 17/366,728, BP-428 US-CON || (pp. 1-16).
Office Action (Non-Final Rejection) dated Feb. 20, 2024 for U.S. Appl. No. 17/136,628, BP-352 US-CON || (pp. 1-13).
Office Action dated Mar. 8, 2024 for U.S. Appl. No. 17/363,551 (pp. 1-17).
Lubrizol Advanced Materials, Inc., Extrusion Guide, 2014, 16 pages.
International Search Report and Written Opinion, International Application No. PCT/US2016/020844, search completed Apr. 14, 2016.
International Search Report and Written Opinion, International Application No. PCT/US2016/020674, search completed Apr. 18, 2016.
Office Action dated Jun. 15, 2016 for U.S. Appl. No. 14/787,901.
International (PCT) Search Report for PCT/US16/20871 (BP-475 ||), 20 pages.
International Search Report and Written Opinion dated Jan. 21, 2015, relating to International Application No. PCT/US2014/053665.
International Search Report and Written Opinion dated Jan. 27, 2015, relating to International Application No. PCT/US2014/53667.
International Search Report and Written Opinion dated Jul. 18, 2014, relating to International Application No. PCT/US2014/027551.
International Search Report dated Nov. 2, 2014, relating to International Application No. PCT/US2014/53666.
International Search Report dated Nov. 24, 2014, relating to International Application No. PCT/US2014/52606.
International Search Report dated Nov. 7, 2014, relating to International Application No. PCT/US2014/046518.
Office Action dated May 11, 2015 for U.S. Appl. No. 14/331,066.
International Preliminary Report on Patentability dated Mar. 1, 2016, relating to International Application No. PCT/US2014/053666.
International Preliminary Report on Patentability dated Mar. 1, 2016, relating to International Application No. PCT/US2014/053665.
International Preliminary Report on Patentability, dated Mar. 1, 2016, relating to International Application No. PCT/US2014/052606.
International Preliminary Report on Patentability, dated Mar. 1, 2016, relating to International Application No. PCT/US2014/053667.
English summary of Russian Office Action for Russian Patent Application Serial No. 2016104363, dated Jul. 5, 2016, 3 pages.
Chinese Office Action for Application Serial No. 201480021009.9, dated Jul. 5, 2016 including English language summary, 17 pages.
English Translation of JP404278340A which originally published Oct. 2, 1992, 23 pages.
Office Action dated Aug. 15, 2016 for U.S. Appl. No. 14/468,789.

(56) References Cited

OTHER PUBLICATIONS

Office Action dated Aug. 12, 2016 for U.S. Appl. No. 14/475,096.
Cheng et al., "Improving processability of polyethylenes by radiation-induced long-chain branching," Radiation Physics and Chemistry, 78 (2009) pp. 563-566.
European Search Report for European Application No. 14768125.8 sent Jul. 15, 2016, (BP-405EP ||), 8 pages.
US Office Action dated Sep. 15, 2016 for U.S. Appl. No. 15/239,894, 8 pages.
Australian Patent Examination Report for Australian App. No. 2014239318 issued on Nov. 25, 2016, BP-405 AU ||, 4 pages.
Chinese Office Action for Chinese App. No. 201480047976.2 received on Dec. 9, 2016, BP-423 CN ||, 11 pages.
Chinese Office Action for Chinese App. No. 201480047578.0 sent on Nov. 30, 2016, BP-424 CN ||, 10 pages.
Australian First Examination Report for Australian App. No. 2014311414 mailed Feb. 7, 2017, BP-432 AU ||, 3 pages.
Extended European Search Report for European App. No. 14823298.6 dated Jan. 25, 2017, BP-422 EP ||, 9 pages.
Office Action dated Feb. 16, 2017 for U.S. Appl. No. 15/239,894; (BP-422).
Chinese Office Action for Application Serial No. 201480021009.9, dated Jan. 22, 2017 including English language summary, BP-405 CN ||, 22 pages.
Chinese Office Action for Chinese App. No. 201480047978.1 received Feb. 20, 2017, BP-425 CN ||, 14 pages.
Office Action dated May 1, 2017 for U.S. Appl. No. 14/211,533.
Office Action dated Mar. 14, 2017 for U.S. Appl. No. 14/475,266.
Office Action dated Mar. 21, 2017 for U.S. Appl. No. 14/475,411.
Extended European Search Report for European App. No. 14840353.8 mailed Mar. 17, 2017, 6 pages, BP-432 EP ||.
Office Action dateed Dec. 13, 2018 for U.S. Appl. No. 15/672,668, BP-352 US-CON ||, (pp. 1-13).
Office Action dated Jan. 14, 2019 for U.S. Appl. No. 15/004,263, BP-472 US-U ||, (pp. 1-15).
Office Action dated Mar. 7, 2019 for U.S. Appl. No. 16/023,218, BP-356 US-CON5 ||, (pp. 1-5).
Rogers, "All you Need to Know About Polypropylene, Part 1," Creative Mechanisms Blog. (Year: 2014), 6 pages.
Office Action dated Aril 2, 2019 for U.S. Appl. No. 15/388,319, BP-428 US-CON || (pp. 1-17).
Office Action dated Apr. 30, 2019 for U.S. Appl. No. 15/004,263 (pp. 1-10).
Office Action dated Apr. 5, 2019 for U.S. Appl. No. 15/651,284, BP-354 US-CON1 || 2020, pp. 1-5.
Notice to Attend Hearing for Indian Patent App. No. 2179/DELNP/2014 dated Aug. 17, 2020, BP-356 IN ||, 2 pages.
Mexican Office Action for Mexican App. No. MX/a/2014/002373 issued Jul. 1, 2019, BP-356 MX ||, 7 pages.
ISO, "Plastics—Determination of drawing characteristics of thermoplastics in the molten state", ISO, First edition, Jun. 15, 2005, 22 pages.
Mexican Office Action for Mexican App. No. MX/a/2014/002373 issued Mar. 6, 2020, BP-356 MX ||, 10 pages.
Third Mexican Office Action for Mexican App. No. MX/a/2014/002373 issued Jan. 8, 2021, BP-356 MX ||, 9 pages.
Fourth Mexican Office Action for Mexican App. No. MX/a/2014/002373 received Nov. 2, 2021, BP-356 MX ||, 5 pages.
Canadian Examiner's Report and Examination Search Report for Canadian App. No. 2,889,280, dated Apr. 14, 2020, BP-395 CA ||, 5 pages.
Canadian Examiner's Report and Examination Search Report for Canadian App. No. 2,889,280, dated Oct. 27, 2020, BP-395 CA ||, 4 pages.
Mexican Office Action for Mexican Patent App. No. MX/a/2015005207 dated Jul. 22, 2020, BP-395 MX ||, 5 pages.
Examination Report for Indian Patent App. No. 5758/DELNP/2015 dated Aug. 28, 2019, BP-445 IN ||, 7 pages.
First Examination Report for Indian App. No. 5756/DELNP/2015 dated Dec. 12, 2019, BP-374 IN ||, 5 pages.
First Examination Report for Indian App. No. 5804/DELNP/2015, sent Aug. 5, 2019, BP-391 IN ||, 7 pages.
Indian First Examination Report for Indian Application No. 8947/DELNP/2015 dated Jul. 18, 2019, BP-392 IN ||, 7 pages.
Office Action dated Jul. 26, 2019 for U.S. Appl. No. 16/149,351, BP-405 US-CON ||, (pp. 1-6).
Office ACtion dated Oct. 18, 2019 for U.S. Appl. No. 16/546,723, BP-356 US-CON ||, (pp. 1-6).
Office Action dated Nov. 29, 2019 for U.S. Appl. No. 15/651,284, BP-354 US-CON || (pp. 1-6).
Lyondellbasell Technical Data Sheet for Pro-fax SC204 dated Mar. 17, 2016, 3 pages.
Canadian Examiner's Report for Canadian App. No. 2896256, dated Feb. 6, 2020, BP-392 CA ||, 4 pages.
Canadian Examiner's Second Report for Canadian App. No. 2896256, dated Dec. 2, 2020, BP-392 CA ||, 4 pages.
Canadian Examiner's Third Report for Canadian App. No. 2896256, dated Aug. 5, 2021, BP-392 CA ||, 4 pages.
Hearing Notice for Indian Application No. 8947/DELNP/2015 dated Jul. 23, 2020, BP-392 IN ||, 3 pages.
Notice of Appeal Decision for Japanese App. No. 2016-501945 sent Aug. 18, 2020, BP-392 JP ||, 15 pages.
First Mexican Office Action for Mexican Patent App. No. MX/a/2015/008525 dated Nov. 5, 2020, BP-392 MX ||, 17 pages.
First Mexican Office Action for Mexican Patent App. No. MX/a/2015/008525 dated May 3, 2021, BP-392 MX ||, 11 pages.
Korean Notice of Preliminary Rejection for Korean Pat. App. No. 10-2015-7021888 dated Apr. 21, 2020, BP-392 KR ||, 11 pages.
Korean Second Notice of Preliminary Rejection for Korean Pat. App. No. 10-2015-7021888 dated Dec. 29, 2020, BP-392 KR ||, 16 pages.
Korean Notice of Last Preliminary Rejection for Korean Pat. App. No. 10-2015-7021888 dated Sep. 5, 2021, BP-392 KR ||, 9 pages.
Office Action dated Jun. 12, 2020 for U.S. Appl. No. 15/651,284, BP-354 U-CON || (pp. 1-8).
Japanese Office Action for Japanese Patent App. No. 2019-045572 date Jan. 14, 2020, BP-392 JP ||, 6 pages.
Office Action dated Apr. 27, 2020 for U.S. Appl. No. 16/058,126, BP-512A US-U ||, (pp. 1-12).
Office Action dated Jun. 23, 2020 for U.S. Appl. No. 16/058,131 , BP-512B US-U || (pp. 1-8).
Office Action dated Sep. 3, 2020 for U.S. Appl. No. 16/858,778 (pp. 1-10).
Office Action dated Sep. 30, 2020 for U.S. Appl. No. 16/058,126, BP-512A US-U ||, (pp. 1-11).
Office Action dated Sep. 30, 2020 for U.S. Appl. No. 16/531,530, BP-354 US-CON1 ||, (pp. 1-10).
Japanese Office Action for Japanese Patent App. No. 2019-045572 dated Oct. 30, 2020, BP-392 JP ||, 6 pages.
Office Action dated Dec. 24, 2020 for U.S. Appl. No. 16/058,131, BP-512B US-U || (pp. 1-17).
Office Action dated Jan. 25, 2021 for U.S. Appl. No. 16/058,126, BP-512A US-U || (pp. 1-13).
Combined Search and Examination Report for Great Britain App. No. GB2010642.3 dated Mar. 31, 2021, BP-356 GB-DIV1 ||, 3 pages.
Japanese Office Action for Japanese Patent App. No. 2019-045572 dated Apr. 13, 2021, BP-392 JP ||, 6 pages.
Office Action dated Jun. 8, 2021 for U.S. Appl. No. 16/058,126, BP-512A US-U (pp. 1-16).
Indian First Examination Report for Indian App. No. 201918021005 dated Dec. 24, 2021, BP-354 IN ||, 7 pages.
Chinese Office Action for Chinese App. No. 202010558511.0 dated Jul. 20, 2022, BP-356 CN-DIV1 ||, 11 pages.
Chinese Rejection Decision Action for Chinese App. No. 202010558511.0 dated Feb. 16, 2023, BP-356 CN-DIV1 ||, 7 pages.
Extended European Search Report for European App. No. 14838960.4 sent Mar. 17, 2017, BP-425 EP ||, 9 pages.
Extended European Search Report for European App. No. 14840262 sent on Mar. 23, 2017, BP-424 EP ||, 8 pages.
Extended European Search Report for European App. No. 14840734.9 mailed Apr. 4, 2017, BP-423 EP ||, 10 pages.

(56) References Cited

OTHER PUBLICATIONS

New Zealand Examination Report for New Zealand Patent App. No. 712687 mailed Mar. 30, 2017, BP-405 NZ ||, 10 pages.
Office Action dated Apr. 21, 2017 for U.S. Appl. No. 14/475,411.
Taiwan Search Report for Taiwan Application No. 103109790 completed Apr. 20, 2017, BP-405 TW ||, 9 pages.
Australian Examination Report for Australian App. No. 2014286957 sent May 2, 2017, BP-422 AU ||, 3 pages.
Advisory Action dated Jun. 1, 2017 for U.S. Appl. No. 15/239,894; (pp. 1-6).
Office Action dated Jul. 10, 2017 for U.S. Appl. No. 15/239,894; (pp. 1-10).
Office Action dated Jul. 19, 2017 for U.S. Appl. No. 15/059,995; (pp. 1-10).
Chinese Office Action for Chinese App. No. 201480047578.0 sent on Jul. 4, 2017, BP-424 CN ||, 5 pages.
Chinese Office Action for Chinese App. No. 201480047978.1 received Jul. 21, 2017, BP-425 CN ||, 11 pages.
Unilever Launches Breakthrough Packaging Technology That Uses 15% Less Plastic, Unilever (Apr. 24, 2014), http://www.unilever.com/mediacentre/pressreleases/2014/Unileverlaunchesbreakthroughpackagingtechnologythatuses15lessplastic.aspx (2 pages).
Unilever Says It Will Use Less Plastic Per Bottle, Yahoo News (Apr. 22, 2014, 10:20 AM), http://news.yahoo.com/unilever-says-less-plastic-per-bottle-142039401—finance.html (3 pages).
Chinese Office Action for Application Serial No. 201480021009.9, dated Aug. 7, 2017 including English language summary, BP-405 CN ||, 12 pages.
Chinese Office Action for Chinese App. No. 201480047976.2 received on Aug. 22, 2017, BP-423 CN ||, 15 pages.
Dongwu Yang, Plastic Material Selection Technology, Light Industry Press, Jan. 2008, 1 page.
Australian First Patent Examination Report for Australian App. No. 2014311991 dated Oct. 4, 2017, BP-424 AU ||, 4 pages.
Office Action dated Oct. 3, 2017 for U.S. Appl. No. 15/491,443; (pp. 1-6).
Office Action dated Oct. 6, 2017 for U.S. Appl. No. 15/383,115; (pp. 1-5).
Office Action dated Oct. 27, 2017 for U.S. Appl. No. 15/239,894; (pp. 1-7).
Chinese Office Action for Application Serial No. 201480021009.9, dated Januray 2, 2018 including English language summary, BP-405 CN ||, 6 pages.
Office Action dated Jan. 17, 2018 for U.S. Appl. No. 15/591,355; (pp. 1-5).
Chinese Office Action for Application Serial No. 201480021009.9, dated Apr. 20, 2018 including English language summary, BP-405 CN ||, 6 pages.
First Substantive Examination Report for European App. No. 14768125.8 dated Mar. 21, 2019, BP-405 EP ||, 6 pages.
First Examination Report for Indiana Patent App. No. 9302/DELNP/2015 dated May 6, 2019, BP-405 IN ||, 7 pages.
Chinese Office Action for Chinese App. No. 20180039581.8 sent Feb. 23, 2018, BP-422 CN ||, 13 pages.
Chinese Office Action for Chinese App. No. 20180039581.8 sent Jan. 14, 2019, BP-422 CN ||, 10 pages.
Chinese Final Rejection for Chinese App. No. 201480047976.2 received on Mar. 7, 2018, BP-423 CN ||, 8 pages.
Chinese Office Action for Chinese App. No. 201480047978.1 received Feb. 24, 2018, BP-425 CN ||, 11 pages.
Chinese Office Action for Chinese App. No. 20180042446.9 sent on Feb. 3, 2018, BP-432 CN ||, 9 pages.
Chinese Office Action for Chinese App. No. 20180042446.9 sent on Oct. 31, 2018, BP-432 CN ||, 5 pages.
Chinese Office Action for Chinese App. No. 201480047578.0 sent on Jan. 24, 2018, BP-424 CN ||, 10 pages.
Vasile et al., Practical Guide to Polyethylene, published by Smithers Rapra Press, 2008, p. 119, 3 pages.
Office Action dated Apr. 27, 2018 for U.S. Appl. No. 15/061,005 (pp. 1-7).
Office Action dated Apr. 16, 2018 for U.S. Appl. No. 15/061,070, BP-475 US-U ||, (pp. 1-13).
Definition of "Base," Dictionary.com, available at http://www.dictionary.com/browse/base, retrieved on Apr. 16, 2018.
Office Action dated Apr. 20, 2018 for U.S. Appl. No. 15/239,894, BP-422 US-CON1 ||, (pp. 1-13).
Office Action dated Jun. 15, 2018 for U.S. Appl. No. 15/491,443, BP-432 US-U ||, pp. 1-6.
Chinese Office Action for Chinese App. No. 201480047578.0 sent on Aug. 29, 2018, BP-424 CN ||, 4 pages.
Office Action dated Sep. 7, 2018 for U.S. Appl. No. 15/239,894, BP422 US-CON ||, (pp. 1-9).
Office Action dated Mar. 8, 2019 for U.S. Appl. No. 15/902,489, BP-473 US-CON ||, (pp. 1-16).
Chinese Office Action for Chinese App. No. 20180039581.8 sent May 31, 2019, BP-422 CN |, 7 pages.
Chinese Reexamination Notification for Chinese App. No. 201480047976.2 received on Jul. 15, 2019, BP-423 CN ||, 12 pages.
Shunying Wu et al., "Foam Molding" Beijing Chemical Industry Press, Second Edition, Feb. 1999, 16 pages, English translation included.
Dingyi Hong, "Handbook of Plastic Industry: Polyolefin" Beijing Chemical Industry Press, First Edition, Mar. 1999, 17 pages, English translation included.
Shunyang Deng, "Chemical Formulation and Process Manual" Shanghai Science and Technology Press, First Edition, Jan. 2013, 11 pages, English translation included.
Office Action dated Jul. 15, 2019 for U.S. Appl. No. 15/902,489, BP-473 US-CON ||, (pp. 1-24).
Office Action dated Oct. 4, 2019 for U.S. Appl. No. 15/713,799, BP-432 US-CON ||, (pp. 1-5).
First Mexican Office Action for Mexican Patent App. No. MX/a/2015/012702 dated Jun. 23, 2021, BP-405 MX ||, 17 pages, No English translation available.
Office Action dated Feb. 15, 2017 for U.S. Appl. No. 14/858,193.
Singapore Office Action and Written Opinion dated Feb. 14, 2017 for Singapore Application No. 11201504327V, BP-374 SG ||, 6 pages.
Office Action dated Feb. 24, 2017 for U.S. Appl. No. 14/188,504.
Office Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 mailed Feb. 28, 2017, BP-428 CN ||, 16 pages.
New Zealand First Examination Report for New Zealand Application 708546 received Feb. 23, 2017, BP-374 NZ ||, 2 pages.
Singapore Office Action and Written Opinion dated Dec. 13, 2016 and received on Feb. 28, 2017 for Singapore Application No. 11201504333Y, BP-445 SG ||, 6 pages.
Office Action for Chinese Patent Application No. 201380065116.7, dated Mar. 1, 2017, BP-376 CN ||, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action mailed Mar. 10, 2017 for Chinese Patent Application 201480007369.3, BP-392 ||237578, 11 pages.
New Zealand Examination Report for New Zealand Application No. 708463 received Mar. 16, 2017, BP-445 NZ ||, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European App. No. 14836418 mailed Feb. 23, 2017, BP-428 EP ||, 6 pages.
Office Action dated Apr. 7, 2017 for U.S. Appl. No. 14/063,252.
Chinese Office Action for Chinese Application No. 201380065127.5 sent on Apr. 1, 2017, (BP-374 ||), 14 pages.
Japanese Office Action for Japanese Application No. 2014-515882, dispatched Apr. 4, 2017, BP-354 JP ||, 6 pages.
New Zealand Examination Report for New Zealand Application No. 708552 received on Mar. 29, 2017, BP-391 NZ ||, 2 pages.
Australian Search Report for Australian App. No. 2013359028, dated Apr. 10, 2017, BP-374 AU ||, 5 pages.
Australian Search Report for Australian App. No. 20133358988 dated Apr. 11, 2017, BP-445 AU ||, 4 pages.

(56) References Cited

OTHER PUBLICATIONS

Chinse Office Action for Chinese Patent App. No. 201511030247.9 mailed Apr. 5, 2017, BP-354 CN ||, 12 pages.
Chinese Office Action for Chinese App. No. 201380065089.3 received Apr. 21, 2017, BP-391 CN ||, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, BP-395 CN ||, 11 pages.
Office Action dated Jun. 7, 2017 for U.S. Appl. No. 15/388,319; (pp. 1-21).
Chinese Office Action for Chinese Application No. 201280051426.9 received May 15, 2017, BP-356 CN ||, 12 pages.
Chinese Office Action for Chinese App. No. 201380041896.1 mailed May 22, 2017, BP-386 CN ||, 9 pages.
Taiwan Office Action for Taiwan App. No. 101121655 received Jun. 14, 2017, BP-354 TW ||, 29 pages.
Australian Examiner's Report for Australian App. No. 2014244210 received Jun. 16, 2017, BP-392 AU ||, 4 pages.
European Examination Report for European App. No. 13863308.6 sent May 17, 2017, BP-374 EP ||, 3 pages.
Extended European Search Report for European App. No. 14836418.5 mailed Jun. 6, 2017, BP-428 EP ||, 14 pages.
Office Action dated Jun. 13, 2017 for U.S. Appl. No. 14/858,193; (pp. 1-21).
Japanese Office Action for Japanese Patent App. No. 2015-539838 sent Jun. 6, 2017, BP-395 JP ||, 19 pages.
New Zealand Examination Report for New Zealand Application 708546 received Jul. 11, 2017, BP-374 NZ ||, 2 pages.
Office Action dated Jul. 19, 2017 for U.S. Appl. No. 15/004,263.
European Examination Report for European App. No. 13849152.7 sent Jun. 29, 2017, BP-395 EP ||, 4 pages.
Taiwan Office Action for Taiwan App. No. 102138786 received on Aug. 9, 2017, BP-395 TW ||, 25 pages.
Office Action dated Aug. 22, 2017 for U.S. Appl. No. 14/188,504.
Australian Examination REport for Australian App. No. 2016204692 received Aug. 15, 2017, BP-356 AU-DIV ||, 3 pages.
German Office Action for German App. No. 11 2012 002 042.1 received on Sep. 8, 2017, BP-354 DE ||, 20 pages.
Chinese Office Action mailed 21 Sep. 2017 for Chinese Patent Application 201480007369.3, BP-392 || 237578, 4 pages.
Taiwan Office Action for Taiwan Pat. App. No. 101121656 mailed Aug. 1, 2017, BP-354 TW ||, 16 pages.
Office Action dated Oct. 18, 2017 for U.S. Appl. No. 14/063,252 (pp. 1-17).
Chinese Office Action for Chinese Application No. 201380065127.5 sent on Sep. 27, 2017, (BP-374 ||), 19 pages.
Office Action dated Oct. 26, 2017 for U.S. Appl. No. 15/139,573; (pp. 1-8).
Office Action dated Nov. 2, 2017 for U.S. Appl. No. 15/650,424; (pp. 1-6).
Extended European Search Report for European App. No. 17182869.2 sent on Oct. 19, 2017, BP-356 EP-DIV1 ||, 5 pages.
Office Action dated Aug. 11, 2016 for U.S. Appl. No. 14/108,110.
Chinese Office Action mailed Aug. 3, 2016 for Chinese Patent Application 201480007369.3, BP-392 || 237578, 13 pages.
M. Antunes etal., 'Heat Transfer in Polyolefin Foams,' Heat Transfer in Multi-Phase Materials, A. Ochsner and G. E. Murch, Eds. Springer-Verlag Berlin Heidelberg, 2011, 131-161.
Office Action dated Sep. 1, 2016 for U.S. Appl. No. 14/106,212.
Australian First Patent Examination Report for Application No. 2013359097 sent Aug. 26, 2016, (BP-391 AU ||), 3 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, BP-392 SG ||, 7 pages.
Office Action dated Sep. 27, 2016 for U.S. Appl. No. 14/725,319.
Office Action dated Oct. 7, 2016 for U.S. Appl. No. 14/739,510; || BP-356 US-CON2.
Japanese Office Action for Japanese Application No. 2014-515882, dispatched Aug. 30, 2016, BP-354 JP ||, 6 pages.
Mexican Office Action for Mexican Application MX/a/2013/014993 received on Sep. 27 2016, BP-354 MX ||, 6 pages.
New Zealand Examination Report for New Zealand Application No. 708463 received Oct. 3, 2016, BP-445 NZ ||, 3 pages.
New Zealand Examination Report for New Zealand Application No. 708552 received on Oct. 7, 2016, BP-391 NZ ||, 4 pages.
New Zealand First Examination Report for New Zealand Application 708546 received Sep. 26, 2016, BP-374 NZ ||, 4 pages.
Russian Office Action for Russian Application No. 2014101298 received Sep. 30, 2016, BP-354 RU ||, 6 pages.
European Examination Report for European App. No. 12727994.1 received on Sep. 23, 2016, BP-356 EP ||, 4 pages.
Chinese Office Action for Chinese App. No. 201380065089.3 received Sep. 30, 2016, BP-391 CN ||, 12 pages.
European Search Report for European App. No. 13849152.7 received Sep. 16, 2016, BP-395 EP ||, 3 pages.
Australian Patent Examination Report for Australian App. No. 2013334155 issued on Oct. 24, 2016, BP-395 AU ||, 7 pages.
Taiwan Office Action for Taiwan Pat. App. No. 102146299 received on Oct. 21, 2016, BP-391 TW ||, 7 pages.
Third Party Observation filed in European Patent App. No. 12727994.1 received on Nov. 4, 2016, BP-356 Ep | (5723-228834), 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4 received Oct. 12, 2016, BP-354 GB-DIV1 ||, 4 pages.
British Examination Report for GB App. No. 1400762.9 received Oct. 12, 2016, BP-354 GB ||, 2 pages.
Chinese Office Action for Chinese Applicaiton 201380065781.6 received Oct. 18, 2016, BP-395 CN ||, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009, 17 pages.
Extended European Search Report for European App. No. 13863649.3 received Sep. 27, 2016, BP-445 EP ||, 9 pages.
Office Action dated November4, 2016 for U.S. Appl. No. 13/961,411.
Chinese Office Action for Chinese Application No. 201280051426.9 received Nov. 1, 2016, BP-356 CN ||, 9 pages.
English Summary of Chinese Office Action for Application Serial No. 201380041896.1, dated Nov. 11, 2016, BP-386 CN ||, 11 pages.
Extended European Search Report for European App. No. 14775300.8 sent Oct. 24, 2016, BP-392 EP ||, 9 pages.
Office Action dated Nov. 18, 2016 for U.S. Appl. No. 14/718,836.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-USA/products/technical-information—patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529 received on Nov. 14, 2016, BP-354 GCC ||, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025 received Dec. 23, 2016, BP-356 EP ||, 5 pages.
Japanese Office Action for Japanese Patent App. 2014-516089 sent Dec. 20, 2016, BP-352 JP ||, 6 pages.
European Examination Report for European App. No. 12727994.1 received on Jan. 25, 2016, BP-356 EP ||, 4 pages.

(56) References Cited

OTHER PUBLICATIONS

Japanese Office Action for Japanese App. No. 2014-528384 received Dec. 6, 2016, BP-356 JP ||, 15 pages.
Singapore Office Action and Written Opinion received Feb. 6, 2017 for Singapore Application No. 11201504330U, BP-391 SG ||, 6 pages.
Office Action dated Feb. 7, 2017 for U.S. Appl. No. 13/491,007.
Office Action for Chinese Patent Application No. 201380064860.5, dated Jan. 25, 2017, BP-445 CN ||, 12 pages.
European Examination Report for European App. No. 13849152.7 sent Jan. 30, 2017, BP-395 EP ||, 3 pages.
Office Action dated Aug. 18, 2015 for U.S. Appl. No. 14/106,212.
Office Action dated Aug. 27, 2015 for U.S. Appl. No. 14/106,358.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
“Slip Agents”, Polypropylene Handbook, 2nd edition, 2005, pp. 285-286.
Certified English translation of JP2003292663.
Second Chinese Office Action dated Sep. 6, 2015 for Chinese Application Serial No. 201280034350.9.
Office Action dated Oct. 8, 2015 for U.S. Appl. No. 14/188,504.
Office Action dated Oct. 27, 2015 for U.S. Appl. No. 14/462,073.
English translation of Russian Office Action for Application Serial No. 2015127677, dated Sep. 16, 2015.
Inter Partes Review Petition for US. Pat. 8,883,280 (712 pages) [Submitted in multiple parts].
Gibson and Ashby, Cellular solids: structure and properties, 2nd ed., Cambridge University Press (1997) (7 pages).
C. Maier and T. Calafut, Polypropylene: the Definitive User’s Guide and Databook, Plastics Design Library, William Andrew Inc. (1998) (19 pages).
Grant & Hackh’s Chemical Dictionary, 5th ed., McGraw-Hill, Inc. (1987) (3 pages).
Merriam-Webster’s Collegiate Dictionary, 11th ed. (2003), p. 70 (3 pages).
Merriam-Webster’s Collegiate Dictionary, 11th ed. (2003), p. 1237 (3 pages).
Hawley’s Condensed Chemical Dictionary, 14th Ed. (2001) (5 pages).
Reichelt et al., Abstract of PP-Blends with Tailored Foamability and Mechanical Properties, Cellular Polymers, (2003) available from http://www.polymerjournals.com/journals.asp?Page=111&JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
“Borealis Dapoly™ HMS Polypropylene for Foam Extrusion” obtained from Borealis webpage obtained from the Internet Archive’s “Wayback Machine” as of Nov. 16, 2008 (https://web.archive.org/web/20081116085125/http://www.borealisgroup.com/pdf/literature/borealis-borouge/brochure/K_IN0020_GB_FF_2007_10_BB.pdf)(“Brochure ’08”) (20 pages).
Office Action dated Dec. 31, 2015 for U.S. Appl. No. 14/755,546.
Office Action dated Jan. 11, 2016 for U.S. Appl. No. 14/161,328.
Singapore Notice of Eligibility for Grant, Search Report, and Examination Report transmitted Dec. 10, 2015 for Singapore Application No. 11201503336V.
English translation of First Office Action for Taiwanese Application No. 101121656, Nov. 13, 2015.
English summary of Spanish Office Action for Application Serial No. P201490025, Feb. 9, 2016, 8 pages.
Extended European Search Report for European Application No. 13849152.7-1303/2912142 PCT/US2013/066811, dated Feb. 12, 2016.
Office Action dated Feb. 16, 2016 for U.S. Appl. No. 14/108,142.
United Kingdom Examination Report for Patent Application No. GB1400762.9 dated Feb. 11, 2016.
English Summary of Russian Office Action for Application Serial No. 2014111340, dated Feb. 25, 2016, 8 pages.
Supplemental European Search Report for European Application No. 12727994.1-1302, dated Feb. 17, 2016.
Australian First Patent Examination Report for Application No. 2012271047, dated Feb. 29, 2016.
Extended European Search Report for European Application No. 13827981.5-1708/2888092 PCT/US2013/053935, dated Feb. 19, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
English Summary of Chinese Office Action for Application Serial No. 201380041896.1, dated Mar. 18, 2016, 7 pages.
International Preliminary Report on Patentability dated Feb. 16, 2016, relating to International Application No. PCT/US2014/051508.
Australian Second Patent Examination Report for Application No. 2012302251, dated Feb. 26, 2016.
Japanese Office Action for Japanese Patent Application No. 2014-528384, dated Mar. 1, 2016.
English summary of Mexican Office Action for Application Serial No. MX/a/2013/014993, Apr. 27, 2016, 5 pages.
English summary of Chinese Office Action for Chinese Application Serial No. 201380065781.6, Apr. 19, 2016, 14 pages.
Doerpinghaus et al., ‘Separating the effects of sparse long-chain branching on rheology from those due to molecular weight in polyethylenes’, Journal of Rheology, 47, 717 (2003).
English Summary of Chinese Office Action for Application Serial No. 201280051426.9, Apr. 29, 2016, 5 pages.
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daploy-hmspp-extruded-foam/).
Reichelt et al., ‘PP-Blends with Tailored Foamability and Mechanical Properties’, Cellular Polymers, vol. 22, No. 5, 2003, 14 pages.
Ratzsch et al., ‘Radical reactions on polypropylene in the solid state’, Prog. Polym. Sci. 27 (2002) 1195-1282, 88 pages.
Excerpts from Encyclopedia of Polymer Science and Technology: Plastics, Resins, Rubbers, and Fibers, ‘Blowing Agents’, vol. 2, John Wiley & Sons, Inc. (1965), 37 pages.
Excerpts from Polymer Foams: Science and Technology, Lee et al., ‘Introduction to Polymeric Foams’, CRC Press (2007) 51 pages.
Excerpts from Gibson and Ashby, Cellular solids: Structure and properties—Second edition, Cambridge University Press, 1997, 66 pages.
Excerpts from Maier and Calafut, Polypropylene: the Definitive User’s Guild and Databook, Plastics Design Library, William Andrew Inc. (1998), 35 pages.
Office Action (Non-Final Rejection) dated Jan. 15, 2025 for U.S. Appl. No. 18/639,437, BP-512A US-CON || (pp. 1-13).
Office Action (Non-Final Rejection) dated Mar. 28, 2025 for U.S. Appl. No. 18/635,727 (pp. 1-6).
Canadian Office Action for Canadian App. No. CA3,013,585 dated Nov. 18, 2024, BP-512B CA ||, 5 pages.
Office Action (Non-Final Rejection) dated Nov. 25, 2024 for U.S. Appl. No. 17/363,551 (pp. 1-19).
Canadian Examiner’s Report for Canadian App. No. CA3170958 dated (Nov. 6, 2024), BP-356 CA-DIV1 ||, 5 pages.
Office Action (Final Rejection) dated Apr. 14, 2025 for U.S. Appl. No. 17/363,551 (pp. 1-24).
Office Action (Non-Final Rejection) dated Dec. 1, 2025 for U.S. Appl. No. 18/639,437 (pp. 1-12).
Office Action dated Jul. 9, 2025 for U.S. Appl. No. 18/406,730 (pp. 1-14).
Office Action dated Jul. 16, 2025 for U.S. Appl. No. 18/639,437 (pp. 1-19).

(56) References Cited

OTHER PUBLICATIONS

Canadian Examiner's Report for Canadian App. No. CA3170958 dated (Sep. 8, 2025), BP-356 CA-DIV1 ||, 4 pages.
Office Action (Final Rejection) dated Sep. 17, 2025 for U.S. Appl. No. 18/635,727 (pp. 1-9).
Canadian Office action for Canadian App. No. CA3,013,585 dated Oct. 23, 2025, BP-512B CA ||, 5 pages.
Office Action (Final Rejection) dated Jan. 16, 2026 for U.S. Appl. No. 17/363,551 (pp. 1-21).
Translation of CN-103113653-A, Liao et al., May 22, 2013. (Year: 2013).
Office Action (Non-Final Rejection) dated Jan. 15, 2026 for U.S. Appl. No. 18/635,727 (pp. 1-15).
Office Action (Final Rejection) dated Jul. 16, 2025 for U.S. Appl. No. 18/639,437 (pp. 1-19).
Office Action (Non-Final Rejection) dated Aug. 21, 2025 for U.S. Appl. No. 17/363,551 (pp. 1-19).
Office Action (Final Rejection) dated Apr. 21, 2026 for U.S. Appl. No. 18/639,437, (pp. 1-17).
Office Action (Final Rejection) dated Apr. 21, 2026 for U.S. Appl. No. 18/639,437 (pp. 1-12).
Office Action (Final Rejection) dated Jun. 3, 2026 for U.S. Appl. No. 18/635,727 (pp. 1-17).

* cited by examiner

INSULATED MULTI-LAYER SHEET AND METHOD OF MAKING THE SAME

PRIORITY CLAIM

This application is a continuation of U.S. application Ser. No. 17/528,650, filed Nov. 17, 2021, which is a continuation of U.S. application Ser. No. 16/058,126, filed Aug. 8, 2018, which claims priority under 35 U.S.C. § 119(e) to U.S. Provisional Application No. 62/542,324, filed Aug. 8, 2017, each of which is expressly incorporated by reference herein.

BACKGROUND

The present disclosure relates to polymeric materials that can be formed to produce a container, and in particular, polymeric materials that insulate. More particularly, the present disclosure relates to polymer-based formulations that can be formed to produce a multi-layer sheet.

SUMMARY

A multi-layer sheet in accordance with the present disclosure includes a film layer and an insulative cellular non-aromatic polymeric material. In illustrative embodiments, a blend of polymeric resins and cell-forming agents is extruded or otherwise formed to produce the insulated cellular non-aromatic polymeric material.

In illustrative embodiments, a polymeric-lamination layer couples together the film layer and the insulative cellular non-aromatic polymeric material. The multi-layer sheet may be formed by an extrusion lamination procedure that extrudes the polymer-lamination layer onto the insulative cellular non-aromatic polymeric material.

In some illustrative embodiments, the polymeric-lamination layer comprises a polypropylene, a polyethylene, or a mixture thereof. In some embodiments, the polymeric-lamination layer is substantially free of an adhesive.

In some illustrative embodiments, the insulative cellular non-aromatic polymeric material, the polymeric-lamination layer, or both comprise regrind. In some embodiments, regrind is blend of materials recaptured from the steps in forming the multi-layer sheet. In some illustrative embodiments, regrind is substantially free of an adhesive.

In some illustrative embodiments, the multi-layer sheet may have a tear resistance in a machine direction of at least about 75 gf according to ASTM D1922-93. In some illustrative embodiments, the multi-layer sheet has a puncture resistance of at least about 6,000 gf.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a diagrammatic view of a process for making a multi-layer sheet and a cup in accordance with the present disclosure showing that the cup-forming process includes, from left to right, extruding an insulative cellular non-aromatic polymeric material, extrusion laminating a film layer onto the insulative cellular non-aromatic polymeric material to form a multi-layer sheet, forming a body blank from the multi-layer sheet, forming a cup from the body blank, and regrinding the scrap from the blank forming process to form regrind which may be used in the extruding step;

FIGS. 2A-B are diagrammatic views of multi-layer sheets formed during the laminating step of FIG. 1;

Figure 1:
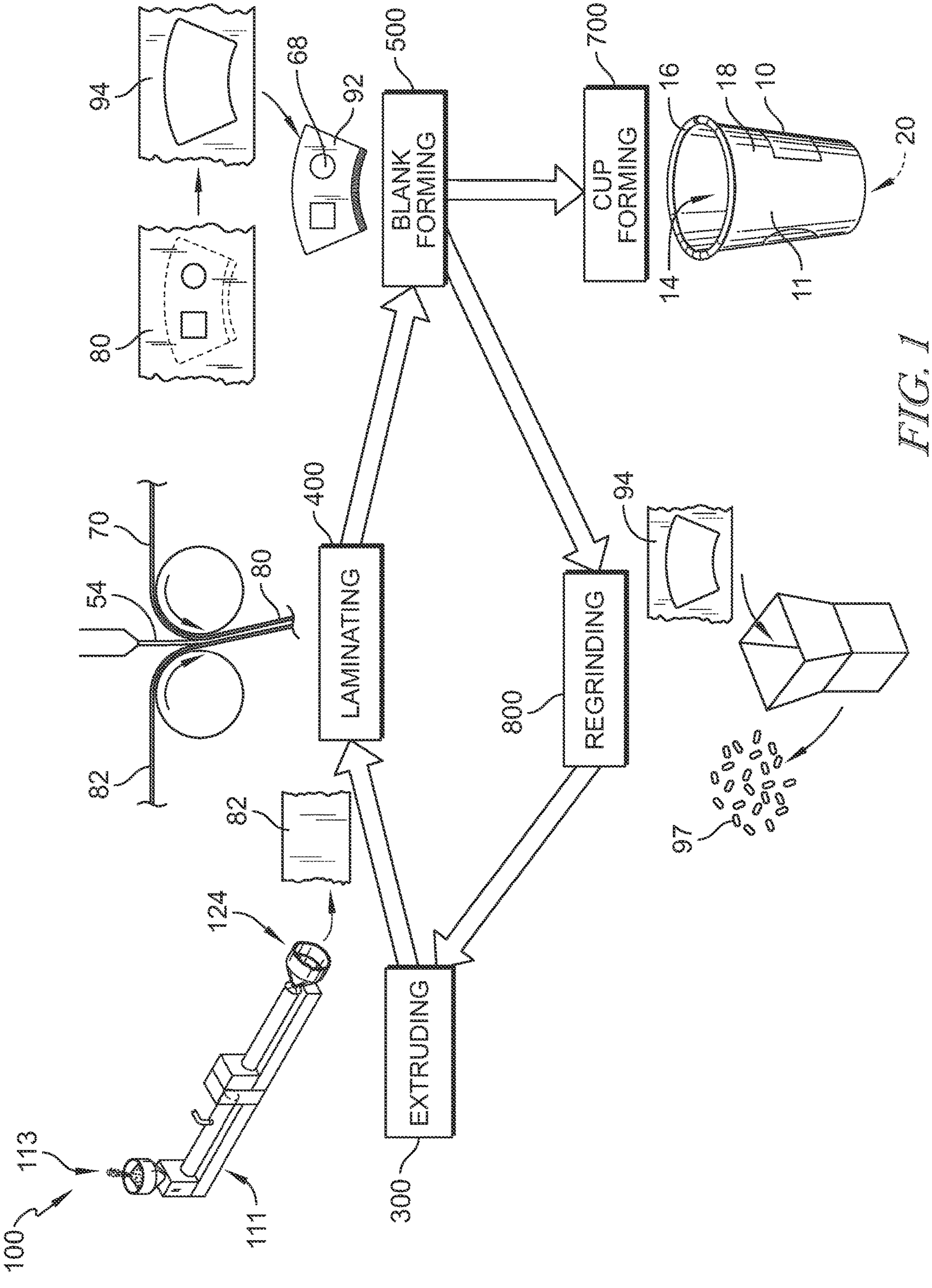
Figure 3:
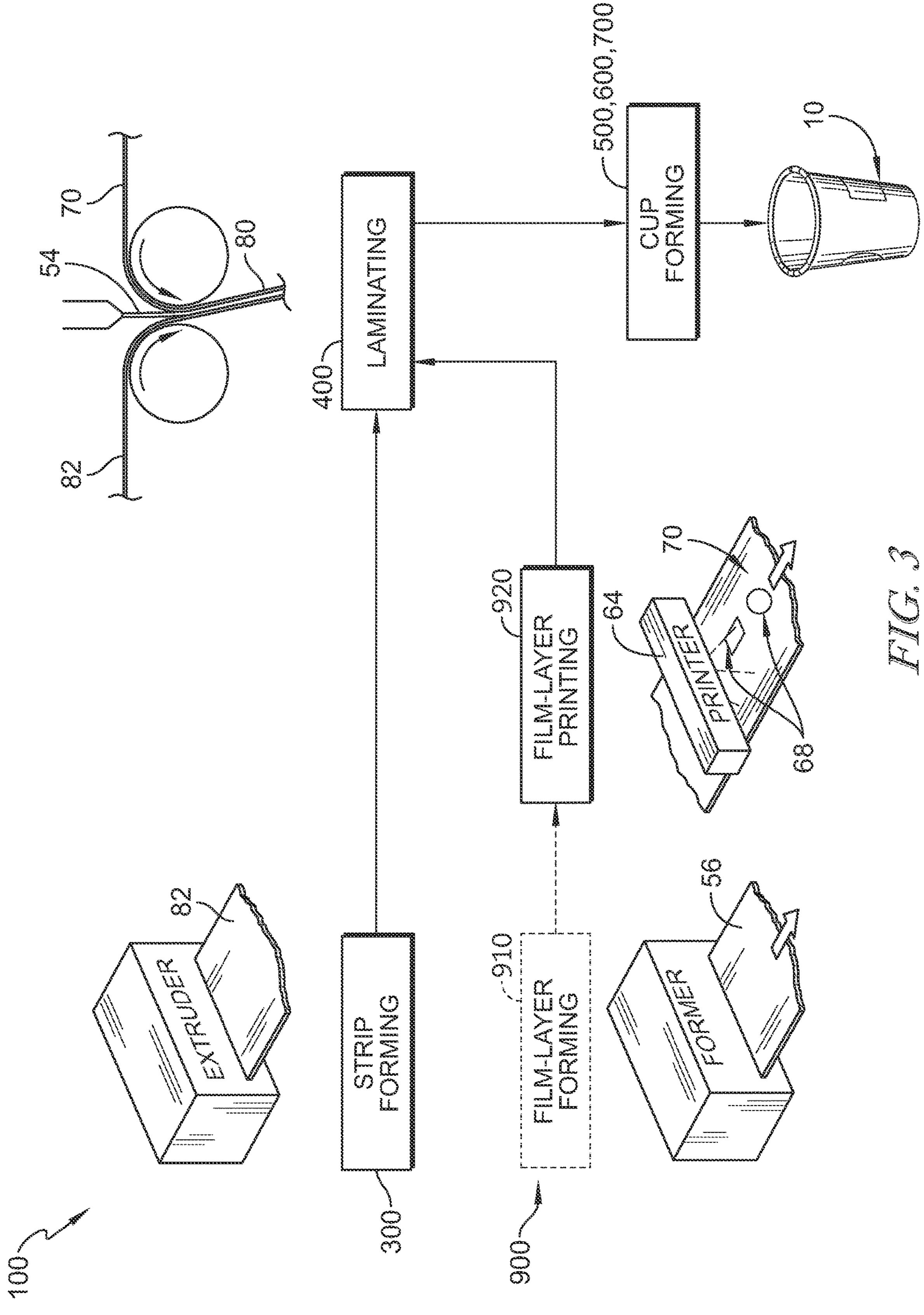
Figure 4:
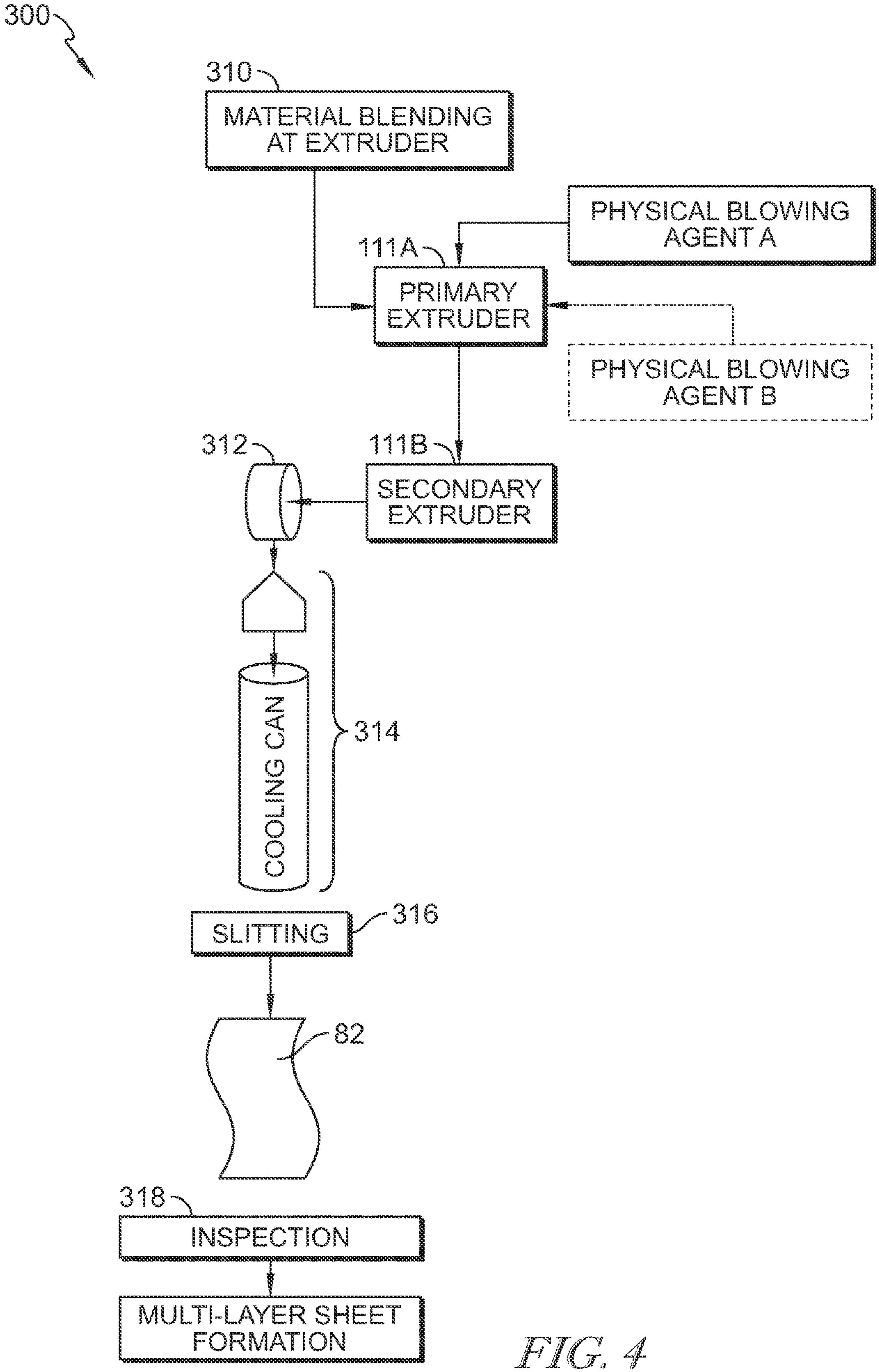
Figure 5:
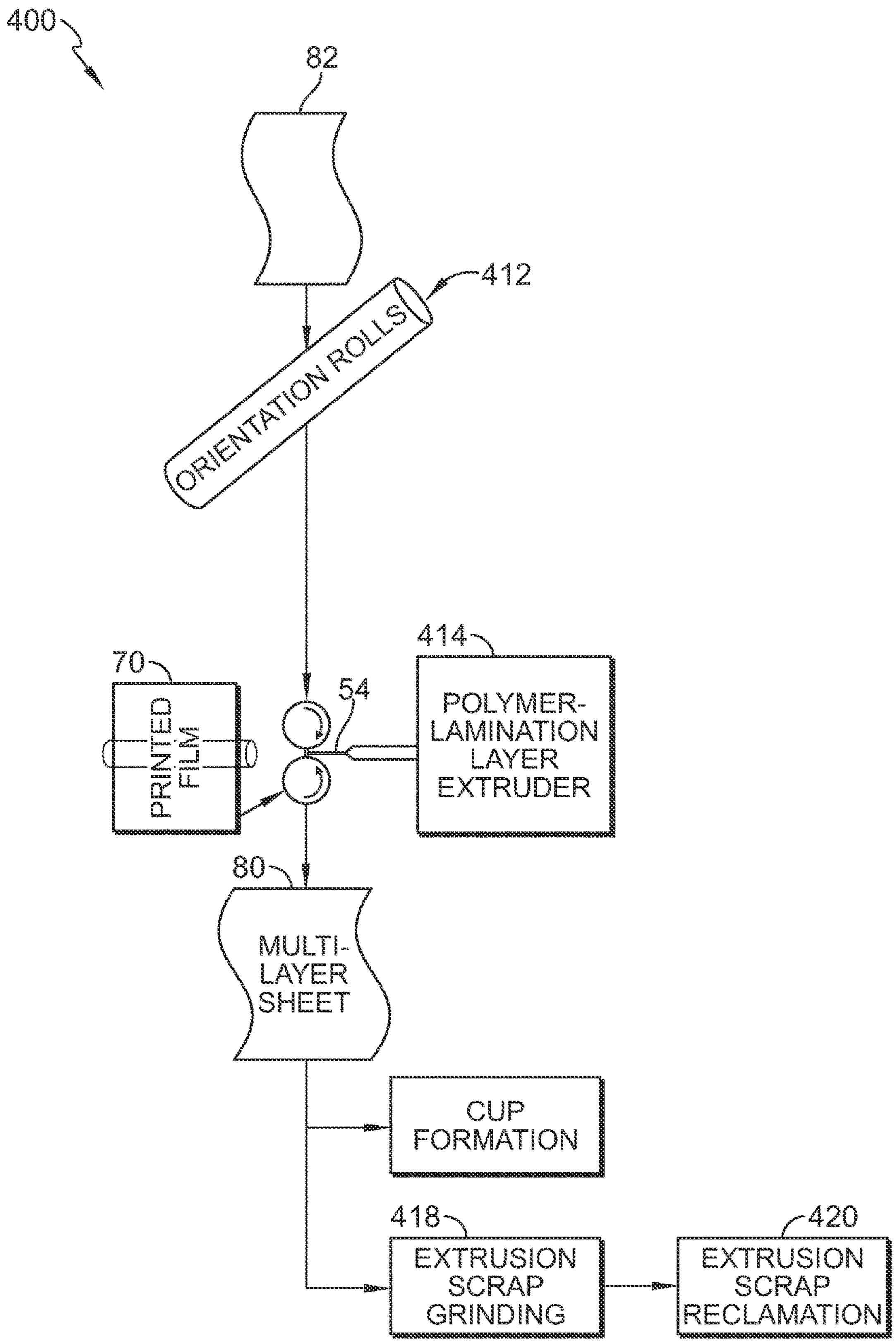
Figure 6:
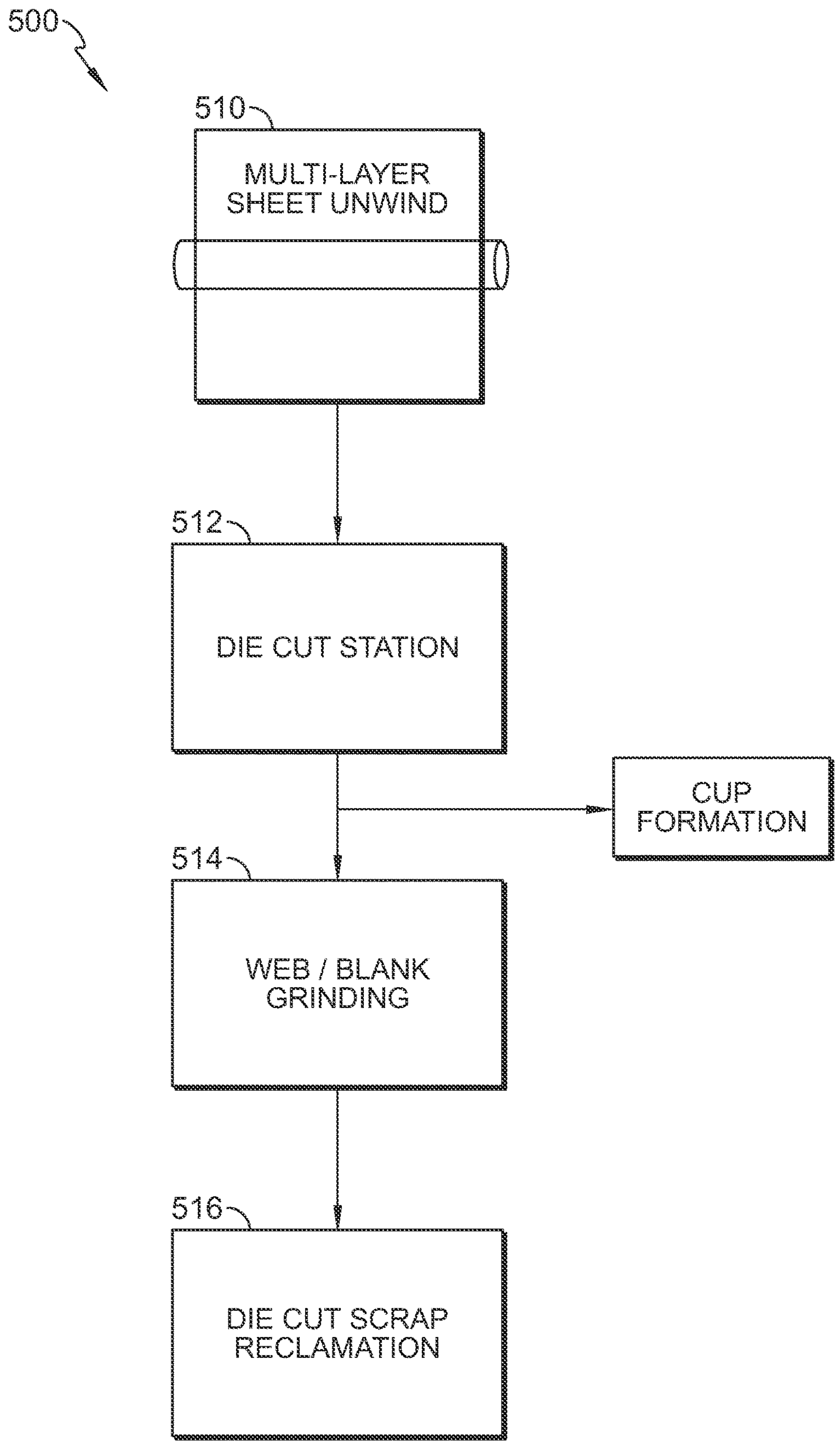
Figure 7:
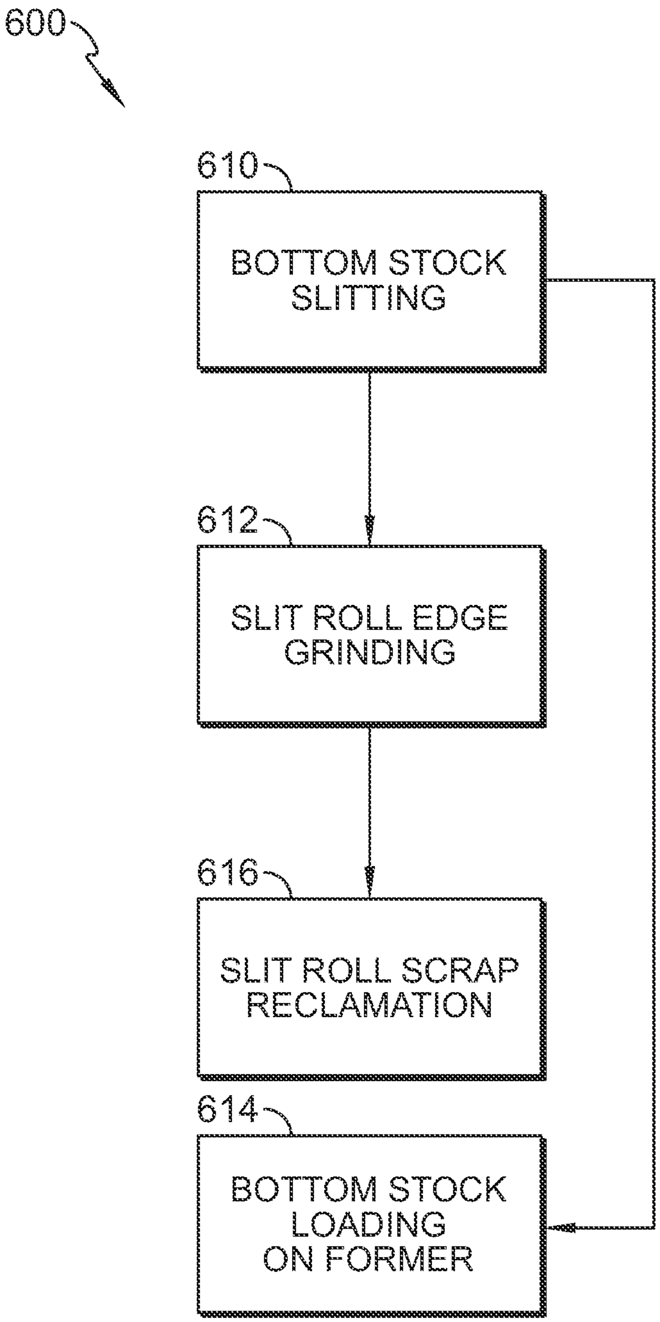
Figure 8:
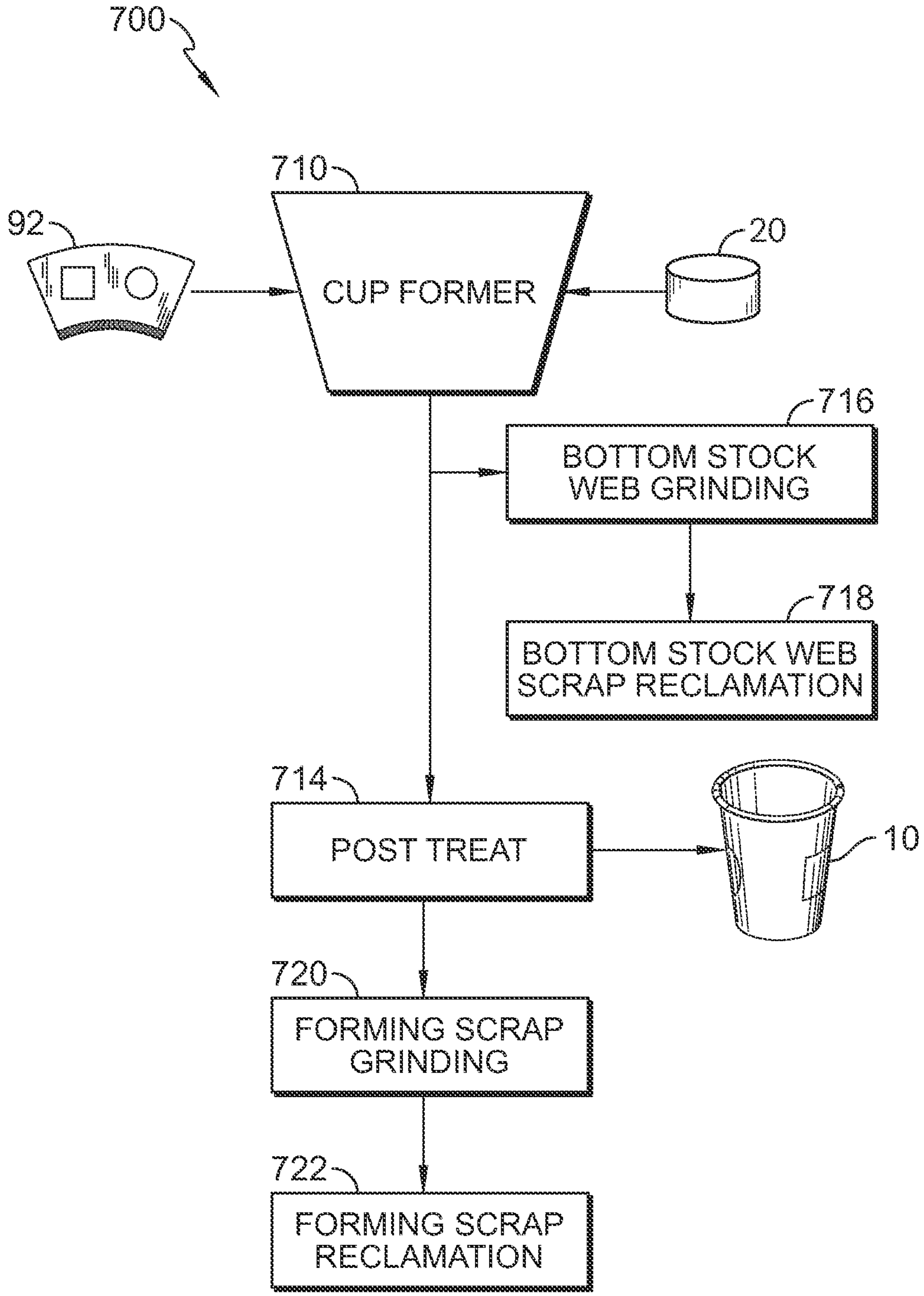
Figure 9:
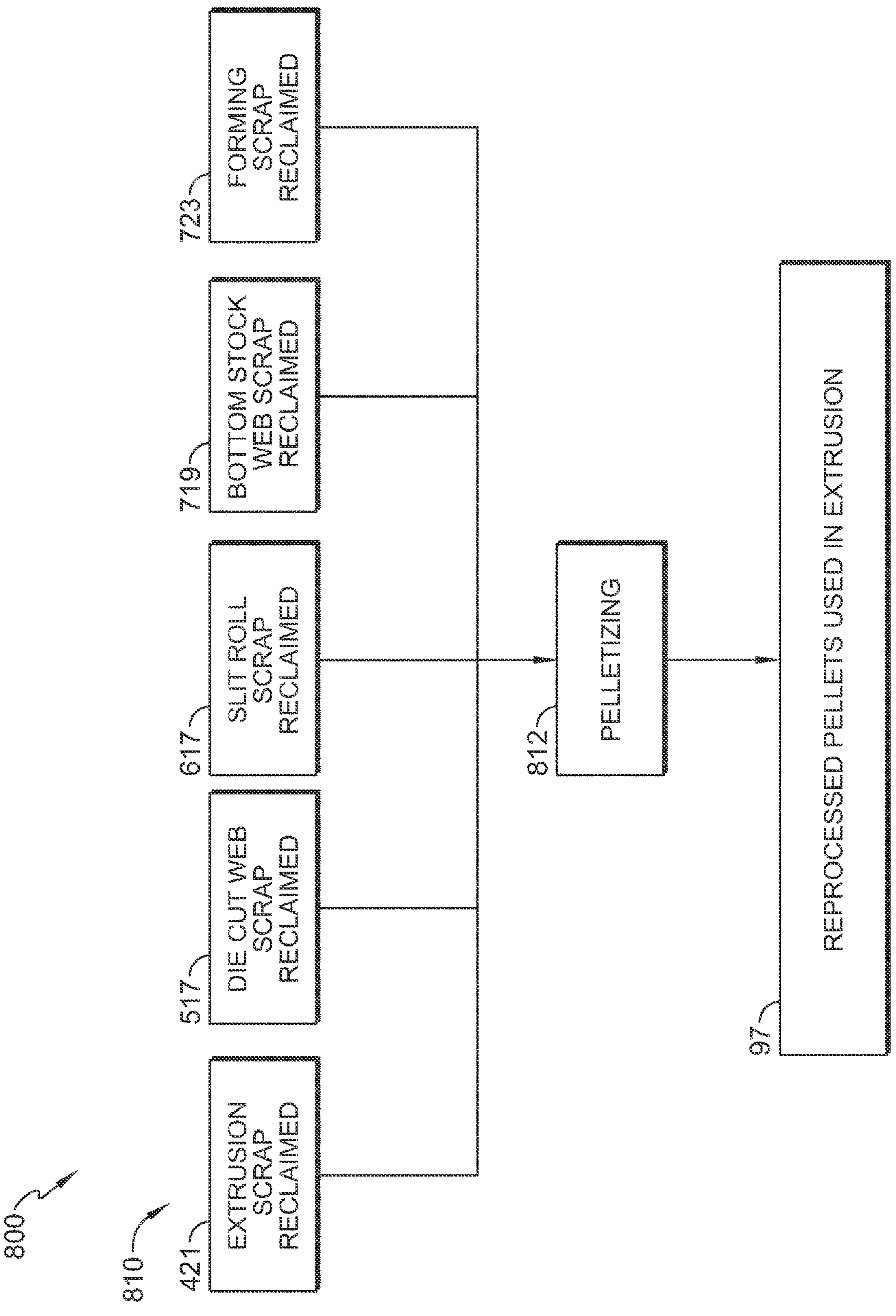
Figure 10:
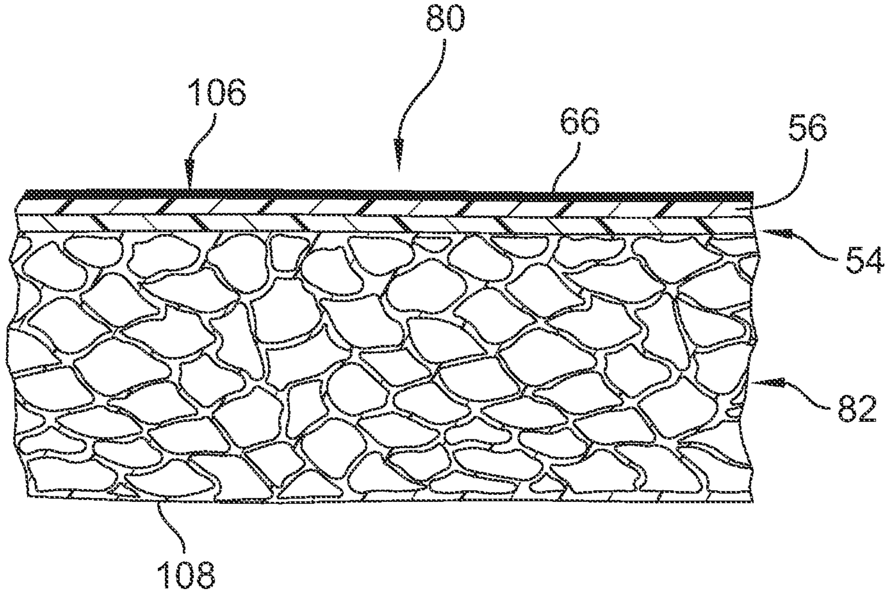
Figure 11:
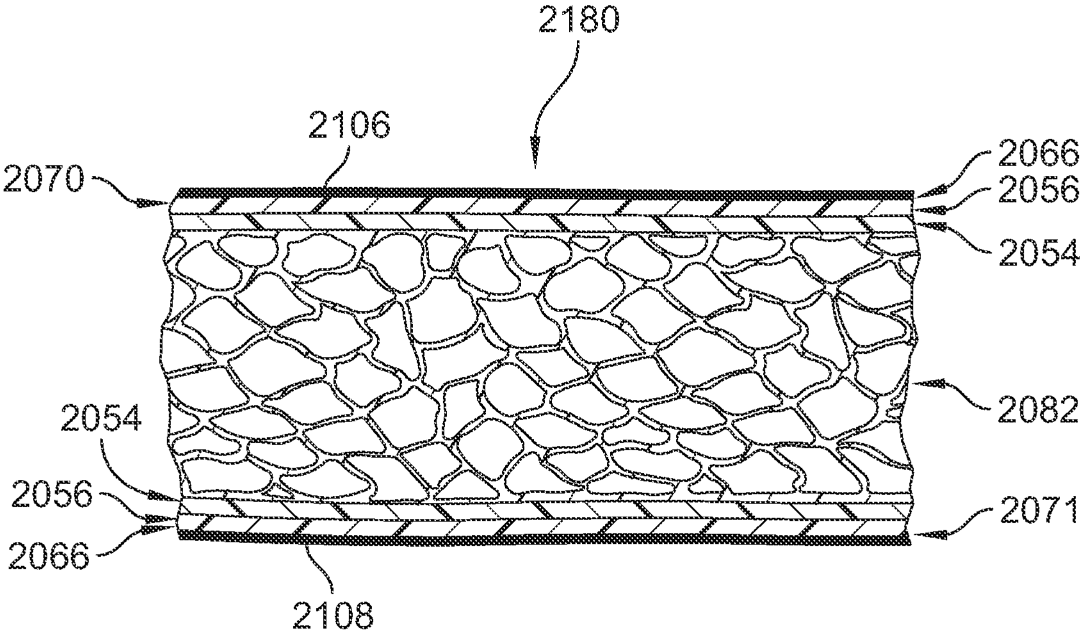

FIG. 3 is a perspective and diagrammatic view similar to FIG. 1 showing the cup-forming process includes forming a strip of the insulative cellular non-aromatic polymeric material and forming and printing a film layer, and combing the printed film layer with the strip of insulative cellular non-aromatic polymeric material in a laminating process to form the multi-layer sheet to be used to form the cup;

FIG. 4 is a perspective and diagrammatic view of an embodiment of a strip-forming stage in accordance with the present disclosure showing the strip-forming stage in which strips of insulative cellular non-aromatic polymeric material are formed using a tandem extrusion setup, and further showing the excess material is reground and reclaimed;

FIG. 5 is a perspective and diagrammatic view of the extrusion laminating process used to form the multi-layer sheet showing from top to bottom the extruded insulative cellular non-aromatic polymeric material from FIG. 4 and proceeding to the laminate extruder where it is coupled to the film with the polymeric-lamination layer to form the multi-layer sheet and further showing the excess material is reground and reclaimed;

FIG. 6 is a diagrammatic view of the blank forming process suggested in FIG. 1 showing from top to bottom the multi-layer sheet proceeding to a blank forming station to form the body blank and further showing the excess material is reground and reclaimed;

FIG. 7 is a diagrammatic view of a cup bottom forming process showing that the bottom stock is slit to form the bottom blank and further showing that the excess insulative cellular non-aromatic material from forming the bottom blank is reground and reclaimed;

FIG. 8 is a diagrammatic view of the cup-forming process showing from top to bottom that the body blanks formed as suggested in FIG. 6 proceed to a cup former along with the cup bottoms formed in FIG. 7 and combined to form the insulated cup and further showing that the excess bottom stock is reclaimed for regrinding and further showing any excess scrap from the cup-forming process is reclaimed;

FIG. 9 is a diagrammatic view of the regrinding process showing that the reclaimed material from the steps described in FIGS. 4-8 may be combined to form the regrind;

FIG. 10 is an enlarged sectional view of a first embodiment of a multi-layer sheet in accordance with the present disclosure made using the process shown in FIGS. 3-5 showing that the multi-layer sheet includes, from top to bottom, the printed film layer, the polymeric-lamination layer, and the strip of insulative cellular non-aromatic polymeric material; and FIG. 11 is a view similar to FIG. 10 showing another embodiment of a multi-layer sheet in accordance with the present disclosure wherein the multi-layer sheet includes, from top to bottom, a first printed film layer, a polymeric-lamination layer, and a strip of insulative cellular non-aromatic polymeric material, and a second printed film layer opposite the first printed film layer.

DETAILED DESCRIPTION

An insulative cup 10 in accordance with the present disclosure may be formed from a multi-layer sheet 80 as shown in FIG. 1. Multi-layer sheet 80 comprises an insulative cellular non-aromatic polymeric material 82, a printed film layer 70, and a polymeric-lamination layer 54 as shown in FIGS. 1 and 2. Illustratively, multi-layer sheet 80 is formed as part of a cup-manufacturing process 100 that includes an extrusion lamination process to form multi-layer sheet 80. In the extrusion lamination process, printed film layer 70 is extrusion laminated onto insulative cellular non-aromatic polymeric material 82 with polymeric-lamination layer 54 as shown in FIG. 1. Illustratively, polymeric-lamination layer 54 is extruded at the junction of insulative cellular non-aromatic polymeric 82 and printed film layer 70. The insulative cellular non-aromatic polymeric material 80, printed film layer 70, and polymeric-lamination layer 54 cooperate to provide insulative cup 10 having advantageous properties such as improved rigidity which allows for reduced density providing higher insulative properties.

Multi-layer sheet 80 is used to form insulative cup 10 as shown in FIG. 1. Insulative cup 10 includes a body 11 having a sleeve-shaped side wall 18 and a floor 20. Floor 20 is coupled to body 11 and cooperates with side wall 18 to form an interior region 14 therebetween for storing food, liquid, or any suitable product. Body 11 also includes a rolled brim 16 coupled to an upper end of side wall 18 and a floor mount 17 interconnecting a lower end of side wall 18 and floor 20 as shown in FIG. 1.

Multi-layer sheet 80 formed during cup-manufacturing process 100 may provide beneficial properties relative to a multi-layer sheet where an adhesive is used in place of polymeric-lamination layer 54. As an example, multi-layer sheet 80 may have improved rigidity. In addition, using polymeric-lamination layer 54 to couple insulative cellular non-aromatic polymeric material 82 to printed film layer 70 avoids the use of an adhesive. Illustratively, the presence of adhesive in multi-layer sheet 80 may inhibit the use of recaptured multi-layer sheet 80 as use in regrind for insulative cellular non-aromatic polymeric material 82, if present.

Figure 2A:
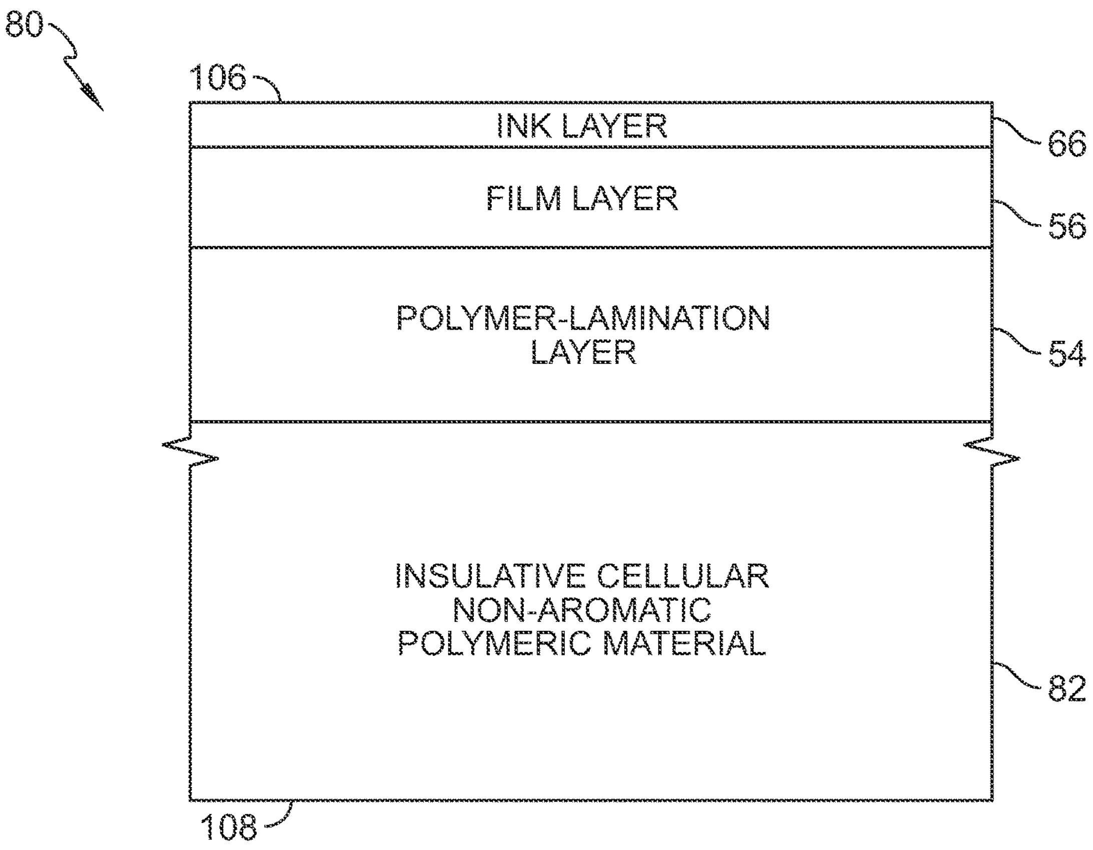
FIG. 2A is a diagrammatic view of a multi-layer sheet showing a film layer located between an ink layer and a polymer-lamination layer.

Multi-layer sheet 80 includes insulative cellular non-aromatic polymeric material 82, polymeric-lamination layer 54, and printed film layer 70, as shown in FIGS. 2A and B. Insulative cellular non-aromatic polymeric material 82 comprises a polymeric foam and is configured to reduce the density of multi-layer sheet 80. Polymeric-lamination layer 54 extends between and interconnects insulative cellular non-aromatic polymeric material 82 and printed film layer 70. Printed film layer 70 includes a film layer 56 and an ink layer 66 printed onto film layer 56. Illustratively, printed film layer 70 may form an outer surface 106 of cup 10. A portion of insulative cellular non-aromatic polymeric material 82 may form an inner surface 108 of cup 10.

A second embodiment of a multi-layer sheet 2080 is shown in FIG. 11. Multi-layer sheet 2080 includes a first printed film layer 2070 and a second printed film layer 2071. Each of first printed film layer 2070 and second printed film layer 2071 is coupled to insulative cellular non-aromatic polymeric material 2082 by a polymeric-lamination layer 2054. Each printed film layer 2070, 2071 includes an ink layer 2066 and a film layer 2056. Illustratively, multi-layer sheet 2080 has a first outer surface 2106 and a second outer surface 2108, either of which may form an exterior of cup 10.

In some embodiments, multi-layer sheet 80 has a puncture resistance, as measured in max load for either a ¼" probe or a ⅛" probe. In some embodiments, the puncture resistance for multi-layer sheet 80 (max load) is at least about 1,000 gf, at least about 3,000 gf, at least about 6,000 gf, at least about 8,000 gf, at least about 9,000 gf, or at least about 9,500 gf. In some embodiments, the puncture resistance for multi-layer sheet 80 (max load) is less than about 20,000 gf, less than about 18,000 gf, less than about 12,000 gf, or less than about 10,000 gf. In some embodiments, the puncture resistance for multi-layer sheet 80 (max load) is in a range of about 1,000 gf to about 20,000 gf, about 1,000 gf to about 18,000 gf, about 1,000 gf to about 12,000 gf, about 3,000 gf to about 12,000 gf, about 6,000 gf to about 12,000 gf, about 7,000 gf to about 12,000 gf, about 7,000 gf to about 11,000 gf, about 8,000 gf to about 11,000 gf, about 8,000 gf to about 10,000 gf, or about 9,000 gf to about 10,000 gf.

In some embodiments, multi-layer sheet 80 or insulative cellular non-aromatic polymeric material 82 has a thermal conductivity at 21° C. In some embodiments, the thermal conductivity at 21° C. is at least about 0.05 W/m-K or at least about 0.052 W/m-K. In some embodiments, the thermal conductivity at 21° C. is less than about 0.06 W/m-K, less than about 0.057 W/m-K, less than about 0.056 W/m-K, or less than about 0.053 W/m-K. In some embodiments, multi-layer sheet 80 or insulative cellular non-aromatic polymeric material 82 has a thermal conductivity at 21° C. in a range of about 0.05 W/m-K to about 0.06 W/m-K, about 0.05 W/m-K to about 0.059 W/m-K, about 0.052 W/m-K to about 0.059 W/m-K, or about 0.054 W/m-K to about 0.057 W/m-K.

In some embodiments, multi-layer sheet 80 or insulative cellular non-aromatic polymeric material 82 has a thermal conductivity at 93° C. In some embodiments, the thermal conductivity at 93° C. is at least about 0.061 W/m-K or at least about 0.062 W/m-K. In some embodiments, the thermal conductivity at 93° C. is less than about 0.065 W/m-K, less than about 0.064 W/m-K, or less than about 0.0642 W/m-K. In some embodiments, multi-layer sheet 80 or insulative cellular non-aromatic polymeric material 82 has a thermal conductivity at 93° C. in a range of about 0.061 W/m-K to about 0.065 W/m-K, about 0.063 W/m-K to about 0.065 W/m-K, about 0.063 W/m-K to about 0.0645 W/m-K.

In some embodiments, multi-layer sheet 80 or insulative cellular non-aromatic polymeric material 82 was tested using the Elmendorf test method described in ASTM D1922-93. In some embodiments, the Elmendorf Arm machine direction (MD) for the insulative cellular non-aromatic polymeric material 82 is at least about 500 g. In some embodiments, the Elmendorf Arm MD for multi-layer sheet 80 is at least about 1500 g. In some embodiments, the Elmendorf Arm MD for cup 10 is at least about 1500 g. In some embodiments, the Elmendorf Arm TD for insulative cellular non-aromatic polymeric material 82 is at least about 500 g. In some embodiments, the Elmendorf Arm TD for multi-layer sheet 80 is at least about 1500 g. In some embodiments, the Elmendorf Arm TD for cup 10 is at least about 1500 g.

It is within the scope of the present disclosure that the density of the multi-layer sheet be up to about 0.25 g/cm$^3$, up to about 0.2 g/cm$^3$, up to about 0.18 g/cm$^3$, up to about 0.16 g/cm$^3$, up to about 0.14 g/cm$^3$, up to about 0.13 g/cm$^3$, or up to about 0.12 g/cm$^3$. In some embodiments, the density of the multi-layer sheet is less than about 0.2 g/cm$^3$, less than about 0.18 $g/cm^3$, less than about 0.16 $g/cm^3$, less than about 0.15 $g/cm^3$, less than about 0.14 $g/cm^3$, or less than about 0.13 $g/cm^3$. The density of the multi-layer sheet may be about 0.01 $g/cm^3$, about 0.03 $g/cm^3$, about 0.05 $g/cm^3$, about 0.06 $g/cm^3$, about 0.07 $g/cm^3$, about 0.08 $g/cm^3$, about 0.09 $g/cm^3$, about 0.1 $g/cm^3$, about 0.11 $g/cm^3$, about 0.12 $g/cm^3$, about 0.13 $g/cm^3$, about 0.14 $g/cm^3$, about 0.15 $g/cm^3$, about 0.16 $g/cm^3$, about 0.18 $g/cm^3$, about 0.2 $g/cm^3$, or about 0.25 $g/cm^3$. In a set of ranges, the density of the multi-layer sheet is one of the following ranges: about 0.01 $g/cm^3$ to about 0.2 $g/cm^3$, about 0.05 $g/cm^3$ to about 0.19 $g/cm^3$, about 0.05 $g/cm^3$ to about 0.18 $g/cm^3$, about 0.05 $g/cm^3$ to about 0.17 $g/cm^3$, about 0.1 $g/cm^3$ to about 0.17 $g/cm^3$, about 0.11 $g/cm^3$ to about 0.17 $g/cm^3$, or about 0.12 $g/cm^3$ to about 0.16 $g/cm^3$.

In some embodiments, multi-layer sheet 80 or insulative cellular non-aromatic polymeric material 82 was tested using the Elmendorf test method described in ASTM D1922-93. In some embodiments, the Elmendorf Tear MD for the multi-layer sheet 80 or insulative cellular non-aromatic polymeric material 82 is at least about 75 gf. In some embodiments, the Elmendorf Tear MD for the multi-layer sheet 80 or insulative cellular non-aromatic polymeric material 82 is less than about 350 gf. In some embodiments, the Elmendorf Tear MD for the multi-layer sheet 80 is at least about 65 gf. In some embodiments, the Elmendorf Tear MD for multi-layer sheet 80 is less than about 700 gf. In some embodiments, the Elmendorf Tear MD for multi-layer sheet 80 is at least about 125 gf, at least about 200 gf, at least about 300 gf, or at least about 400 gf. In some embodiments, the Elmendorf Tear MD for multi-layer sheet 80 is less than about 700 gf, less than about 600 gf, less than about 500 gf. In some embodiments, the Elmendorf Tear MD for multi-layer sheet 80 is in a range of about 200 gf to about 700 gf, about 200 gf to about 600 gf, about 200 gf to about 500 gf, or about 300 gf to about 500 gf.

In some embodiments, the Elmendorf Tear transverse direction (TD) for multi-layer sheet 80 is at least about 10 gf, at least about 50 gf, or at least about 125 gf. In some embodiments, the Elmendorf Tear TD for insulative cellular non-aromatic polymeric material 82 is less than about 450 gf. In some embodiments, the Elmendorf Tear TD for multi-layer sheet 80 is at least about 65 gf, at least about 100 gf, or at least about 200 gf. In some embodiments, the Elmendorf Tear TD for multi-layer sheet 80 is less than about 600 gf. In some embodiments, the Elmendorf Tear TD for multi-layer sheet 80 is at least about 200 gf, at least about 300 gf, or at least about 400 gf. In some embodiments, the Elmendorf Tear TD for multi-layer sheet 80 is less than about 700 gf, less than about 650 gf, or less than about 550 gf. In some embodiments, the Elmendorf Tear TD of cup 10 is about 200 gf to about 700 gf, about 200 gf to about 600 gf, or about 300 gf to about 600 gf.

Insulative cellular non-aromatic polymeric material 82 is configured in accordance with the present disclosure to provide means for enabling localized plastic deformation in at least one selected region of body 11 (e.g., side wall 18, rolled brim 16, floor mount, and a floor-retaining flange included in floor mount to provide (1) a plastically deformed first material segment having a first density in a first portion of the selected region of body 11 and (2) a second material segment having a relatively lower second density in an adjacent second portion of the selected region of body 11. In illustrative embodiments, the first material segment is thinner than the second material segment.

One aspect of the present disclosure provides a formulation for manufacturing an insulative cellular non-aromatic polymeric material 82. As referred to herein, an insulative cellular non-aromatic polymeric material 82 refers to an extruded structure having cells formed therein and has desirable insulative properties at given thicknesses. Another aspect of the present disclosure provides a polymeric formulation for manufacturing an extruded structure of insulative cellular non-aromatic polymeric material. Still another aspect of the present disclosure provides an extrudate comprising an insulative cellular non-aromatic polymeric material. A further aspect of the present invention provides multi-layer sheet 80 comprising insulative cellular non-aromatic polymeric material 82.

Illustratively, each of insulative cellular non-aromatic polymeric material 82, polymeric-lamination layer 54, and film layer 56 comprise a polymeric material. The polymeric material for each of insulative cellular non-aromatic polymeric material 82, polymeric-lamination layer 54, and film layer 56 can be made, for example, by extruding a formulation. It should be understood that many of the ranges described herein for the formulation apply with equal weight to the extruded polymeric material, except that in some examples the chemical nucleating agent will decompose upon heating. The decomposition of the chemical nucleating agent could cause the relative weight percentages of the remaining components to increase slightly.

As an example, a polymeric formulation for forming insulative cellular non-aromatic polymeric material 82 comprises a base resin blend comprising at least one high melt strength polypropylene and a polypropylene copolymer or homopolymer (or both). In some embodiments, the formulation may comprise cell-forming agents including a chemical nucleating agent, a physical nucleating agent, a physical blowing agent such as carbon dioxide, or a combination thereof. As a further example, insulative cellular non-aromatic polymeric material 82 further comprises a slip agent. As an example, at least one polypropylene resin may have a broadly distributed unimodal (not bimodal) molecular weight distribution.

A material-forming process uses a polymeric formulation in accordance with the present disclosure to produce a strip 82 of insulative cellular non-aromatic polymeric material as shown in FIGS. 1, 3, and 4. In some embodiments, the formulation is heated and extruded in two stages to produce a tubular extrudate 124 that can be slit to provide strip 82 of insulative cellular non-aromatic polymeric material, sometimes called a web, as illustrated, for example, in FIG. 4. A blowing agent in the form of a liquefied inert gas may be introduced into a molten resin as suggested in FIG. 4.

In exemplary embodiments, a polymeric formulation comprises a base resin blend comprising at least two materials. In some embodiments, the base resin blend comprises a first polymer and a second polymer. In some embodiments, the first polymer is a polypropylene. In some embodiments, the second polymer is a polypropylene. In some embodiments, the first polymer is a polypropylene and the second polymer is a polypropylene. In one exemplary embodiment, a first or second polypropylene polymer comprises a high melt strength polypropylene that has long chain branching. In one exemplary embodiment, the first or second polypropylene polymer also has non-uniform dispersity. In some embodiments, the first polypropylene polymer is a polypropylene homopolymer. In some embodiments, the second polypropylene is a polypropylene homopolymer. In some embodiments, the base resin blend comprises a first polypropylene homopolymer and a second polypropylene homopolymer.

In some embodiments, the base resin blend further comprises a third material. In some embodiments, the base resin blend comprises at least two high melt-strength polypropylenes. In some embodiments, the base resin blend comprises a first high melt-strength polypropylene, a second high melt-strength polypropylene, and a polypropylene copolymer. In some embodiments, the polypropylene copolymer is a high-crystallinity copolymer. In some embodiments, the first high melt-strength polypropylene is Amppleo® 1025MA from Braskem. In some embodiments, the second high melt-strength polypropylene is MFX6 from JPP. In some embodiments, the polypropylene copolymer is TI215OC available from Braskem.

Some illustrative examples of high melt strength polypropylene have long chain branching. Illustratively, long chain branching occurs by the replacement of a substituent, e.g., a hydrogen atom, on a monomer subunit, by another covalently bonded chain of that polymer, or, in the case of a graft copolymer, by a chain of another type. For example, chain transfer reactions during polymerization could cause branching of the polymer. Long chain branching is branching with side polymer chain lengths longer than the average critical entanglement distance of a linear polymer chain. Long chain branching is generally understood to include polymer chains with at least 20 carbon atoms depending on specific monomer structure used for polymerization. Another example of branching is by crosslinking of the polymer after polymerization is complete. Some long chain branch polymers are formed without crosslinking Polymer chain branching can have a significant impact on material properties. Originally known as the polydispersity index, dispersity is the measured term used to characterize the degree of polymerization. For example, free radical polymerization produces free radical monomer subunits that attach to other free radical monomers subunits to produce distributions of polymer chain lengths and polymer chain weights. Different types of polymerization reactions such as living polymerization, step polymerization, and free radical polymerization produce different dispersity values due to specific reaction mechanisms. Dispersity is determined as the ratio of weight average molecular weight to number average molecular weight. Uniform dispersity is generally understood to be a value near or equal to 1. Non-uniform dispersity is generally understood to be a value greater than 2. Final selection of a polypropylene material may take into account the properties of the end material, the additional materials needed during formulation, as well as the conditions during the extrusion process. In exemplary embodiments, high melt strength polypropylenes may be materials that can hold a gas (as discussed hereinbelow), produce desirable cell size, have desirable surface smoothness, and have an acceptable odor level (if any).

Another illustrative example of a suitable polypropylene that may be included in the base resin blend is DAPLOY™ WB140 homopolymer (available from Borealis A/S), a high melt strength structural isomeric modified polypropylene homopolymer (melt strength=36 cN, as tested per ISO 16790, which is incorporated by reference herein, melting temperature=325.4° F. (163° C.) using ISO 11357, which is incorporated by reference herein).

Borealis DAPLOY™ WB140 properties (as described in a Borealis product brochure):

| Property | Typical Value | Unit | Test Method |
|---|---|---|---|
| Melt Flow Rate (230/2.16) | 2.1 | g/10 min | ISO 1133 |
| Flexural Modulus | 1900 | MPa | ISO 178 |
| Tensile Strength at Yield | 40 | MPa | ISO 527-2 |
| Elongation at Yield | 6 | % | ISO 527-2 |
| Tensile Modulus | 2000 | MPa | ISO 527-2 |
| Charpy impact strength, notched (+23° C.) | 3.0 | $kJ/m^2$ | ISO 179/1eA |
| Charpy impact strength, notched (−20° C.) | 1.0 | $kJ/m^2$ | ISO 179/1eA |
| Heat Deflection Temperature A (at 1.8 MPa load) | 60 | ° C. | ISO 75-2 Method A |
| Heat Deflection Temperature B (at 0.46 MPa load) | 110 | ° C. | ISO 75-2 Method B |

Other polypropylene polymers having suitable melt strength, branching, and melting temperature may also be used. Several base resins may be used and mixed together.

In some embodiments, the base resin blend comprises a polymer that may be, for example, a polymer with sufficient crystallinity. The polymer may also be, for example, a polymer with sufficient crystallinity and melt strength. In exemplary embodiments, the polymer may be at least one crystalline polypropylene homopolymer, a crystalline polypropylene copolymer, an impact polypropylene copolymer, mixtures thereof, or the like. One illustrative example is a high crystalline polypropylene homopolymer, available as F020HC from Braskem. Another illustrative example is an impact polypropylene copolymer commercially available as PRO-FAX SC204™ (available from LyondellBasell Industries Holdings, B.V.). Another illustrative example is Homo PP—INSPIRE 222, available from Braskem. Another illustrative example is the commercially available polymer known as PP 527K, available from Sabic. Another illustrative example is a polymer commercially available as XA-11477-48-1 from LyondellBasell Industries Holdings, B.V. Another illustrative example is TI215OC from Braskem. In one aspect the polypropylene polymer may have a high degree of crystallinity, i.e., the content of the crystalline phase exceeds 51% (as tested using differential scanning calorimetry) at 10° C./min cooling rate. In exemplary embodiments, several different polymers may be used and mixed together.

In some exemplary embodiments, the base resin blend may comprise polyethylene. In exemplary embodiments, the base resin blend may comprise low-density polyethylene, linear low-density polyethylene, high-density polyethylene, ethylene-vinyl acetate copolymers, ethylene-ethylacrylate copolymers, ethylene-acrylic acid copolymers, polymethylmethacrylate mixtures of at least two of the foregoing and the like. The use of non-polypropylene materials may affect recyclability, insulation, microwavability, impact resistance, or other properties, as discussed further hereinbelow.

It is within the scope of the present disclosure to select an amount of base resin blend of the polymeric formulation to be one of the following values: about 40%, about 45%, about 50%, about 55%, about 60%, about 65%, about 70%, about 75%, about 80%, about 85%, about 86%, about 87%, about 88%, about 89%, about 90%, about 91%, about 92%, about 93%, about 94%, about 95%, about 96%, about 97%, about 98%, about 99%, about 99.5%, and about 99.9% by weight of the polymeric formulation. It is within the present disclosure for the amount of base resin blend in the polymeric formulation to fall within one of many different ranges. In a first set of ranges, the range of base resin blend of the polymeric formulation is one of the following ranges: about 40% to about 99.9%, about 70% to about 99.9%, about 80% to about 99.9%, about 85% to about 99.9%, about 90% to about 99.9%, about 95% to about 99.9%, about 98% to about 99.9%, and about 99% to about 99.9% by weight of the polymeric formulation. In a second set of ranges, the range of base resin blend in the polymeric formulation is one of the following ranges: about 85% to about 99%, about 85% to about 98%, about 85% to about 95%, and about 85% to about 90% by weight of the polymeric formulation. In a third set of ranges, the range of base resin blend of the polymeric formulation is one of the following ranges: about 40% to about 99%, about 40% to about 95%, about 40% to about 85%, about 45% to about 85%, about 40% to about 80%, about 50% to about 80%, about 55% to about 80%, and about 60% to about 80% by weight of the polymeric formulation. Each of these values and ranges is embodied in the Examples. As defined hereinbefore, the base resin blend may comprise any suitable polymeric material. In addition, the ranges disclosed herein for the formulation apply with equal weight to the ranges for the polymeric material.

In illustrative embodiments, the base resin blend comprises a polypropylene. In some embodiments, the base resin blend comprises a first polymer and a second polymer. In some embodiments, the base resin blend comprises a first polymer, a second polymer, and a third polymer. In some embodiments, the first polymer is a first polypropylene. In some embodiments, the polypropylene is a first polypropylene homopolymer. In some embodiments, the first polypropylene homopolymer is DAPLOY™ WB140 homopolymer (available from Borealis A/S). In some embodiments, the first polypropylene homopolymer is Braskem Amppleo® 1025 MA. It is within the scope of the present disclosure to select an amount of the first polymer of the base resin blend to be one of the following values: about 30%, about 35%, about 40%, about 41%, about 42%, about 43%, about 44%, about 45%, about 50%, about 50%, about 55%, about 60%, about 65%, about 70%, about 75%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, or about 99% by weight of the base resin blend. It is within the present disclosure for the amount of the first polymer of the base resin blend to fall within one of many different ranges. In a first set of ranges, the range of first polymer in the base resin blend is one of the following ranges: about 30% to about 99%, about 40% to about 99%, about 50% to about 99%, about 60% to about 99%, about 70% to about 99%, about 80% to about 99%, or about 85% to about 99.9% by weight of the base resin blend. In a second set of ranges, the range of first polymer in the base resin blend is one of the following ranges: about 40% to about 97%, about 40% to about 95%, about 40% to about 92%, or about 40% to about 90% by weight of the base resin blend. In a third set of ranges, the range of first polymer in the base resin blend is one of the following ranges: about 40% to about 95%, about 40% to about 90%, about 40% to about 80%, about 40% to about 70%, about 45% to about 70%, about 45% to about 60%, about 50% to about 95%, about 60% to about 95%, about 65% to about 95%, about 65% to about 92%, about 70% to about 92%, about 75% to about 92%, or about 80% to about 92% by weight of the base resin blend.

In illustrative embodiments, the base resin blend includes a second polymer. In some embodiments, the second polymer is a polyethylene. In some embodiments, the second polymer is a polypropylene. In some embodiments, the second polypropylene is a second polypropylene homopolymer. In some embodiments, the second polypropylene is a second polypropylene copolymer. In some embodiments, the second polypropylene is a second high melt-strength polypropylene. It is within the scope of the present disclosure to select an amount of the second polymer of the base resin blend to be one of the following values: about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, about 35%, about 36%, about 37%, about 38%, about 39%, about 40%, about 41%, about 42%, about 43%, about 44%, about 45%, about 50%, or about 60% by weight of the base resin blend. It is within the present disclosure for an amount of the second polymer of the base resin blend to fall within one of many different ranges. In a first set of ranges, the range of base resin is one of the following ranges: about 1% to about 60%, about 1% to about 50%, about 1% to about 40%, about 1% to about 30%, about 1% to about 25%, about 1% to about 20%, about 1% to about 15%, about 1% to about 10%, or about 1% to about 5% by weight of the base resin blend. In a second set of ranges, the range of the second polymer of the base resin blend is one of the following ranges: about 1% to about 50%, about 10% to about 60%, about 15% to about 60%, about 20% to about 60%, about 30% to about 60%, about 35% to about 60%, or about 40% to about 60% by weight of the base resin blend. In a third set of ranges, the range of second polymer of the base resin blend is one of the following ranges: about 2% to about 60%, about 2% to about 50%, about 10% to about 50%, about 15% to about 50%, about 20% to about 50%, about 25% to about 50%, about 25% to about 45%, about 2% to about 40%, about 2% to about 30%, about 4% to about 30%, about 4% to about 25%, about 4% to about 20%, about 5% to about 20%, about 5% to about 20%, or about 5% to about 15% by weight of the base resin blend. In an embodiment, the base resin blend lacks a second polymer. In a particular embodiment, a second polypropylene can be a high crystalline polypropylene homopolymer, such as F020HC (available from Braskem) or PP 527K (available from Sabic). In some embodiments, the second polypropylene is MFX6 available from JPP. In an embodiment, a polymeric material lacks a secondary polymer.

In illustrative embodiments, the base resin blend includes a third polymer. In some embodiments, the third polymer is a polyethylene. In some embodiments, the third polymer is a polypropylene. In some embodiments, the third polypropylene is a polypropylene homopolymer. In some embodiments, the third polypropylene is a polypropylene copolymer. In some embodiments, the third polypropylene is a high crystallinity polypropylene copolymer. It is within the scope of the present disclosure to select an amount of the third polymer of the base resin blend to be one of the following values: about 1%, about 2%, about 3%, about 4%, about 5%, about 6%, about 7%, about 8%, about 9%, about 10%, about 11%, about 12%, about 13%, about 14%, about 15%, about 20%, about 25%, about 30%, or about 35% by weight of the base resin blend. It is within the present disclosure for an amount of the third polymer of the base resin blend to fall within one of many different ranges. In a first set of ranges, the range of base resin is one of the following ranges: about 1% to about 35%, about 1% to about 30%, about 1% to about 25%, about 1% to about 20%, about 1% to about 15%, about 1% to about 10%, or about 1% to about 8% by weight of the base resin blend. In a second set of ranges, the range of the third polymer of the base resin blend is one of the following ranges: about 2% to about 35%, about 3% to about 35%, about 4% to about 35%, about 5% to about 35%, about 6% to about 35%, about 7% to about 35%, or about 8% to about 35% by weight of the base resin blend. In a third set of ranges, the range of third polymer of the base resin blend is one of the following ranges: about 1% to about 25%, about 2% to about 25%, about 2% to about 20%, about 3% to about 20%, about 4% to about 20%, about 4% to about 15%, about 5% to about 15%, or about 5% to about 10% by weight of the base resin blend. In an embodiment, the base resin blend lacks a third polymer. In a particular embodiment, the third polymer can be a high crystalline polypropylene. In some embodiments, the high crystalline homopolymer is F020HC (available from Braskem) or PP 527K (available from Sabic). In some embodiments, the high crystalline polypropylene is a copolymer, such as TI215OC from Braskem.

In some embodiments, the polymeric formulation comprises regrind. Regrind may be formed by recovering the excess material, sometimes called a blank-carrier sheet 94, produced during a blank forming step 500, as shown in FIGS. 1 and 6. Regrind can be processed during a regrinding step 800 that grinds blank-carrier sheet 94 and forms pellets 97. In some embodiments, regrind is formed according to regrinding process 800 as shown in FIG. 9. In some illustrative embodiments, regrind may comprise material obtained from insulative cellular non-aromatic polymeric material 82, polymeric-lamination layer 54, printed film layer 70, multi-layer sheet 80, cup bottom 20, or mixtures thereof. In some embodiments, pellets 97 can be melted and re-pelletized prior to being added to a polymeric formulation.

In some embodiments, regrind comprises ink. In some embodiments, the ink is from ink layer 66. In some embodiments, regrind is substantially free of ink. In some embodiments, the regrind comprises polypropylene, polyethylene, a physical nucleating agent, a slip agent, or a combination thereof. Illustratively, regrind is substantially free of an adhesive. In some embodiments, regrind is substantially free of an epoxy. In some embodiments, regrind comprises polypropylene, polyethylene, and bi-axially oriented polypropylene (BOPP).

As described above, in some embodiments, regrind is substantially free of an adhesive. Illustratively, adhesives may present issues when included in regrind used in materials that contact food products. Illustrative adhesives include epoxies, urethanes, acrylates, maleimides or any suitable alternative. In some embodiments, regrind substantially free of an adhesive may be reincorporated back into insulative cellular non-aromatic polymeric material 82. Accordingly, the process as suggested in FIG. 1 can couple printed film layer 56 to insulative cellular non-aromatic polymeric material 82 without using such an adhesive.

It was also surprisingly found that including regrind into the formulation for insulative cellular non-aromatic polymeric material 82 had minimal negative effects on performance. As shown below in the Examples, regrind has lower melt strength that virgin resin. In particular, regrind had an average load at break of less than about 0.1 N. In some embodiments, the average load at break of the regrind may be less than 0.3 N, less than about 0.2 N, or less than about 0.1 N. In contrast, the tested virgin materials had an average load at break of at least 0.4 N. In some embodiments, the virgin materials may have an average load at break of at least 0.35 N, at least about 0.4 N, or at least about 0.45 N. Illustratively, a ratio of the average load at break for the virgin material compared to the regrind may be at about 1:1, about 2:1, about 3:1, about 4:1, or about 5:1. Accordingly, maintaining the properties of the foam when substituting regrind for virgin resin allows for improved efficiency and minimizes waste.

It is within the scope of the present disclosure to select an amount of regrind to be up to about 5%, up to about 10%, up to about 15%, up to about 20%, up to about 25%, up to about 30%, up to about 35%, up to about 40%, up to about 45%, up to about 50%, up to about 55%, up to about 60%, up to about 65%, up to about 75%, up to about 85%, or up to about 95% by weight of the polymeric formulation. The percentage by weight of regrind in the polymeric formulation may be about 0%, about 0.5%, about 1%, about 3%, about 4%, about 5%, about 7%, about 10%, about 15%, about 20%, about 21%, about 22%, about 23%, about 24%, about 25%, about 30%, about 35%, about 40%, about 45%, about 50%, about 55%, about 60%, about 65%, about 70%, about 75%, about 80%, about 85%, about 90%, or about 95% by weight of the polymeric formulation. In a first set of ranges, the range of a regrind in the polymeric formulation is one of the following ranges: about 0.5% to about 95%, about 3% to about 95%, about 5% to about 95%, about 10% to about 95%, about 15% to about 95%, about 20% to about 95%, about 25% to about 95%, about 30% to about 40% to about 95%, about 50% to about 95%, about 60% to about 95%, about 75% to about 95%, or about 85% to about 95% by weight of the polymeric formulation. In a second set of ranges, the range of regrind in the polymeric formulation is one of the following ranges: about 0.5% to about 90%, about 0.5% to about 85%, about 0.5% to about 75%, about 0.5% to about 60%, about 0.5% to about 50%, about 0.5% to about 45%, about 0.5% to about 40%, about 0.5% to about 35%, about 0.5% to about 30%, about 0.5% to about 25%, about 0.5% to about 20%, about 0.5% to about 15%, or about 0.5% to about 10% by weight of the polymeric formulation. In a third set of ranges, the range of regrind in the polymeric formulation is one of the following ranges: about 1% to about 90%, about 1% to about 85%, about 1% to about 75%, about 1% to about 50%, about 3% to about 50%, about 3% to about 45%, about 5% to about 45%, about 5% to about 40%, about 5% to about 35%, about 10% to about 40%, about 10% to about 35%, about 10% to about 45%, about 20% to about 45%, about 5% to about 40%, about 5% to about 30%, about 15% to about 30%, about 15% to about 25%, or about 30% to about 40% by weight of the polymeric formulation.

In some embodiments, one or more nucleating agents are used to provide and control nucleation sites to promote the formation of cells, bubbles, or voids in the molten resin during the extrusion process. A nucleating agent can be a chemical or physical material that provides sites, i.e., nucleation sites, for cells to form in a molten resin mixture. Nucleating agents may be physical agents or chemical agents. When a suitable temperature is reached, the nucleating agent acts to enable the formation of gas bubbles that create cells in the molten resin. In some embodiments, the polymeric formulation lacks a nucleating agent. In some embodiments, the polymeric formulation does not include a chemical nucleating agent, a physical nucleating agent, or both.

Suitable physical nucleating agents have a desirable particle size, aspect ratio, top-cut properties, shape, and surface compatibility. Examples include, but are not limited to, talc, $CaCO_3$, mica, kaolin clay, chitin, aluminosilicates, graphite, cellulose, and mixtures of at least two of the foregoing. The nucleating agent may be blended with the base resin blend that is introduced into hopper 113. Alternatively, the nucleating agent may be added to the molten resin mixture in an extruder 111, 111A, 111B.

After decomposition, the chemical nucleating agent forms small gas cells, which further serve as nucleation sites for larger cell growth from physical blowing agents or other types thereof. An illustrative example of a chemical nucleating agent is citric acid or a citric acid-based material. One representative example is Hydrocerol® CF-40E™ (available from Clariant Corporation), which contains citric acid and a crystal nucleating agent. Another representative example is Hydrocerol® CF-05E™ (available from Clariant Corporation), which contains citric acid and a crystal nucleating agent. In illustrative embodiments, one or more catalysts or other reactants may be added to accelerate or facilitate the formation of cells.

As described herein, the polymeric formulation may comprise a physical nucleating agent, a chemical nucleating agent, or both. In some embodiments, the nucleating agent is up to about 1%, up to about 3%, up to about 5%, up to about 7%, or up to about 10% by weight of the polymeric formulation. It is within the scope of the present disclosure to select an amount of a nucleating agent to be one of the following values: about 0%, about 0.5%, about 1%, about 1.5%, about 2%, about 2.5%, about 3%, about 4%, and about 5%, about 6%, about 7%, about 8%, about 9%, about 10%, about 12%, or about 14% by weight of the total formulation of the polymeric layer. It is also within the scope of the present disclosure for the weight percentage (w/w) of a nucleating agent to fall within one of many different ranges. In a first set of ranges, the weight percentage of a nucleating agent is one of the following ranges: about 0.1% to about 20% (w/w), about 0.25% to about 20%, about 0.5% to about 20%, about 0.75% to about 20%, about 1% to about 20%, about 1.5% to about 20%, about 2% to about 20%, about 2.5% to about 20%, about 3% to about 20%, about 4% to about 20%, about 4.5% to about 20%, and about 5% to about 20%. In a second set of ranges, the range of a nucleating agent is one of the following ranges: about 0.1% to about 10%, about 0.25% to about 10%, about 0.5% to about 10%, about 0.75% to about 10%, about 1% to about 10%, about 1.5% to about 10%, about 2% to about 10%, about 3% to about 10%, about 4% to about 10%, and about 5% to about 10% of the total formulation of the polymeric layer by weight percentage. In a third set of ranges, the range of a nucleating agent is one of the following ranges: about 0.1% to about 5%, about 0.25% to about 5%, about 0.5% to about 5%, about 0.75% to about 5%, about 1% to about 5%, about 1.5% to about 5%, about 2% to about 5%, about 2.5% to about 5%, about 3% to about 5%, about 3.5% to about 5%, about 4% to about 5%, and about 4.5% to about 5% of the total formulation of the polymeric layer by weight percentage. The nucleating agent may be up to about 5%, up to about 10%, up to about 15%, up to about 20% by weight of the polymeric formulation. In an embodiment, the polymeric formulation lacks a nucleating agent.

In certain exemplary embodiments, one or more blowing agents may be incorporated. Blowing agent may be either a physical or a chemical material (or a combination of materials) that acts to expand nucleation sites. Illustratively, nucleating agents and blowing agents may work together to control the size and or quality of the formed cell. The blowing agent acts to reduce density by forming cells in the molten resin. The blowing agent may be added to the molten resin mixture in an extruder through a physical blowing agent port.

In exemplary embodiments, physical blowing agents are typically gasses that are introduced as liquids under pressure into the molten resin via a port in the extruder as suggested in FIG. 4. As the molten resin passes through the extruder and the die head, the pressure drops causing the physical blowing agent to change phase from a liquid to a gas, thereby creating cells in the extruded resin. Excess gas blows off after extrusion with the remaining gas being trapped in the cells in the extrudate.

Illustrative physical blowing agents include agents that are gasses. Representative examples of physical blowing agents include, but are not limited to, carbon dioxide, nitrogen, helium, argon, air, water vapor, pentane, butane, other alkane mixtures of the foregoing and the like. In some embodiments, a physical blowing agent can be selected from the group consisting of carbon dioxide, nitrogen, helium, argon, methane, pentane, butane, ethane, propane, n-butane, isobutene, n-pentane, isopentane, neopentane, methyl fluoride, perfluoromethane, ethyl fluoride, 1,1-difluoroethane, 1,1,1-trifluoroethane, 1,1,1,2-tetrafluoro-ethane, pentafluoroethane, perfluoroethane, 2,2-difluoropropane, 1,1,1-trifluoropropane, perfluoropropane, perfluorobutane, perfluorocyclobutane, methyl chloride, methylene chloride, ethyl chloride, 1,1,1-trichloroethane, 1,1-dichloro-1-fluoroethane, 1-chloro-1,1-difluoroethane, 1,1-dichloro-2,2,2-trifluoroethane, 1-chloro-1,2,2,2-tetrafluoroethane, trichloromonofluoromethane, dichlorodifluoromethane, trichlorotrifluoroethane, dichlorotetrafluoroethane, chloroheptafluoropropane, dichlorohexafluoropropane, methanol, ethanol, n-propanol, and isopropanol. In certain exemplary embodiments, a processing aid may be added to the formulation to enhance the solubility of the physical blowing agent. Alternatively, the physical blowing agent may be a hydrofluorocarbon, such as 1,1,1,2-tetrafluoroethane, also known as R134a, a hydrofluoroolefin, such as, but not limited to, 1,3,3,3-tetrafluoropropene, also known as HFO-1234ze, or other haloalkane or haloalkane refrigerant. Selection of the blowing agent may be made to consider environmental impact.

One example of a physical blowing agent is nitrogen ($N_2$). The $N_2$ is pumped as a supercritical fluid into the molten formulation via a port in the extruder. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like.

In an illustrative example, a physical blowing agent may be introduced at a rate of about 0.02 pounds per hour (lbs/h) to about 1.3 (lbs/h). In another illustrative example, the physical blowing agent may be introduced at a rate of about 0.03(lbs/h) to about 1.25 (lbs/h). In another illustrative example, the physical blowing agent may be introduced at a rate of about 0.02(lbs/h) to about 0.15 (lbs/h). In another illustrative example, the physical blowing agent may be introduced at a rate of about 0 (lbs/h) to about 0.15 (lbs/h). In another illustrative example, the physical blowing agent may be introduced at a rate of about 0.02 (lbs/h) to about 0.22 (lbs/h). In another illustrative example, the physical blowing agent may be introduced at a rate of about 0.02 (lbs/h) to about 0.25 (lbs/h). In still yet another illustrative example the physical blowing agent may be introduced at a rate of about 0.07 (lbs/h) to about 0.27 (lbs/h). In some embodiments, the physical blowing agent is used between about 0.01 lbs/h to about 0.2 lbs/h, about 0.01 lbs/h to about 0.17 lbs/h, about 0.01 lbs/h to about 0.15 lbs/h, about 0.01 lbs/h to about 0.1 lbs/h, about 0.05 lbs/h to about 0.2 lbs/h, about 0.05 lbs/h to about 0.17 lbs/h, about 0.05 lbs/h to about 0.15 lbs/h, about 0.05 lbs/h to about 0.1 lbs/h, about 0.1 lbs/h to about 0.2 lbs/h, about 0.1 lbs/h to about 0.17 lbs/h, or about 0.1 lbs/h to about 0.15 lbs/h.

In further embodiments, the physical blowing agent is measured in saturation percentage (%). In exemplary embodiments, physical blowing agent saturation can have a range that is about 0.1% to about 0.4%, about 0.1% to about 0.35%, about 0.1% to about 0.3%, about 0.1% to about 0.25%, 0.15% to about 0.4%, about 0.15% to about 0.35%, about 0.15% to about 0.3%, about 0.15% to about 0.25%, 0.2% to about 0.4%, about 0.2% to about 0.35%, about 0.2% to about 0.3%, or about 0.2% to about 0.25%.

Chemical blowing agents are materials that degrade or react to produce a gas. Chemical blowing agents may be endothermic or exothermic. Chemical blowing agents typically degrade at a certain temperature to decompose and release gas. In one aspect the chemical blowing agent may be one or more materials selected from the group consisting of azodicarbonamide, azodiisobutyro-nitrile, benzenesulfonyl hydrazide, 4,4-oxybenzene sulfonylsemicarbazide, p-toluene sulfonyl semi-carbazide, barium azodicarboxylate, N,N'-dimethyl-N,N'-dinitrosoterephthalamide, trihydrazino triazine, sodium bicarbonate, sodium carbonate, ammonium bicarbonate, ammonium carbonate, ammonium nitrite, N,N'-dinitrosopentamethylene tetramine, azobisisobutylonitrile, azocyclohexylnitrile, azodiaminobenzene, toluene sulfonyl hydrazide, p,p' -oxybis(benzene sulfonyl hydrazide), diphenyl sulfone-3,3'-disulfonyl hydrazide, calcium azide, 4,4'-diphenyl disulfonyl azide, and p-toluene sulfonyl azide. In some embodiments, the chemical blowing agent is Hydrocerol™ CF®-40E available from Clariant. In some embodiments, the chemical blowing agent is Ecocell® P available from the Polyfil Corporation.

The amount of a chemical blowing agent may be one of several different values or fall within one of several different ranges. It is within the scope of the present disclosure to select an amount of a chemical blowing agent to be one of the following values: about 0%, about 0.1%, about 0.2%, about 0.3%, about 0.4%, about 0.5%, about 0.75%, about 1%, about 1.5%, or about 2% of the total formulation of the polymeric layer by weight percentage. It is within the scope of the present disclosure for the amount of a chemical blowing agent in the formulation to fall within one of many different ranges. In a first set of ranges, the range of a chemical blowing agent is one of the following ranges: about 0% to about 5%, about 0.1% to about 5%, about 0.25% to about 5%, about 0.5% to about 5%, about 0.75% to about 5%, about 1% to about 5%, about 1.5% to about 5%, about 2% to about 5%, about 3% to about 5%, and about 4% to about 5% of the total formulation of the polymeric layer by weight percentage. In a second set of ranges, the range of a chemical blowing agent is one of the following ranges: about 0.1% to about 4%, about 0.1% to about 3%, about 0.1% to about 2%, and about 0.1% to about 1% of the total formulation by weight percentage. In a third set of ranges, the range of a chemical blowing agent is one of the following ranges: about 0.25% to about 4%, about 0.75% to about 4%, about 1% to about 4%, about 1.5% to about 4%, about 2% to about 4%, about 3% to about 4%, about 0% to about 3%, about 0.25% to about 3%, about 0.5% to about 3%, about 0.75% to about 3%, about 1% to about 3%, about 1.5%, to about 3%, about 2% to about 3%, about 0% to about 2%, about 0.25% to about 2%, about 0.5%, to about 2%, about 0.75% to about 2%, about 1% to about 2%, about 1.5% to about 2%, about 0% to about 1%, about 0.5% to about 1%, and about 0.75% to about 1% of the total formulation of the polymeric layer by weight percentage. In one aspect of the present disclosure, where a chemical blowing agent is used, the chemical blowing agent may be introduced into the material formulation that is added to the hopper.

In one aspect of the present disclosure, the chemical blowing agent may be a decomposable material that forms a gas upon decomposition. A representative example of such a material is citric acid or a citric-acid based material. In one exemplary aspect of the present disclosure, it may be possible to use a mixture of physical and chemical blowing agents.

In one aspect of the present disclosure, at least one slip agent may be incorporated into the resin mixture to aid in increasing production rates. Slip agent (also known as a process aid) is a term used to describe a general class of materials, which are added to a resin mixture and provide surface lubrication to the polymer during and after conversion. Slip agents may also reduce or eliminate die drool. Representative examples of slip agent materials include amides of fats or fatty acids, such as, but not limited to, erucamide and oleamide. In one exemplary aspect, amides from oleyl (single unsaturated $C_{18}$) through erucyl ($C_{22}$ single unsaturated) may be used. Other representative examples of slip agent materials include low molecular weight amides and fluoroelastomers. Combinations of two or more slip agents can be used. Slip agents may be provided in a master batch pellet form and blended with the resin formulation. One example of a slip agent that is commercially available as AMPACET™ 102109 Slip PE MB. Another example of a slip agent that is commercially available is AMAPACET™ 102823 Process Aid PE MB. In some embodiments, the insulative cellular non-aromatic polymeric material lacks a process aid.

The amount of a slip agent may be one of several different values or fall within one of several different ranges. It is within the scope of the present disclosure to select an amount of a slip agent to be one of the following values: about 0%, about 0.1%, about 0.2%, about 0.3%, about 0.4%, about 0.5%, 1%, about 2%, about 3%, about 4%, about 5%, about 6%, about 7%, about 8%, about 9%, or about 10% of the total formulation of the polymeric layer by weight percentage. It is within the scope of the present disclosure for the amount of a slip agent in the formulation to fall within one of many different ranges. In a first set of ranges, the range of a slip agent is one of the following ranges: about 0% to about 10% (w/w), about 0.1% to about 50%, about 0.3% to about 10%, about 0.5% to about 10%, about 1% to about 10%, about 2% to about 10%, about 3% to about 10%, about 4% to about 10%, about 5% to about 10%, about 6% to about 10%, about 7% to about 10%, about 8% to about 10%, and about 9% to about 10% of the total formulation of the polymeric layer by weight percentage. In a second set of ranges, the range of a slip agent is one of the following ranges: about 0% to about 9%, about 0% to about 8%, about 0% to about 7%, about 0% to about 6%, about 0% to about 5%, about 0% to about 4%, about 0% to about 3%, about 0% to about 2%, about 0% to about 1%, and about 0% to about 0.5% of the total formulation of the polymeric layer by weight percentage. In a third set of ranges, the range of a slip agent is one of the following ranges: about 0.1% to about 5%, about 0.1% to about 3%, about 0.1% to about 2%, about 0.1% to about 1%, about 0.1% to about 0.5%, about 0.5% to about 5%, about 0.5% to about 4%, about 0.5% to about 3%, about 0.5%, to about 2%, about 1% to about 2%, about 1% to about 3%, about 1% to about 4%, about 1% to about 5%, about 2% to about 3%, about 2% to about 4%, and about 2% to about 5% of the total formulation by weight percentage. In an embodiment, the polymeric formulation lacks a slip agent.

One or more additional components and additives optionally may be incorporated, such as, but not limited to, anti-oxidants, impact modifiers, and colorants (such as, but not limited to, titanium dioxide). One example of a commercially available colorant is COLORTECH® blue-white colorant. Another example of a commercially available colorant is COLORTECH® J11 white colorant.

The amount of a colorant may be one of several different values or fall within one of several different ranges. It is within the scope of the present disclosure to select an amount of a colorant to be one of the following values: about 0%, about 0.1%, about 0.5%, about 0.6%, about 0.7%, about 0.8%, about 0.9%, about 1%, about 1.5%, about 2%, about 3%, about 4%, about 5%, about 6%, about 7%, about 8%, about 9%, 1 about 0%, about 15%, or about 20% of the total formulation of the polymeric layer by weight percentage. It is within the scope of the present disclosure for the amount of a colorant in the formulation to fall within one of many different ranges. In a first set of ranges, the range of a colorant is one of the following ranges: about 0% to about 20% (w/w), about 0% to about 10%, about 0% to about 5%, and about 0% to about 4%. In a second set of ranges, the range of a colorant is one of the following ranges: about 0.1% to about 4%, about 0.25% to about 4%, about 0.5% to about 4%, about 0.75% to about 4%, about 1% to about 4%, about 1.5% to about 4%, about 2% to about 4%, about 2.5% to about 4%, and about 3% to about 4% of the total formulation of the polymeric layer by weight percentage. In a third set of ranges, the range of a colorant is one of the following ranges: about 0% to about 3%, about 0% to about 2.5%, about 0% to about 2.25%, about 0% to about 2%, about 0% to about 1.5%, about 0% to about 1%, about 0% to about 0.5%, about 0.1% to about 3.5%, about 0.1% to about 3%, about 0.1% to about 2.5%, about 0.1% to about 2%, about 0.1% to about 1.5%, about 0.1% to about 1%, about 1% to about 5%, about 1% to about 10%, about 1% to about 15%, about 1% to about 20%, and about 0.1% to about 0.5% of the total formulation by weight percentage. In an embodiment, the formulation lacks a colorant.

As described herein, a polymeric formulation, sometimes illustrated as polymeric formulation as in FIGS. 1, 3, and 4 is added to extruder hopper 113. The formulation is heated as it passes through first extrusion zone to become a molten resin that becomes an extrusion mixture. Extrusion mixture passes along machine direction through the second extrusion zone and exits as an extrudate. Illustratively, extrudate is slit by slitter to form an insulative cellular non-aromatic polymeric material strip 82. In some embodiments, a physical blowing agent is introduced through a physical blowing agent port in the first extrusion zone.

The insulative cellular non-aromatic polymeric material that forms insulative cellular non-aromatic polymeric material strip 82 has a density that is generally lower than a non-foamed equivalent material. It is within the scope of the present disclosure that the density of the extruded insulative cellular non-aromatic material be up to about 0.25 g/cm$^3$, up to about 0.2 g/cm$^3$, up to about 0.18 g/cm$^3$, up to about 0.16 g/cm$^3$, up to about 0.14 g/cm$^3$, up to about 0.13 g/cm$^3$, or up to about 0.12 g/cm$^3$. In some embodiments, the density of the polymeric material is less than about 0.2 g/cm$^3$, less than about 0.18 g/cm$^3$, less than about 0.16 g/cm$^3$, less than about 0.15 g/cm$^3$, less than about 0.14 g/cm$^3$, or less than about 0.13 g/cm$^3$. The density of the insulative-cellular non-aromatic polymeric material may be about 0.01 g/cm$^3$, about 0.03 g/cm$^3$, about 0.05 g/cm$^3$, about 0.06 g/cm$^3$, about 0.07 g/cm$^3$, about 0.08 g/cm$^3$, about 0.09 g/cm$^3$, about 0.1 g/cm$^3$, about 0.11 g/cm$^3$, about 0.12 g/cm$^3$, about 0.13 g/cm$^3$, about 0.14 g/cm$^3$, about 0.15 g/cm$^3$, about 0.16 g/cm$^3$, about 0.18 g/cm$^3$, about 0.2 g/cm$^3$, or about 0.25 g/cm$^3$. In a first set of ranges, the density of the insulative cellular non-aromatic polymeric material is one of the following ranges: about 0.01 g/cm$^3$ to about 0.2 g/cm$^3$, about 0.05 g/cm$^3$ to about 0.25 g/cm$^3$, about 0.05 g/cm$^3$ to about 0.2 g/cm$^3$, about 0.05 g/cm$^3$ to about 0.19 g/cm$^3$, about 0.07 g/cm$^3$ to about 0.2 g/cm$^3$, about 0.08 g/cm$^3$ to about 0.2 g/cm$^3$, about 0.09 g/cm$^3$ to about 0.2 g/cm$^3$, about 0.1 g/cm$^3$ to about 0.2 g/cm$^3$, about 0.11 g/cm$^3$ to about 0.2 g/cm$^3$, or about 0.12 g/cm$^3$ to about 0.2 g/cm$^3$. In a second set of ranges, the density of the insulative cellular non-aromatic polymeric material is one of the following ranges: about 0.06 g/cm$^3$ to about 0.25 g/cm$^3$, about 0.06 g/cm$^3$ to about 0.2 g/cm$^3$, about 0.06 g/cm$^3$ to about 0.18 g/cm$^3$, about 0.06 g/cm$^3$ to about 0.16 g/cm$^3$, about 0.06 g/cm$^3$ to about 0.14 g/cm$^3$, or about 0.06 g/cm$^3$ to about 0.12 g/cm$^3$. In a third set of ranges, the density of the insulative cellular non-aromatic polymeric material is one of the following ranges: about 0.05 g/cm$^3$ to about 0.2 g/cm$^3$, about 0.05 g/cm$^3$ to about 0.15 g/cm$^3$, about 0.07 g/cm$^3$ to about 0.15 g/cm$^3$, about 0.09 g/cm$^3$ to about 0.15 g/cm$^3$, about 0.11 g/cm$^3$ to about 0.15 g/cm$^3$, about 0.08 g/cm$^3$ to about 0.2 g/cm$^3$, about 0.08 g/cm$^3$ to about 0.18 g/cm$^3$, about 0.08 g/cm$^3$ to about 0.16 g/cm$^3$, about 0.08 g/cm$^3$ to about 0.14 g/cm$^3$, about 0.09 g/cm$^3$ to about 0.14 g/cm$^3$, about 0.09 g/cm$^3$ to about 0.13 g/cm$^3$, about 0.1 g/cm$^3$ to about 0.14 g/cm$^3$, or about 0.1 g/cm$^3$ to about 0.12 g/cm$^3$.

The insulative cellular non-aromatic polymeric material that forms insulative cellular non-aromatic polymeric material strip 82 has a thickness that is generally greater than a non-foamed equivalent material. It is within the scope of the present disclosure that the thickness of the extruded insulative cellular non-aromatic material be less than about 0.254 centimeter (about 0.1 inches), less than about 0.203 centimeter (about 0.08 inches), less than about 0.178 centimeter (about 0.07 inches), or less than about 0.152 centimeter (about 0.06 inches). In some embodiments, the thickness of the insulative cellular non-aromatic polymeric material is at least 0.0254 centimeter (0.01 inches), at least 0.0762 centimeter (0.03 inches) or higher, or at least 0.102 centimeter (0.04 inches).

Illustratively, the insulative cellular non-aromatic polymeric material is a polymeric material comprising cells. In illustrative embodiments, the cell morphology of an extruded sheet of insulative cellular polypropylene-based material in accordance with the present disclosure is a function of formulation and process conditions, which conditions have an effect on the quality of an article, such as an insulative container, formed therewith. In particular, the effects of such conditions on cell density and cell dimensional attributes, and ultimately on crease/wrinkle resistance, results in a wrinkle-resistance prediction model based on power law regression.

In illustrative embodiments, the cell aspect ratio of an extruded sheet of insulative cellular polypropylene-based material in accordance with the present disclosure has an effect on the wrinkle resistance of that material during mechanical convolution. Parameters such as cell density and aspect ratio contribute to the control limits that result in a wrinkle-resistance model for the extruded sheet.

Direct evidence of polymer cell structure is provided by microscopy studies. There is a close relationship between the regularity of molecular structure and malleability. Cell morphology describes polymer cell density, cell structure, cell wall thickness, cell shape, and cell size distribution of cells. Polymer cell structures may have the same general shape and appearance, being composed predominantly of oval cells, and the same lognormal cell distribution, but possess a different cell aspect ratio and cell wall thickness. Illustratively, cell aspect ratio is the ratio between lengths of the ovular polymer cells to widths of the ovular polymer cells. In some embodiments, the cell aspect ratio of the insulative cellular non-aromatic polymeric material is at least 0.5, at least 1, at least 1.1, at least 1.2, at least 1.5, at least 1.7, or at least 2. In some embodiments, the cell aspect ratio of the cells of the insulative cellular non-aromatic polymeric material is less than 7, less than 6, less than 4, less than 3.5, less than 3, less than 2.5, or less than 2. In some embodiments, the aspect ratio of the cells of the insulative cellular non-aromatic polymeric material is selected from a range of 0.5 to about 4, about 1 to about 4, about 1 to about 3.5, about 1 to about 3, or about 1 to about 2.

Illustratively, the polymer cells can have a cell aspect ratio in the machine direction (MD) and in the cross direction (CD). As confirmed by microscopy, in one exemplary embodiment the average cell dimensions in a machine direction (machine or along the web direction) of an extruded strip 82 of insulative cellular non-aromatic polymeric material were about 0.0362 inches (0.92 mm) in width by about 0.0106 inches (0.27 mm) in height. As a result, a machine direction cell size aspect ratio is about 3.5. The average cell dimensions in a cross direction (cross-web or transverse direction) was about 0.0205 inches (0.52 mm) in width and about 0.0106 inches (0.27 mm) in height. As a result, a cross-direction aspect ratio is 1.94. In one exemplary embodiment, it was found that for the strip to withstand a compressive force during cup forming, one desirable average cell aspect ratio was between about 1.0 and about 3.0. In one exemplary embodiment, one desirable average cell aspect ratio was between about 1.0 and about 2.0. In another exemplary embodiment, the average cell aspect ratio is between about 2 and about 3. In another exemplary embodiment, a desirable average cell aspect ratio in the cross direction was about 0.5 to about 4. In another exemplary embodiment, a desirable average cell aspect ratio in the machine direction was about 1 to about 7.

In some embodiments, the polymeric material has a certain percentage of closed cells, sometimes called a closed cell performance. In some embodiments, the percentage of closed cells is up to about 100%. In some embodiments, the percentage of closed cells is at least about 20%, at least 40%, at least 60%, at least 70%, or at least 80%. In some embodiments, the percentage of closed cells is about 50%, about 55%, about 60%, about 65%, about 70%, about 75%, about 80%, about 81%, about 82%, about 83%, about 84%, about 85%, about 86%, about 87%, about 88%, about 90%, about 95%, or about 99%. In some embodiments, the percentage of closed cells is about 20% to about 100%, about 30% to about 100%, about 35% to about 95%, about 40% to about 95%, about 50% to about 95%, about 55% to about 95%, about 65% to about 95%, about 70% to about 95%, about 80% to about 95%, or about 80% to about 90%.

The insulative cellular non-aromatic polymeric material may have a certain number of cells per unit area. In some embodiments, the insulative-cellular non-aromatic polymeric materials in accordance with the present disclosure may have a cell density of about $1\times10^5$ to about $2.5\times10^6$ cells/in$^3$. In some embodiments, the cell density is at least $1\times10^5$ cells/in$^3$, at least $2\times10^5$ cells/in$^3$, at least $3\times10^5$ cells/in$^3$, at least $5\times10^5$ cells/in$^3$, or at least $6\times10^5$ cells/in$^3$. In some embodiments, the cell density falls within a range of about $1\times10^5$ cells/in$^3$ to about $2.5\times10^6$ cells/in$^3$, about $2\times10^5$ cells/in$^3$ to about $2.5\times10^6$ cells/in$^3$, about $4\times10^5$ cells/in$^3$ to about $2.5\times10^6$ cells/in$^3$, about $4\times10^5$ cells/in$^3$ to about $1.5\times10^6$ cells/in$^3$, about $5\times10^5$ cells/in$^3$ to about $1.5\times10^6$ cells/in$^3$, about $5\times10^5$ cells/in$^3$ to about $1\times10^6$ cells/in$^3$, or about $6\times10^5$ cells/in$^3$ to about $1\times10^6$ cells/in$^3$.

The ratio of machine direction to cross direction cell length is used as a measure of anisotropy of the extruded strip. In exemplary embodiments, a strip of insulative cellular non-aromatic polymeric material may be bi-axially oriented, with a coefficient of anisotropy ranging between about 1.5 and about 3. In one exemplary embodiment, the coefficient of anisotropy was about 1.8.

If the circumference of the cup is aligned with machine direction of extruded strip 82 with a cell aspect ratio exceeding about 3.0, deep creases with a depth exceeding about 200 microns are typically formed on inside surface of the cup making it unusable. Unexpectedly, it was found, in one exemplary embodiment, that if the circumference of the cup was aligned can be characterized by cell aspect ratio below about 2.0, no deep creases were formed inside of the cup, indicating that the cross direction of extruded strip 82 was more resistant to compression forces during cup formation.

The formulation and insulative cellular non-aromatic polymeric material of the present disclosure satisfies a long-felt need for a material that can be formed into an article, such as a cup, that includes many if not all of the features of insulative performance, ready for recyclability, puncture resistance, frangibility resistance, microwavability, regrindability, and other features as discussed herein. Others have failed to provide a material that achieves combinations of these features as reflected in the appended claims. This failure is a result of the features being associated with competitive design choices. As an example, others have created materials and structures therefrom that based on design choices are insulated but suffer from poor puncture resistance, inability to effectively be recyclable, inability to be used reground, and lack microwavability. In comparison, the formulations and materials disclosed herein overcome the failures of others by using an insulative cellular non-aromatic polymeric material. Reference is hereby made to U.S. application Ser. No. 13/491,007 filed Jun. 7, 2012, and entitled INSULATED CONTAINER for disclosure relating to articles, such as cups, formed from such insulative cellular non-aromatic polymeric materials, which application is hereby incorporated in its entirety herein.

Reference is hereby made to U.S. application Ser. No. 14/462,073 filed Aug. 18, 2014, and entitled POLYMERIC MATERIAL FOR AN INSULATED CONTAINER for disclosure relating to insulative cellular non-aromatic polymeric materials, which application is hereby incorporated in its entirety herein In some illustrative embodiments, polymeric-lamination layer 54 extends between and interconnects film layer 56 and insulative cellular non-aromatic polymeric material 82 as shown in FIGS. 2A and B. Polymeric-lamination layer 54 is formed by extruding a polymeric formulation as shown in FIGS. 1 and 5.

In some embodiments, polymeric-lamination layer 54 is substantially free of an adhesive. In some embodiments, polymeric-lamination layer 54 is substantially free of an epoxy. In some embodiments, polymeric-lamination layer 54 is substantially free of ink. In some other embodiments, polymeric-lamination layer 54 comprises ink. In some embodiments, polymeric-lamination layer 54 comprises regrind, a polypropylene, a polyethylene, a colorant, or a mixture or combination thereof. In some embodiments, polymeric-lamination layer 54 consists of regrind.

Polymeric-lamination layer 54 is formed by extruding a polymeric formulation. It is within the scope of the present disclosure for the polymeric formulation to have a melt flow index at 230° C. of at least 5 g/10 min, at least 10 g/10 min, at least 15 g/10 min, at least 20 g/10 min, or at least 25 g/10 min. It is within the scope of the present disclosure to prepare a formulation that has a melt flow rate at 230° C. in a range of about 5 g/10 min to about 55 g/10 min, about 15 g/10 min to about 55 g/10 min, about 35 g/10 min to about 55 g/10 min, about 5 g/10 min to about 45 g/10 min, about 5 g/10 min to about 35 g/10 min, about 10 g/10 min to about 35 g/10 min, about 15 g/10 min to about 35 g/10 min, or about 20 g/10 min to about 35 g/10 min.

Polymeric-lamination layer 54 extends between and interconnects strip 82 of insulative cellular non-aromatic polymeric material and film layer 56 as shown in FIG. 2A. It is within the scope of the present disclosure for polymeric-lamination layer to have a thickness. In some embodiments, the thickness of polymeric-lamination layer 54 is up to about 0.0254 centimeter (about 0.01 inches), up to about 0.0127 centimeter (about 0.005 inches), up to about 0.0102 centimeter (about 0.004 inches), up to about 0.00762 centimeter (about 0.003 inches), or up to about 0.00508 centimeter (about 0.002 inches). In some embodiments, the thickness of polymeric-lamination layer 54 is about 0.00127 centimeter (about 0.0005 inches), about 0.00152 centimeter (about 0.0006 inches), about 0.00178 centimeter (about 0.0007 inches), about 0.00203 centimeter (about 0.0008 inches), about 0.00229 centimeter (about 0.0009 inches), about 0.00254 centimeter (about 0.001 inches), about 0.00279 centimeter (about 0.0011 inches), about 0.00305 centimeter (about 0.0012 inches), about 0.0033 centimeter (about 0.0013 inches), about 0.00356 centimeter (about 0.0014 inches), about 0.00381 centimeter (about 0.0015 inches), about 0.00457 centimeter (about 0.0018 inches), about 0.00508 centimeter (about 0.002 inches), about 0.0102 centimeter (about 0.004 inches), about 0.0152 centimeter (about 0.006 inches), about 0.0203 centimeter (about 0.008 inches), or about 0.0254 centimeter (about 0.01 inches). In some embodiments, the thickness of polymeric-lamination layer 54 can be a selected from a range of about 0.00127 centimeter (about 0.0005 inches) to about 0.0254 centimeter (about 0.01 inches), about 0.00127 centimeter (about 0.0005 inches) to about 0.0203 centimeter (about 0.008 inches), about 0.00127 centimeter (about 0.0005 inches) to about 0.00508 centimeter (about 0.002 inches), or about 0.00178 centimeter (about 0.0007 inches) to about 0.00381 centimeter (about 0.0015 inches).

In some embodiments, the polymeric formulation for polymeric-lamination layer 54 comprises a polypropylene. In some embodiments, the polypropylene is a polypropylene homopolymer. In some embodiments, the polypropylene is virgin material. In some embodiments, the polypropylene homopolymer is ExxonMobil™ PP3155. In some embodiments, the polypropylene is Flint Hills P9H8M-015. In some embodiments, the melt mass-flow rate at 230° C. as measured using ASTM D1238 for the polypropylene is at least 25 g/10 min, at least 30 g/10 min, or at least 35 g/10 min. In some embodiments, the melt mass-flow rate at 230 ° C. for the polypropylene is less than 60 g/10 min, less than 50 g/10 min, less than about 45 g/10 min, or less than about 40 g/10 min. In some embodiments, the melt mass-flow rate is in a range of about 25 g/10 min to about 50 g/10 min, about 25 g/10 min to about 40 g/10 min, or about 30 g/10 min to about 40 g/10 min. In some embodiments, the melt mass-flow rate at 230° C. is about 36 g/10 min. In some embodiments, the melt mass-flow rate is in a range of about 25 g/10 min to about 60 g/10 min, about 30 g/10 min to about 60 g/10 min, or about 40 g/10 min to about 60 g/10 min. In some embodiments, the melt mass-flow rate at 230° C. is about 53 g/10 min.

It is within the scope of the present disclosure to select an amount of the polypropylene of the polymeric formulation for forming polymeric-lamination layer 54 to be up to about 40%, up to about 50%, up to about 60%, up to about 70%, up to about 75%, up to about 80%, up to about 85%, up to about 90%, or up to about 95% by weight of the polymeric formulation. It is within the scope of the present disclosure to select an amount of the polypropylene of the polymeric formulation for forming polymeric-lamination layer 54 to be one of the following values: about 10%, about 20%, about 30%, about 40%, about 42%, about 43%, about 44%, about 45%, about 46%, about 47%, about 48%, about 49%, about 50%, about 55%, about 60%, about 65%, about 70%, about 75%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, or about 99% by weight of the polymeric formulation. It is within the present disclosure for the amount of the polypropylene of the polypropylene of the polymeric formulation for forming polymeric-lamination layer 54 to fall within one of many different ranges. In a first set of ranges, the range of first polymer in the base resin blend is one of the following ranges: about 40% to about 99%, about 60% to about 99%, about 70% to about 99%, about 75% to about 99%, or about 80% to about 99% by weight of the polymeric formulation. In a second set of ranges, the of the polypropylene of the polymeric formulation for forming polymeric-lamination layer 54 is one of the following ranges: about 40% to about 97%, about 40% to about 95%, about 40% to about 92%, about 40% to about 90%, about 40% to about 70%, about 40% to about 60%, or about 40% to about 50%, by weight of the base resin blend. In a third set of ranges, the polypropylene of the polymeric formulation for forming polymeric-lamination layer 54 is one of the following ranges: about 50% to about 99%, about 50% to about 95%, about 60% to about 95%, about 65% to about 95%, about 65% to about 90%, about 70% to about 90%, about 75% to about 90%, or about 75% to about 85% by weight of the polymeric formulation.

In some embodiments, the polymeric formulation for polymeric-lamination layer 54 comprises a polyethylene. In some embodiments, the polyethylene is a low-density polyethylene. In some embodiments, the low-density polyethylene is Dow™ 4012 low-density polyethylene. In some embodiments, the melt mass-flow rate at 190° C. as measured using ASTM D1238 for the polyethylene is at least 5 g/10 min, at least 10 g/10 min, or at least 12 g/10 min. In some embodiments, the melt mass-flow rate at 190° C. for the polyethylene is less than 30 g/10 min, less than about 25 g/10 min, or less than about 20 g/10 min. In some embodiments, the melt mass-flow rate for the polyethylene is in a range of about 5 g/10 min to about 30 g/10 min, about 5 g/10 min to about 25 g/10 min, or about 5 g/10 min to about 20 g/10 min. In some embodiments, the melt mass-flow rate for the polyethylene at 190° C. is about 12 g/10 min. In some embodiments, the polymeric formulation for polymeric-lamination layer 54 is substantially free of polyethylene.

It is within the scope of the present disclosure to select an amount of the polyethylene of the polymeric formulation for forming polymeric-lamination layer 54 to be up to about 60%, up to about 50%, up to about 40%, up to about 35%, up to about 30%, up to about 25%, up to about 20%, or up to about 15% by weight of the polymeric formulation. It is within the scope of the present disclosure to select an amount of the polyethylene of the polymeric formulation for forming polymeric-lamination layer 54 to be one of the following values: about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 25%, about 30%, about 35%, about 40%, about 45%, about 50%, about 55%, or about 60% by weight of the polymeric formulation. It is within the present disclosure for the amount of the polyethylene of the polymeric formulation for forming polymeric-lamination layer 54 to fall within one of many different ranges. In a first set of ranges, the range of the polyethylene of the polymeric formulation for forming polymeric-lamination layer 54 is one of the following ranges: about 1% to about 60%, about 3% to about 60%, about 3% to about 60%, about 5% to about 60%, or about 10% to about 60% by weight of the polymeric formulation. In a second set of ranges, the range of the polyethylene of the polymeric formulation for forming polymeric-lamination layer 54 is one of the following ranges: about 1% to about 55%, about 1% to about 50%, about 1% to about 40%, about 1% to about 30%, or about 10% to about 20% by weight of the polymeric formulation. In a third set of ranges, the range of the polyethylene of the polymeric formulation for forming polymeric-lamination layer 54 is one of the following ranges: about 2% to about 60%, about 2% to about 50%, about 2 to about 40%, about 2% to about 30%, about 5% to about 30%, about 5% to about 25%, about 10% to about 25%, or about 10% to about 20% by weight of the polymeric formulation.

In some embodiments, the polymeric formulation for forming polymeric-lamination layer 54 comprises a colorant. The colorant in the polymeric formulation for forming polymeric-lamination layer 54 can be up to about 25%, up to about 20%, up to about 15%, up to about 10%, or up to about 5% by weight of the polymeric formulation. It is within the scope of the present disclosure to select an amount of the colorant of the polymeric formulation for forming polymeric-lamination layer 54 to be one of the following values: about 1%, about 2%, about 3%, about 4%, about 5%, about 6%, about 7%, about 8%, about 9%, about 10%, about 11%, about 12%, about 13%, about 14%, about 15%, about 20%, or about 25% by weight of the polymeric formulation. It is within the present disclosure for the amount of the colorant of the polymeric formulation for forming polymeric-lamination layer 54 to fall within one of many different ranges. In a set of ranges, the range of the colorant of the polymeric formulation for forming polymeric-lamination layer 54 is one of the following ranges: about 1% to about 25%, about 1% to about 15%, about 3% to about 15%, about 3% to about 10%, about 5% to about 15%, or about 5% to about 13% by weight of the polymeric formulation.

In some embodiments, the polymeric formulation for forming polymeric-lamination layer 54 comprises regrind. The regrind in the polymeric formulation for forming polymeric-lamination layer 54 can be up to about 25%, up to about 45%, up to about 60%, up to about 80%, up to about 90%, or up to about 99% by weight of the polymeric formulation. It is within the scope of the present disclosure to select an amount of regrind of the polymeric formulation for forming polymeric-lamination layer 54 to be one of the following values: about 1%, about 5%, about 10%, about 15%, about 20%, about 25%, about 30%, about 35%, about 40%, about 41%, about 42%, about 43%, about 44%, about 45%, about 46%, about 47%, about 48%, about 49%, about 50%, about 55%, about 60%, about 65%, about 70%, about 75%, about 80%, about 85%, about 90%, about 95%, or about 99% by weight of the polymeric formulation. It is within the present disclosure for the amount of regrind of the polymeric formulation for forming polymeric-lamination layer 54 to fall within one of many different ranges. In a set of ranges, the range of regrind of the polymeric formulation for forming polymeric-lamination layer 54 is one of the following ranges: about 1% to about 99%, about 5% to about 99%, about 5% to about 75%, about 15% to about 75%, about 20% to about 70%, about 25% to about 70%, about 25% to about 60%, about 35% to about 60% or about 35% to about 55% by weight of the polymeric formulation. In some embodiments, the ratio of regrind and virgin polymeric resin is about 1:1.

Film layer 56 is laminated onto polymeric-lamination layer 54 as shown in FIGS. 2A and B. In some embodiments, film layer 56 comprises a polymeric film. Illustratively, a suitable polymeric film will be a film that cooperates with and couples with polymeric-lamination layer 54. In some embodiments, the film comprises a polypropylene, a polyethylene, or a mixture thereof. In some embodiments, the film comprises a polypropylene. In some embodiments, the polypropylene is a bi-axially oriented polypropylene (BOPP) film (i.e., film produced via a sequential biaxial stretching process involving two consecutive stretching steps conducted at two different temperatures). In some embodiments, the film is a single layer film. In some embodiments, the film is a multi-layer film.

Figure 2B:
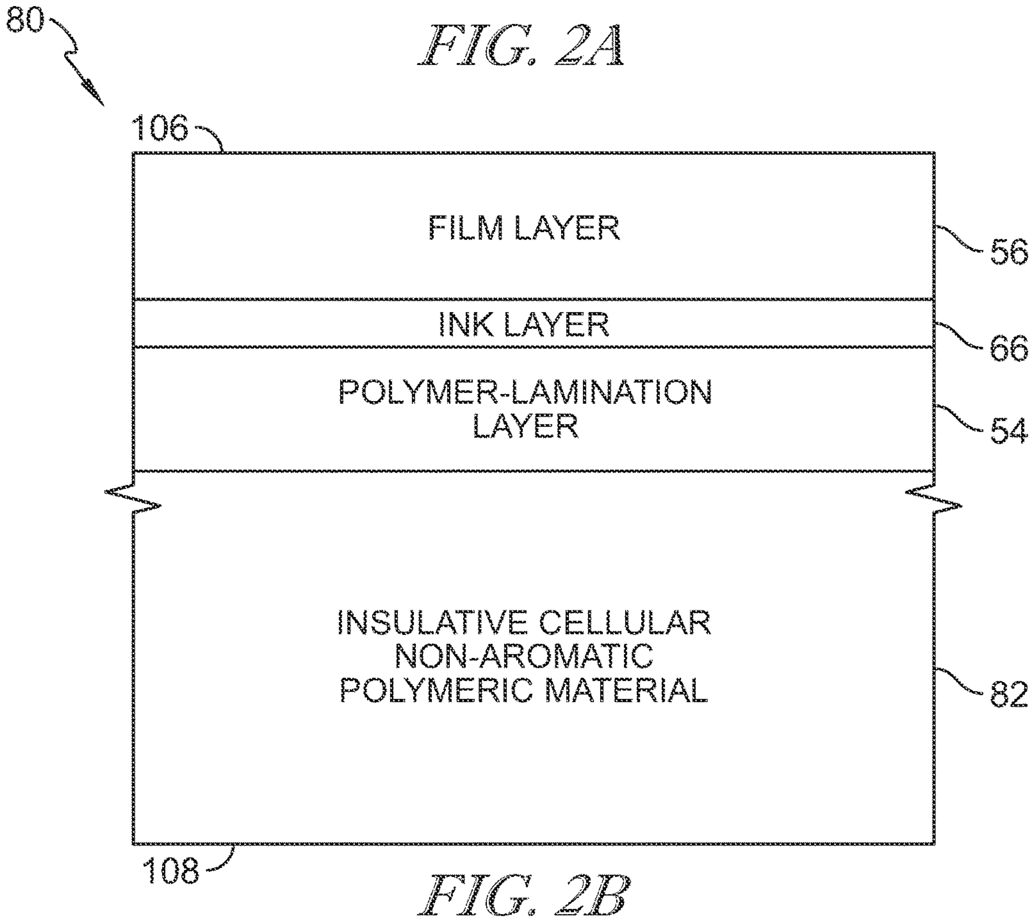
FIG. 2B is a diagrammatic view of another embodiment of a multi-layer sheet showing the ink layer located between the film layer and the polymer-lamination layer.

As shown in FIGS. 2A and 2B, multi-layer sheet 80 is a composite formed of strip 82 of insulative cellular non-aromatic polymeric material onto which printed film layer 70 is laminated from a roll during a laminating stage. In some embodiments, polymeric-lamination layer 54 is extruded onto strip 82 of insulative cellular non-aromatic material to form a co-extruded sheet. Then, while polymeric-lamination layer 54 is still hot, printed film layer 70 is coupled to polymeric-lamination layer 54 to form multi-layer sheet 80. In some embodiments, polymeric-lamination layer 54 is extruded into the junction of insulative cellular non-aromatic polymeric material 82 and printed film layer 70 to form multi-layer sheet 80. In some embodiments, printed film layer 70 is bonded to polymeric-lamination layer 54 when polymeric-lamination layer 54 is about 204 degree Celsius (about 400° F.).

In some embodiments, printed film layer 70 is arranged to form an outer surface 2106 and strip 82 of insulative cellular non-aromatic polymeric material forms an inner surface 2108 as shown in FIGS. 2A, 2B, and 10. Illustratively, multi-layer sheet 80 has a thickness that is measured as the distance from outer surface 2106 to an inner surface 2108. It is within the present disclosure for the thickness of multi-layer sheet to be a value selected from about 0.0762 centimeter (about 0.03 inches), about 0.102 centimeter (about 0.04 inches), about 0.114 centimeter (about 0.045 inches), about 0.127 centimeter (about 0.05 inches), about 0.14 centimeter (about 0.055 inches), about 0.152 centimeter (about 0.06 inches), about 0.165 centimeter (about 0.065 inches), about 0.178 centimeter (about 0.07 inches), about 0.19 centimeter (about 0.075 inches), about 0.203 centimeter (about 0.08 inches), about 0.216 centimeter (about 0.085 inches), or about 0.229 centimeter (about 0.09 inches). It is within the present disclosure for the thickness of multi-layer sheet 80 to fall within a range of about 0.0762 centimeter (about 0.03 inches) to about 0.229 centimeter (about 0.09 inches), about 0.102 centimeter (about 0.04 inches) to about 0.229 centimeter (about 0.09 inches), about 0.102 centimeter (about 0.04 inches) to about 2.03 centimeters (about 0.8 inches), about 1.02 centimeters (about 0.4 inches) to about 1.78 centimeters (about 0.7 inches), about 0.127 centimeter (about 0.05 inches) to about 0.229 centimeter (about 0.09 inches), about 0.14 centimeter (about 0.055 inches) to about 0.229 centimeter (about 0.09 inches), about 0.14 centimeter (about 0.055 inches) to about 0.203 centimeter (about 0.08 inches), about 0.14 centimeter (about 0.055 inches) to about 0.19 centimeter (about 0.075 inches), about 0.152 centimeter (about 0.06 inches) to about 0.19 centimeter (about 0.075 inches), or about 0.152 centimeter (about 0.06 inches) to about 0.178 centimeter (about 0.07 inches).

A cup-manufacturing process 100 comprising a process for forming multi-layer sheet 80 in accordance with the present disclosure is shown, for example, in FIGS. 1 and 3-10. An insulative cup 10 in accordance with the present disclosure is shown, for example, in FIG. 1. As an example, multi-layer sheet 80 includes printed film layer 70, polymeric-lamination layer 54, and a strip 82 of insulative cellular non-aromatic polymeric material as shown in FIGS. 2A, B, 10 and 11.

Cup-manufacturing process 100 may optionally include each of an extruding stage 300, a laminating stage 400, a blank forming stage 500, a cup-forming stage 700, and a regrinding stage 800, as shown in FIG. 1. In some embodiments, cup-manufacturing process 100 includes a film forming stage 900 to provide printed film layer 70. In some embodiments, cup-manufacturing process 100 includes a cup-bottom forming stage 600, as shown in FIG. 8.

Extruding or strip-forming stage 300 provides strip of insulative cellular non-aromatic polymeric material 82 as suggested in FIGS. 3 and 4 Laminating stage 400 laminates printed film 70 to strip 82 of insulative cellular non-aromatic polymeric material to form a multi-layer sheet 80, as shown in FIGS. 3 and 5. Blank forming stage 500 cuts multi-layer sheet 80 to form a body blank to be used in cup-forming stage 700, as shown in FIG. 6. Cup-forming stage 700 combines the body blank with a cup bottom to form insulated cup 10. Regrinding stage 800 recaptures and processes excess material from extruding stage, laminating stage 400, blank forming stage 500, cup-bottom forming stage 600, cup-forming stage 700, or a combination thereof, to form regrind used for the polymeric formulations in accordance with the present disclosure.

Strip-forming stage 300 incorporates a blender 310 for material blending of the polymeric formulations, as shown in FIG. 4. The blended polymeric formulation is fed into a primary extruder 111A. In this example, a first physical blowing agent A and an optional second physical blowing agent B are introduced to expand the resin to reduce density. As an example, first physical blowing agent A may be $CO_2$, $N_2$, or any other suitable alternative. Optional second physical blowing agent B may be, for example, R134a as an example The material exits the primary extruder 111A and is introduced into the secondary extruder 111B. The two extruders 111A and 111B act as tandem extruders to promote material dispersion and homogeneity.

In one example, an annular die 312 is used to form a tube of expanded polymeric material. A cooling can nose 314 uses air to promote the formation of bubbles, as shown in FIG. 4. The surface temperature of the cooling can nose is regulated. In one exemplary embodiment, opposing knives 316 are positioned preferably opposite each other (for example, at 3 and 9 o'clock) to slit the extrudate into two insulative cellular non-aromatic polymeric material strips 82. Alternatively, a single knife can be used. Alternatively, the extrudate need not be slit at all. The extrudate thus formed can be inspected, for example by a laser thickness sensor 318 to ensure proper and uniform thickness. The resulting strip of insulative cellular non-aromatic polymeric material 82 can then proceed to the multi-layer sheet formation laminating stage 400.

A gas, such as, but not limited to, carbon dioxide, nitrogen, other relatively inert gas, a mixture of gasses or the like, is introduced into the molten resin mixture to expand the polypropylene and reduce density by forming cells in the molten polypropylene. R134a or other haloalkane refrigerant may be used with the gas. In one aspect of the present disclosure, the cells formed in the insulative cellular non-aromatic polymeric material may have an average size in a range of about 0.010 to about 0.030 inches.

Printed film layer 70 formed and provided by film forming stage 900, as shown in FIG. 3. In some embodiments, film layer 56 is formed during film-layer forming stage 910. Alternatively, film layer 56, such as Jindal Films Bicor™ 18 LPX-2, may be purchased. Film layer 56 is printed with an ink layer 66 during film-layer printing stage 920. As an example, ink layer 66 includes graphics 68 as shown in FIG. 3, and the graphics are shown on insulative cup 10 in FIGS. 1 and 3. However, graphics may be another suitable graphic such as, but not limited to, symbols, text, photographs, images, combinations thereof, and the like, and may be in black and white or in color.

Film-layer printing stage 920 uses a printer 64 to print ink layer 66 on film layer 56 to provide printed film layer 70 as shown in FIG. 3. Printing may be done using conventional flexography, which is a form of printing that uses flexible rubber relief plates and highly volatile, fast-drying inks to print on a variety of substrates, including films of the type used as film layer 56. In particular, printing may be done using an in-line, central impression flexographic printing station. Alternatively, printing processes such as rotogravure may be used. Printed film layer 70 is produced by film forming stage 900 and provided to laminating stage 400 as shown, for example, in FIG. 3. In some embodiments, printed film layer 70 is formed by reverse printing.

During laminating stage 400, a polymeric-lamination layer 54 is extruded at the junction of strip of insulative cellular non-aromatic polymeric material 82 and printed film layer 70 to form multi-layer sheet 80 as suggested in FIGS. 1, 3, and 5. As an example, multi-layer sheet 80 is wound to form a roll, which is stored for use later in cup-forming stages 500, 600, 700. However, multi-layer sheet 80 may be fed directly without storage to cup-forming stage a cup-forming stage 500, 600, 700.

In some embodiments, laminating stage 400 orients 412 strip of insulative cellular non-aromatic polymeric material 82 prior to lamination as shown in FIG. 5. Oriented strip of insulative celluar strip of insulative cellular non-aromatic polymeric material 82 proceeds to the extrusion laminating step 414, wherein it is coupled with printed film layer 70. Polymeric-lamination layer 54 is extruded into the junction where strip of insulative cellular non-aromatic polymeric material 82 meets printed film 70 to produce multi-layer sheet 80. laminated multi-layer sheet 80 then proceeds to the cup formation stages. Excess material is ground 418 and reclaimed to form extression scrap 421 so that it may optionally be included in the regrind.

Blank forming stage 500 cuts body blanks 92 from multi-layer sheet as shown in FIGS. 1 and 6. Multi-layer sheet 80 is unwound 510 and proceeds to die cut station 512. Die cut station cuts out body blank 92 from multi-layer sheet 80 and leaves behind blank-carrier sheet 94, as shown in FIG. 1. Body blank 92 proceeds to the remaining cup formation stage. Blank-carrier sheet 94 and any remaining material is ground 514 and reclaimed 516 form die cut scrap 517 so that it may optionally be included in the regrind.

Cup-bottom forming stage 600 forms cup bottom 20, which is combined with blank 92 to form cup 10, as suggested in FIG. 7. In some embodiments, the cup bottom is formed of the same multi-layer sheet 80 as blank 92. In some embodiments, the cup bottom is formed of a different polymeric material than blank 92. Illustratively, cup-bottom forming stage 600 includes a bottom stock slitting step 610 that slits the polymeric material of the cup bottom. The cup bottom can then be loaded 614 onto the cup former for cup-forming stage 700. The remaining material can be ground 612 and reclaimed 616 to form slit roll scrap 617 so that it may optionally be included in the regrind.

Cup-forming process 700 forms cup 10 out of body blank 92 and cup bottom 20 as shown in FIG. 8. Body blank 92 and cup bottom 20 are combined at the cup former 710 to form cup 10. Formed cup 10 can optinoally be post treated 714. The remaining bottom stock from cup bottom 20 can be ground 716 and reclaimed 718 to be optionally included in the regrind. Remaining scrap from forming cup 10 can be ground 720 and reclaimed 722 to form bottom stock scrap 719 so that it may optionally be included in the regrind.

Regrinding stage 800 recaptures and processes excess material from extruding stage, laminating stage 400, blank forming stage 500, cup-bottom forming stage 600, cup-forming stage 700, or a combination thereof, to form regrind used for the polymeric formulations in accordance with the present disclosure, as shown in FIG. 9. Illustratively, reclaimed extrusion scrap 421, reclaimed die cut scrap 516, reclaimed slit roll scrap 617, reclaimed bottom stock scrap 719, reclaimed cup-forming scrap 723, or mixtures thereof are combined 810. The combined material is then pelletized 812 to form reprocessed pellets 97, as shown in FIGS. 1 and 9.

Insulative cellular non-aromatic material is used during cup-manufacturing process 100 to make insulative cup 10 as suggested in FIGS. 1 and 3-9. Reference is hereby made to U.S. application Ser. No. 13/491,007 filed Jun. 7, 2012, and titled INSULATED CONTAINER for disclosure relating to an insulative container made from an insulative cellular non-aromatic polymeric material, which application is hereby incorporated in its entirety herein. Reference is hereby made to U.S. application Ser. No. 13/491,327 filed Jun. 7, 2012, and titled POLYMERIC MATERIAL FOR AN INSULATED CONTAINER for disclosure relating to such insulative cellular non-aromatic polymeric material, which application is hereby incorporated in its entirety herein.

In some exemplary embodiments, the cell has a length in the cross or transverse direction and a length in the machine direction. In some embodiments, the cell length in the cross direction is up to about 60 mils. In some embodiments, the cell length in the machine direction is up to about 50 mils.

In some exemplary embodiments, the cell has a width in the cross or transverse direction and a width in the machine direction. In some embodiments, the cell width in the cross direction up to about 30 mils. In some embodiments, the cell width in the machine direction is up to about 25 mils.

The ratio of machine direction to cross direction cell length is used as a measure of anisotropy of the extruded strip. In exemplary embodiments, a strip of insulative cellular non-aromatic polymeric material may be bi-axially oriented, with a coefficient of anisotropy ranging between about 1.5 and about 3. In one exemplary embodiment, the coefficient of anisotropy was about 1.8.

In some exemplary embodiments, the polymeric material has a percentage crystallinity at 5° C./min, 10° C./min or 15° C./min. In some exemplary embodiments, the percentage crystallinity at 5° C./min is at least about 15%. In some exemplary embodiments, the percentage crystallinity at 5° C./min is up to about 50%. In some exemplary embodiments, the percentage crystallinity at 10° C./min is at least about 10%. In some exemplary embodiments, the percentage crystallinity at 10° C./min is up to about 60%. In some exemplary embodiments, the percentage crystallinity at 15° C./min is at least about 15%. In some exemplary embodiments, the percentage crystallinity at 15 ° C./min is up to about 55%.

In some exemplary embodiments, the polymeric material has a crystallization temperature measured at a rate of 5° C./min, 10° C./min or 15° C./min. In some exemplary embodiments, the crystallization temperature measured at 5° C./min is at least about 120° C., at least about 125° C., or at least about 130° C. In some exemplary embodiments, the crystallization temperature measured at 5° C./min is up to about 140° C. or up to about 135° C. In some exemplary embodiments, the crystallization temperature measured at 10° C./min is at least about 115° C., at least about 120° C., or at least about 125° C. In some exemplary embodiments, the crystallization temperature measured at 10 ° C./min is up to about 140° C. or up to about 135° C. In some exemplary embodiments, the crystallization temperature measured at 15° C./min is at least about 110° C., at least about 115° C., or at least about 120° C. In some exemplary embodiments, the crystallization temperature measured at 15° C./min is up to about 135° C. or up to about 130° C.

In some exemplary embodiments, the polymeric material has an impact strength as measured by dart drop (ASTM D1709). In some embodiments, the dart drop performance is at least about 50 g, at least about 75 g, or at least about 125 g. In some embodiments, the dart drop performance is up to about 225 g, up to about 200 g, or up to about 190 g.

In some exemplary embodiments, the polymeric material has an impact strength as measured by dart impact. In some embodiments, the dart impact performance is at least about 1 inch. In some embodiments, the dart impact performance is less than about 2.2 inches.

In some embodiments, the polymeric material, a laminated material comprising the polymeric material, or the cup formed of the laminated material were tested using the Elmendorf test method described in ASTM D1922-93. In some embodiments, the Elmendorf Arm MD for the polymeric material is at least about 500 g. In some embodiments, the Elmendorf Arm MD for the laminated material is at least about 1500 g. In some embodiments, the Elmendorf Arm MD for the cup is at least about 1500 g. In some embodiments, the Elmendorf Arm TD for the polymeric material is at least about 500 g. In some embodiments, the Elmendorf Arm TD for the laminated material is at least about 1500 g. In some embodiments, the Elmendorf Arm TD for the cup is at least about 1500 g.

In some embodiments, the polymeric material, a laminated material comprising the polymeric material, or the cup formed of the laminated material were tested using the Elmendorf test method described in ASTM D1922-93. In some embodiments, the Elmendorf Tear MD for the polymeric material is at least about 75 gf. In some embodiments, the Elmendorf Tear MD for the polymeric material is less than about 350 gf. In some embodiments, the Elmendorf Tear MD for the laminated material is at least about 65 gf. In some embodiments, the Elmendorf Tear MD for the laminated material is less than about 700 gf. In some embodiments, the Elmendorf Tear MD for the cup is at least about 125 gf. In some embodiments, the Elmendorf Tear MD for the cup is less than about 500 gf.

In some embodiments, the Elmendorf Tear TD for the polymeric material is at least about 10 gf, at least about 50 gf, or at least about 125 gf. In some embodiments, the Elmendorf Tear TD for the polymeric material is less than about 450 gf. In some embodiments, the Elmendorf Tear TD for the laminated material is at least about 65 gf, at least about 100 gf, or at least about 200 gf. In some embodiments, the Elmendorf Tear TD for the laminated material is less than about 600 gf. In some embodiments, the Elmendorf Tear TD for the cup is at least about 200 gf. In some embodiments, the Elmendorf Tear TD for the cup is less than about 650 gf.

In some exemplary embodiments, a cup formed from the polymeric material can have a frangibility measurement measured when the cup is either hot or cold. In some embodiments, the cup has a frangibility of at least about 20 lbf when the cup is hot. In some embodiments, the cup has a frangibility less than about 60 lbf when the cup is hot. In some embodiments, the cup has a frangibility of at least about 25 lbf when the cup is cold. In some embodiments, the cup has a frangibility less than about 55 lbf when the cup is cold.

In some embodiments, a cup formed from the polymeric material reaches a temperature when filled with hot liquid. In some embodiments, the hot fill temperature (max sidewall) is at least about 130° C. In some embodiments, the hot fill temperature (max sidewall) is less than about 170° C. In some embodiments, the hot fill temperature (min internal) is at least about 135° C. In some embodiments, the hot fill temperature (min internal) is less than about 160° C.

In some exemplary embodiments, the polymeric material has a melting crystallinity at 5° C./min, 10° C./min or 15° C./min. In some exemplary embodiments, the melting crystallinity at 5° C./min is at least about 20%. In some exemplary embodiments, the melting crystallinity at 5° C./min is up to about 60%. In some exemplary embodiments, the melting crystallinity at 10° C./min is at least about 10%. In some exemplary embodiments, the melting crystallinity at 10° C./min is up to about 60%. In some exemplary embodiments, the melting crystallinity at 15° C./min is at least about 15%. In some exemplary embodiments, the melting crystallinity at 15° C./min is up to about 65%.

In some embodiments, the polymeric material, a laminated sheet comprising the polymeric material, or a cup formed of the laminated sheet has a puncture resistance, as measured in inches for either a ¼" probe or a ⅛" probe. In some embodiments, the puncture resistance for the polymeric material, the laminated sheet, or the cup (elongation at peak load) is at least about 0.2 inches. In some embodiments, the puncture resistance for the polymeric material, the laminated sheet, or the cup (elongation at peak load) is less than about 0.75 inches.

In some embodiments, the polymeric material, a laminated sheet comprising the polymeric material, or a cup formed of the laminated sheet has a puncture resistance, as measured in max load for either a ¼" probe or a ⅛" probe. In some embodiments, the puncture resistance for the polymeric material, the laminated sheet, or the cup (max load) is at least about 1,000 gf, at least about 3,000 gf, at least about 6,000 gf, or at least about 8,000 gf. In some embodiments, the puncture resistance for the polymeric material, the laminated sheet, or the cup (max load) is less than about 20,000 gf, less than about 18,000 gf, less than about 12,000 gf, or less than about 1,000 gf.

In some embodiments, the cup has a rigidity as measured when the cup is filled with cold, room temperature, or hot water and if the cup comprises a lid coupled with the brim. In some exemplary embodiments, the cup has a cold fill lidded rigidity of at least about 1 kg-F. In some embodiments, the cup has a cold fill lidded rigidity of less than about 1.5 kg-F. In some exemplary embodiments, the cup has a cold fill unlidded rigidity of at least about 0.5 kg-F. In some embodiments, the cup has a cold fill unlidded rigidity of less than about 1.2 kg-F. In some exemplary embodiments, the cup has a hot fill lidded rigidity of at least about 0.35 kg-F. In some embodiments, the cup has a hot fill lidded rigidity of less than about 0.75 kg-F. In some exemplary embodiments, the cup has a hot fill unlidded rigidity of at least about 0.2 kg-F. In some embodiments, the cup has a hot fill unlidded rigidity of less than about 0.5 kg-F. In some exemplary embodiments, the cup has a room temperature fill lidded rigidity of at least about 0.6 kg-F. In some embodiments, the cup has a room temperature fill lidded rigidity of less than about 1.7 kg-F. In some exemplary embodiments, the cup has a room temperature fill unlidded rigidity of at least about 0.3 kg-F. In some embodiments, the cup has a room temperature fill unlidded rigidity of less than about 1 kg-F. In some exemplary embodiments, the cup has a room temperature unfilled lidded rigidity of at least about 0.6 kg-F. In some embodiments, the cup has a room temperature fill lidded rigidity of less than about 1.7 kg-F. In some exemplary embodiments, the cup has a room temperature unfilled unlidded rigidity of at least about 0.3 kg-F. In some embodiments, the cup has a room temperature fill unlidded rigidity of less than about 1 kg-F.

In some exemplary embodiments, the cup formed cup has a seam. In some embodiments, the seam thickness is at least about 0.0762 centimeter (about 0.03 inches). In some embodiments, the seam thickness is less than about 1.2 inches.

In some embodiments, the cup or the polymeric material has a thermal conductivity at 21° C. In some embodiments, the thermal conductivity at 21° C. is at least about 0.05 W/m-K or at least about 0.052 W/m-K. In some embodiments, the thermal conductivity at 21° C. is less than about 0.057 W/m-K or less than about 0.053 W/m-K.

In some embodiments, the cup or the polymeric material has a thermal conductivity at 93° C. In some embodiments, the thermal conductivity at 93° C. is at least about 0.061 W/m-K or at least about 0.062 W/m-K. In some embodiments, the thermal conductivity at 93° C. is less than about 0.065 W/m-K or less than about 0.064 W/m-K.

In some embodiments, the cup, when filled with a hot liquid has a time to cool from about 200° F. to about 140° F. In some embodiments, the time to cool is at least 3400 seconds. In some embodiments, the time to cool extended past the allotted measured time.

In some embodiments, the cup formed from the polymeric material has a top load measurement. In some embodiments, the top load is at least about 70 lbf, at least about 90 lbf, or at least about 115 lbf. In some embodiments, the top load is less than about 200 lbf, less than about 175 lbf, or less than about 150 lbf.

In some embodiments, a cup formed from the polymeric material has a weight. In some embodiments, the weight of the cup is at least about 9 g, at least about 10 g, or at least about 12 g. In some embodiments, the weight of the cup is less than about 15 g, less than about 14 g, or less than about 12 g.

Recyclability of articles formed from the insulative cellular non-aromatic polymeric material of the present disclosure minimizes the amount of disposable waste created. In comparison, beaded expanded polystyrene cups that break up into beads and thus ordinarily cannot easily be reused in a manufacturing process with the same material from which the article was formed. In addition, paper cups that typically have an extrusion coated plastic layer or a plastic lamination for liquid resistance ordinarily cannot be recycled because the different materials (paper, adhesive, film, plastic) normally cannot be practicably separated in commercial recycling operations.

A potential feature of a cup formed of the insulative cellular non-aromatic polymeric material according to one aspect of the present disclosure is that it possesses unexpected strength as measured by rigidity. Rigidity is a measurement done at room temperature and at an elevated temperature (e.g., by filling the cup with a hot liquid) and measuring the rigidity of the material. The strength of the cup material is important to reduce the potential for the cup being deformed by a user and the lid popping off or the lid or sidewall seal leaking.

A potential feature of a cup formed of the insulative cellular non-aromatic polymeric material according to the present disclosure is that the sleeve is resistant to puncture, such as by a straw, fork, spoon, fingernail, or the like, as measured by standard impact testing, as described hereinbelow. Test materials demonstrated substantially higher impact resistance when compared to a beaded expanded polystyrene cup. Accordingly, a cup formed one aspect as described herein can reduce the likelihood of puncture and leakage of hot liquid onto a user.

The insulative cellular non-aromatic polymeric material of the present disclosure may be formed into a strip, which can be wrapped around other structures. For example, a strip of the material according to one aspect of the present disclosure that can be used as a wrapping material may be formed and wrapped around a pipe, conduit, or other structure to provide improved insulation. The sheet or strip may have a layer of adhesive, such as a pressure sensitive adhesive, applied to one or both faces. The strip may be wound onto a roll. Optionally, the strip may have a release liner associated therewith to make unwinding the strip from the roll easier. The polymer formulation may be adapted to provide the requisite flexibility to form a wrap or windable strip, for example, by using one or more polypropylene or other polyolefin materials that have sufficient flexibility to enable the extruded sheet to be flexible enough to be wound onto a roll. The insulative cellular non-aromatic polymeric material may be formed into a sleeve that can be inserted over a cup to provide additional insulation.

In exemplary embodiments, sheets formed from the insulative cellular non-aromatic polymeric material of the present disclosure may be cut at the die or be flaked and used as a bulk insulator.

The formulation and insulative cellular non-aromatic polymeric material of the present disclosure satisfies a long-felt need for a material that can be formed into an article, such as a cup, that includes many if not all of the features of insulative performance, ready for recyclability, regrindability, puncture resistance, frangibility resistance, microwavability and other features as discussed herein. Others have failed to provide a material that achieves combinations of these features as reflected in the appended claims. This failure is a result of the features being associated with competitive design choices. As an example, others have created materials and structures therefrom that based on design choices are insulated but suffer from poor puncture resistance, inability to effectively be recyclable, and lack microwavability. In comparison, the formulations and materials disclosed herein overcome the failures of others by using an insulative cellular non-aromatic polymeric material.

The material of the present disclosure may also be formed into a deformable sheet, which can be wrapped around other structures. For example, a sheet of the present material may be formed and wrapped around a pipe, conduit, or other structure to provide improved insulation.

Aromatic molecules typically display enhanced hydrophobicity when compared to non-aromatic molecules. As a result, it would be expected that changing from a polystyrene-based insulative cellular polymeric material to a polypropylene-based insulative cellular polymeric material would result in a change in hydrophobicity with a concomitant, but not necessarily predictable or desirable, change in surface adsorption properties of the resulting material. In addition, by virtue of the hydrocarbon chain in polystyrene, wherein alternating carbon centers are attached to phenyl groups, neighboring phenyl groups can engage in so-called pi-stacking, which is a mechanism contributing to the high intramolecular strength of polystyrene and other aromatic polymers. No similar mechanism is available for non-aromatic polymers such as polypropylene. Moreover, notwithstanding similar chemical reactivity and chemical resistance properties of polystyrene and polypropylene, polystyrene can be either thermosetting or thermoplastic when manufactured whereas polypropylene is exclusively thermoplastic. As a result, to the extent that surface adsorption properties, manufacturing options, and strength properties similar to those of polystyrene are sought, likely alternatives to polystyrene-based insulative cellular polymeric materials would be found in another aromatic polymer rather than in a non-aromatic polymer.

In some embodiments, the multi-layer sheet consists of the film layer, the insulative cellular non-aromatic polymeric layer, and the polymeric-lamination layer. In some embodiments, the multi-layer sheet consists of the film layer, the insulative cellular non-aromatic polymeric layer, the polymeric-lamination layer, and an ink layer printed onto the film layer to locate the film layer between the ink layer and the polymeric-lamination layer.

In some embodiments, the polymeric-lamination layer consists of regrind, polypropylene, polyethylene, and a colorant. In some embodiments, the polymeric-lamination layer consists essentially of regrind, polypropylene, and polyethylene.

Reference is hereby made to U.S. application Ser. No. 13/526,444 filed Jun. 18, 2012, and entitled PROCESS FOR FORMING AN INSULATED CONTAINER HAVING ARTWORK and U.S. application Ser. No. 13/526,454 filed Jun. 18, 2012, and entitled PROCESS FOR FORMING AN INSULATED CONTAINER HAVING ARTWORK for disclosures relating to processes relating to cup formation, film compositions and printing, and insulative cellular non-aromatic polymeric materials, which applications are hereby incorporated in their entirety herein Reference is hereby made to U.S. application Ser. No. 13/491,007 filed Jun. 7, 2012, and entitled INSULATED CONTAINER for disclosure relating to insulative containers, which application is hereby incorporated in its entirety herein.

EXAMPLES

The following examples are set forth for purposes of illustration only. Parts and percentages appearing in such examples are by weight unless otherwise stipulated. All ASTM, ISO, and other standard test method cited or referred to in this disclosure are incorporated by reference in their entirety.

Example 1

Formulation and Extrusion

A base resin blend comprised DAPLOY™ WB140 polypropylene homopolymer (available from Borealis A/S) and F020HC high crystallinity polypropylene homopolymer, available from Braskem. The base resin blend was blended with: Hydrocerol® CF-40E™ as a chemical blowing agent (CBA), talc as a physical nucleation agent, CO2 as a physical blowing agent, a slip agent, and Ampacet blue-white as a colorant. The colorant can be added to the base resin or to the secondary resin and may be done prior to mixing of the two resins. Percentages were:

| | |
|---|---|
| 86.47% | Borealis WB140 HMS high melt strength homopolymer polypropylene |
| 10% | Braskem F020HC homopolymer polypropylene |
| 0.13% | Clariant Hydrocerol ® CF-40E ™ |
| 0.8% | Heritage Plastics HT4HP Talc |
| 0.8% | AMPACET ™ blue-white |
| 2% | AMPACET ™ 102823 |
| 9.8 lbs/hr | $CO_2$ physical blowing agent introduced into the molten resin |

The formulation was added to an extruder hopper. The extruder heated the formulation to form a molten resin mixture. CO2 was added to the molten resin mixture to expand the resin and reduce density. The formed mixture was extruded through a die head into a strip.

A polymeric-lamination layer comprised Dow 4012 LDPE and ExxonMobil™ 3155 PP3155. The two resins were blended with J11 as the colorant.

Percentages by weight were:

| | |
|---|---|
| 15% | Dow 4012 LDPE |
| 80% | ExxonMobil ™ 3155 PP3155 |
| 5% | J11 colorant |

The formulation was added to an extruder hopper. The extruder heated the formulation to form a molten resin mixture. The molten mixture was between the film (Jindal Films Bicor™ 18 LPX-2) and the insulative cellular non-aromatic polymeric material described above to form the multi-layer sheet. Blanks were cut from the multi-layer sheet and used to form cups in accordance with the present disclosure.

Example 2

Insulative Cellular Non-Aromatic Polymeric Material Properties

The properties insulative cellular non-aromatic material of Example 1 were evaluated according to procedures known in the art and are shown in Table 1.

TABLE 1

Insulative Cellular Non-Aromatic Polymeric Material Properties

| Property | Sample Size | Average | Standard Deviation |
|---|---|---|---|
| Aspect Ratio (CD) | 50 | 1.86 | 0.6 |
| Aspect Ratio (MD) | 50 | 1.46 | 0.4 |
| Cell Density (cells/in$^3$) | 497 | 742,323 | 132,340 |
| Cell Length (CD) (mils) | 50 | 19.2 | 10.7 |
| Cell Length (MD) (mils) | 50 | 15.5 | 4.7 |
| Cell Width (CD) (mils) | 50 | 10.2 | 3.8 |
| Cell Width (MD) (mils) | 50 | 11.2 | 3.5 |
| Closed Cell % (%) | 497 | 95 | 2.4 |
| Crystallinity 5° C./min (%) | 5 | 33.4% | 2.4% |
| Crystallinity 10° C./min (%) | 5 | 34.9% | 2.6% |
| Crystallinity 15° C./min (%) | 5 | 33.5% | 3.5% |
| Crystallization Temp 5° C./min (° C.) | 5 | 133.9 | 0.2 |
| Crystallization Temp 10° C./min (° C.) | 5 | 129.7 | 0.2 |
| Crystallization Temp 15° C./min (° C.) | 5 | 126.5 | 0.5 |
| Dart Impact (inches) | 5 | 1.54 | 0.1 |
| Density (g/cm$^3$) | 497 | 0.133 | 0.004 |
| Elmendorf Arm MD (g) | 5 | 800 | — |
| Elmendorf Arm TD (g) | 5 | 800 | — |
| Elmendorf Tear MD (gf) | 5 | 162 | 23 |
| Elmendorf Tear TD (gf) | 5 | 191 | 59 |
| Material thickness (inches) | 12 | 0.052 | 0.002 |
| Material thickness (inches) | 12 | 0.064 | 0.002 |
| Melting Crystallinity 5° C./min (%) | 5 | 39% | 3% |
| Melting Crystallinity 10° C./min (%) | 5 | 39% | 3% |
| Melting Crystallinity 15° C./min (%) | 5 | 38% | 4% |
| Puncture Resistance [Elongation at Peak Load] - ¼" probe (inches) | 4 | 0.43 | 0.03 |
| Puncture Resistance [Elongation at Peak Load] - ⅛" probe (inches) | 4 | 0.38 | 0.05 |
| Puncture Resistance [Max Load] - ¼" probe (gf) | 4 | 4835 | 998 |
| Puncture Resistance [Max Load] - ⅛" probe (gf) | 4 | 3189 | 149 |
| Seam thickness (inches) | 4 | 0.060 | 0.003 |
| Seam thickness (inches) | 8 | 0.083 | 0.003 |
| Thermal Conductivity - 21° C. (W/m-K) | 5 | 0.05213 | 0.00006 |

TABLE 1-continued

| Insulative Cellular Non-Aromatic Polymeric Material Properties | | | |
|---|---|---|---|
| Property | Sample Size | Average | Standard Deviation |
| Thermal Conductivity - 93° C. (W/m-K) | 5 | 0.06297 | 0.00006 |

Example 3

Multi-Layer Sheet Properties

The properties of the multi-layer sheet formed according to Example 1 are shown below in Table 2.

TABLE 2

| Insulative Cellular Non-Aromatic Polymeric Material Properties | | | |
|---|---|---|---|
| Property | Sample Size | Average | Standard Deviation |
| Dart Drop (g) | | 175 | — |
| Elmendorf Arm MD (g) | 5 | 1600 | — |
| Elmendorf Arm TD (g) | 5 | 1600 | — |
| Elmendorf Tear MD Foam Side Top (gf) | 5 | 349 | 93 |
| Elmendorf Tear MD Print Side Top (gf) | 5 | 427 | 33 |
| Elmendorf Tear TD Foam Side Top (gf) | 5 | 419 | 48 |
| Elmendorf Tear TD Print Side Top (gf) | 5 | 285 | 28 |
| Puncture Resistance [Elongation at Peak Load] - Foam Side Front - ¼" probe (inches) | 5 | 0.48 | 0.07 |
| Puncture Resistance [Elongation at Peak Load] - Foam Side Front - ⅛" probe (inches) | 5 | 0.37 | 0.03 |
| Puncture Resistance [Elongation at Peak Load] - Print Side Front - ¼" probe (inches) | 5 | 0.52 | 0.05 |
| Puncture Resistance [Elongation at Peak Load] - Print Side Front - ⅛" probe (inches) | 5 | 0.41 | 0.03 |
| Puncture Resistance [Max Load] - Foam Side Front - ¼" probe (gf) | 5 | 10,868 | 1820 |
| Puncture Resistance [Max Load] - Foam Side Front - ⅛" probe (gf) | 5 | 6517 | 184 |
| Puncture Resistance [Max Load] - Print Side Front - ¼" probe (gf) | 5 | 11794 | 631 |
| Puncture Resistance [Max Load] - Print Side Front - ⅛" probe (gf) | 5 | 6662 | 153 |

Example 4

Formulation and Extrusion

A base resin blend comprised Braskem Amppleo® 1025MA, JPP MFX6 PP Resin, and Braskem TI215OC. The base resin blend was blended with regrind and a chemical blowing agent. The chemical blowing agent was Ecocell® P. Percentages were about:

| | |
|---|---|
| 42.7% | Braskem Amppleo ® 1025MA |
| 30% | JPP MFX6 |
| 5% | Braskem TI215OC |
| 22% | Regrind |
| 0.3% | Ecocell ® P |
| 11.8 lbs/hr $CO_2$ physical blowing agent introduced into the molten resin | |

The formulation was added to an extruder hopper. The extruder heated the formulation to form a molten resin mixture. The molten mixture was extruded between the extruded insulative cellular non-aromatic polymeric material and the film, as suggested in FIG. 1.

A polymeric-lamination layer comprised reground insulative cellular-nonaromatic polymeric material and Flint Hills P9H8M-015 Polypropylene. The two resins were blended with Colortech E-1274 Blue White as the colorant.

Percentages by weight were about:

| | |
|---|---|
| 47.5% | Regrind |
| 47.5% | Flint Hills P9H8M-015 Polypropylene |
| 5% | Colortech E-1274 Blue White |

The formulation was added to an extruder hopper. The extruder heated the formulation to form a molten resin mixture. The molten mixture was extruded between the extruded insulative cellular non-aromatic polymeric material and the film, as suggested in FIG. 1.

The resulting composite material had properties according to Table 3.

TABLE 3

| Multi-Layer Sheet Density ($g/cm^3$) | | Foam Cell Count | | Foam Aspect Ratio | | Foam Closed Cell % | |
|---|---|---|---|---|---|---|---|
| X Bar | STD | X Bar | STD | X Bar | STD | X Bar | STD |
| 0.151 | 0.004 | 844012 | 132336 | 2.16 | 0.26 | 86.94 | 3.28 |

Example 5

Regrinding

An example of the regrinding process is described in the Figures. Amppleo® 1025MA from Braskem, Daploy™ WB140 HMS from Borealis, Waymax MFX6 from JPP, and regrind material were tested for melt elasticity. Briefly, the resins were extruded using an extruder having a wheel position about 114 mm below the die, ambient wheel temperature, a barrel diameter of 12 mm, a die entry angle of about 180°, a 2 mm die diameter, a 30 mm die length, with a 6 minute preheat time and a 200° C. barrel temperature. The experiments were repeated in triplicate. The results are shown in Table 4.

TABLE 4

| Material | Average Velocity at break (mm/s) | Average Load at break (N) |
|---|---|---|
| Amppleo ® 1025MA | 131.8 | 0.54 |
| Daploy ™ WB140 HMS | 120.8 | 0.45 |
| Waymax MFX6 | 125.7 | 0.46 |
| Regrind | 454.8 | 0.075 |

Example 6

Formulation and Extrusion

Polymeric material for forming the cup bottom was prepared as follows. A base resin blend comprised a high melt strength polypropylene, a polypropylene homopolymer, and a polypropylene elastomer. The base resin blend was blended with regrind, a chemical blowing agent, an antioxidant, and a nucleating agent. Percentages were:

| | |
|---|---|
| 73.9% | Borealis WB140 HMS high melt strength homopolymer polypropylene |
| 4.6% | Braskem Inspire 6025N |
| 9.2% | ExxonMobil Vistamaxx ™ 6102 elastomer |
| 0.2% | Clariant Hydrocerol ® CF-40E ™ |
| 0.8% | Heritage Plastics HT4HP Talc |
| 1.9% | Colortech 10614-31 Antioxidant |
| 10% | Bottom Stock regrind |

The formulation was added to an extruder hopper. The extruder heated the formulation to form a molten resin mixture. $CO_2$ was added to the molten resin mixture to expand the resin at a rate of 11.8 lbs/hr. The formed mixture was extruded through a die head into a strip.

Although only a number of exemplary embodiments have been described in detail above, those skilled in the art will readily appreciate that many modifications are possible in the exemplary embodiments without materially departing from the novel teachings and advantages. Accordingly, all such modifications are intended to be included within the scope of this disclosure as defined in the following claims.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods, equipment, and systems. These and other components are disclosed herein, and it is understood that when combinations, subsets, interactions, groups, etc. of these components are disclosed while specific reference of each various individual and collective combinations and permutation of these may not be explicitly disclosed, each is specifically contemplated and described herein, for all methods, equipment, and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

It will be apparent to those skilled in the art that various modifications and variations can be made without departing from the scope or spirit of the present disclosure. Other embodiments will be apparent to those skilled in the art from consideration of the specification and practice disclosed herein. It is intended that the specification and examples be considered as exemplary only.

It should further be noted that any publications and brochures referred to herein are incorporated by reference in their entirety.

The invention claimed is:

1. A rigid insulative cup comprising a container formed to include an interior region bounded by a side wall and a floor, wherein the side wall includes an inner surface and an outer surface and comprises an insulative cellular non-aromatic polymeric material, wherein the insulative cellular non-aromatic polymeric material comprises polypropylene and excludes an ethylene copolymer, a film layer having an inner surface coupled to and substantially surrounding the outer surface of the side wall of the container, wherein the film layer is a biaxially oriented polypropylene film, and a polymeric-lamination layer extending between and interconnecting the outer surface of the side wall and the film layer, wherein the polymeric-lamination layer comprises regrind, and wherein the regrind is about 0.05% to about 99.5% by weight of the polymeric-lamination layer, and wherein the rigid insulative cup comprises an ink layer printed on the film layer, and wherein the rigid insulative cup, when unfilled, has a rigidity of at least about 0.6 kg-F.

2. The rigid insulative cup of claim 1, wherein the rigid insulative cup, when filled at room temperature and lidded, has a rigidity of less than about 1.7 kg-F.

3. The rigid insulative cup of claim 1, wherein the rigid insulative cup has a top load of at least about 90 lbf.

4. The rigid insulative cup of claim 1, wherein the insulative cellular non-aromatic polymeric material and the polymeric-lamination layer comprise polypropylene.

5. The rigid insulative cup of claim 1, wherein the side wall of the rigid insulative cup has a puncture resistance of at least about 6,000 gf using a ¼" probe.

6. The rigid insulative cup of claim 1, wherein the side wall of the rigid insulative cup has a puncture resistance of at least about 8,000 gf using a ¼" probe.

7. The rigid insulative cup of claim 1, wherein the side wall of the rigid insulative cup has an Elmendorf Tear in the machine direction (MD) of at least 200 gf.

8. The rigid insulative cup of claim 1, wherein the insulative cellular non-aromatic polymeric material comprises regrind.

9. The rigid insulative cup of claim 1, wherein the regrind comprises ink.

10. The rigid insulative cup of claim 1, wherein the regrind comprises regrind of the multi-layer sheet.

11. The rigid insulative cup of claim 1, wherein the regrind is substantially free of an adhesive.

12. The rigid insulative cup of claim 1, wherein the polymeric-lamination layer is substantially free of an adhesive.

13. The rigid insulative cup of claim 1, wherein the insulative cellular non-aromatic polymeric material comprises about 40% to about 99.5% by weight of a base resin blend, and up to about 50% by weight regrind.

14. The rigid insulative cup of claim 13, wherein the base resin blend comprises a first polypropylene and a second polypropylene.

15. The rigid insulative cup of claim 13, wherein the base resin blend comprises a first polypropylene homopolymer and a second polypropylene homopolymer.

16. The rigid insulative cup of claim 15, wherein the first polypropylene homopolymer is a first high melt-strength polypropylene and the second polypropylene homopolymer is a second high melt-strength homopolymer.

17. The rigid insulative cup of claim 16, wherein the base resin blend further comprises a high crystallinity copolymer.

18. The rigid insulative cup of claim 1, wherein the film layer is formed of a first polymeric formulation and the polymeric-lamination layer is formed of a second formulation that is different than the first polymeric formulation.

* * * * *